(12) United States Patent
Karube et al.

(10) Patent No.: US 11,493,331 B2
(45) Date of Patent: Nov. 8, 2022

(54) THREE-DIMENSIONAL SHAPE MEASURING APPARATUS, THREE-DIMENSIONAL SHAPE MEASURING METHOD, THREE-DIMENSIONAL SHAPE MEASURING COMPUTER-READABLE STORAGE MEDIUM, AND THREE-DIMENSIONAL SHAPE MEASURING COMPUTER-READABLE STORAGE DEVICE

(71) Applicant: Keyence Corporation, Osaka (JP)

(72) Inventors: Takuya Karube, Osaka (JP); Masaki Fujiwara, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 201 days.

(21) Appl. No.: 16/918,100

(22) Filed: Jul. 1, 2020

(65) Prior Publication Data

US 2021/0041231 A1    Feb. 11, 2021

(30) Foreign Application Priority Data

Aug. 6, 2019 (JP) .............................. JP2019-144967

(51) Int. Cl.
 *G01B 11/25* (2006.01)
 *G02B 26/08* (2006.01)
(52) U.S. Cl.
 CPC ...... *G01B 11/2522* (2013.01); *G01B 11/2527* (2013.01); *G02B 26/0833* (2013.01)
(58) Field of Classification Search
 CPC ............ G01B 11/2513; G01B 11/2545; G01B 11/0608; G01B 11/254; G01B 11/2522;
(Continued)

(56) References Cited

U.S. PATENT DOCUMENTS 10,262,431 B2 * 4/2019 Tabuchi ................... G06T 7/62
10,323,933 B2 6/2019 Fujiwara et al.
(Continued)

FOREIGN PATENT DOCUMENTS

EP   0768622 A2 * 4/1997
EP   3219469 A1 * 9/2017  ........... B29C 64/106
(Continued)

OTHER PUBLICATIONS

U.S. Appl. No. 16/918,108, filed Jul. 1, 2020 (117 pages).
U.S. Appl. No. 16/918,116, filed Jul. 1, 2020 (122 pages).

*Primary Examiner* — Michael P Stafira
(74) *Attorney, Agent, or Firm* — Kilyk & Bowersox, P.L.L.C.

(57) ABSTRACT

A three-dimensional shape measuring apparatus includes a stage that includes a translation stage part having a placement surface on which a measurement object is placed and capable of translating the placement surface; an illuminator that includes independently controllable and two-dimensionally-arranged projection devices, and illuminates the measurement object, which is placed on the stage, with measuring light having a predetermined projection pattern having alternating light-and-dark intervals; a photoreceptor that receives measuring light reflected by the measurement object illuminated by the illuminator, and to generate a projection pattern image; and a movement controller that controls the translational movement of the translation stage part by a moving pitch smaller than the minimum width of the projection pattern which can be projected on the stage by independently controlling the projection devices of the illuminator.

16 Claims, 36 Drawing Sheets

(58) Field of Classification Search
CPC . G01B 11/14; G01B 11/2518; G01B 11/2441; G01B 11/245; G01B 11/2527; G01B 11/2536; G01B 2290/70; G01B 11/2425; G01B 11/2433; G01B 11/25; G01B 9/02063; G01B 9/02072; G01B 9/0209; G01B 9/04; G01B 11/002; G01B 15/00; G01B 9/02007; G01B 9/02018; G01B 9/02021; G01B 9/02027; G01B 9/02045; G02B 26/0833; G02B 26/105; G02B 26/124; G02B 27/30; G02B 27/62; G02B 5/0808; G02B 21/0016; G02B 21/367; G02B 2027/0114; G02B 2027/0118; G02B 2027/012; G02B 2027/0125; G02B 2027/014; G02B 2027/0174; G02B 2027/0178; G02B 27/0018; G02B 27/0081; G02B 27/017; G02B 27/0172; G02B 27/0176; G02B 27/1086; G02B 27/283; G02B 5/1809; G02B 5/1823; G02B 5/1828; G02B 5/1857; G02B 5/1861; G02B 5/1866; G02B 5/1871; G02B 5/3025; G02B 6/0016; G02B 6/0023; G02B 6/0035; G02B 6/0036; G02B 6/0038; G02B 6/005; G02B 6/0076; G02B 6/29325; G02B 6/34; G02B 7/008; G01N 21/9501; G01N 2223/419; G01N 2223/612; G01N 23/046
See application file for complete search history.

(56) References Cited

U.S. PATENT DOCUMENTS

| | | | |
|---|---|---|---|
| 2017/0372489 A1* | 12/2017 | Tabuchi | G06T 7/62 |
| 2021/0041230 A1* | 2/2021 | Natori | G01B 11/2513 |

FOREIGN PATENT DOCUMENTS

| | | | | | |
|---|---|---|---|---|---|
| JP | H1020209 | A | * | 1/1998 | |
| JP | 2001201324 | A | * | 7/2001 | ........... G01B 11/245 |
| JP | 2003202216 | A | * | 7/2003 | |
| JP | 2004309240 | A | * | 11/2004 | |
| JP | 2015145796 | A | * | 8/2015 | |
| JP | 2016008837 | A | * | 1/2016 | |
| JP | 2018004278 | A | | 1/2018 | |
| WO | WO-2018134932 | A1 | * | 7/2018 | ............... G01H 9/00 |

* cited by examiner

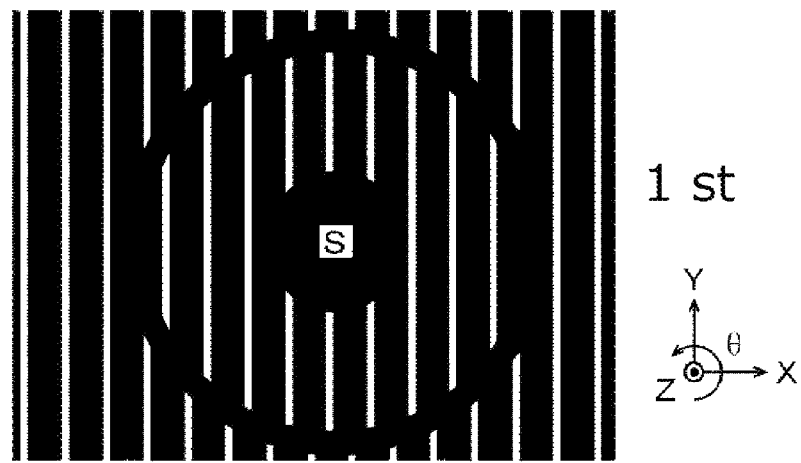
FIG. 14A — 1 st
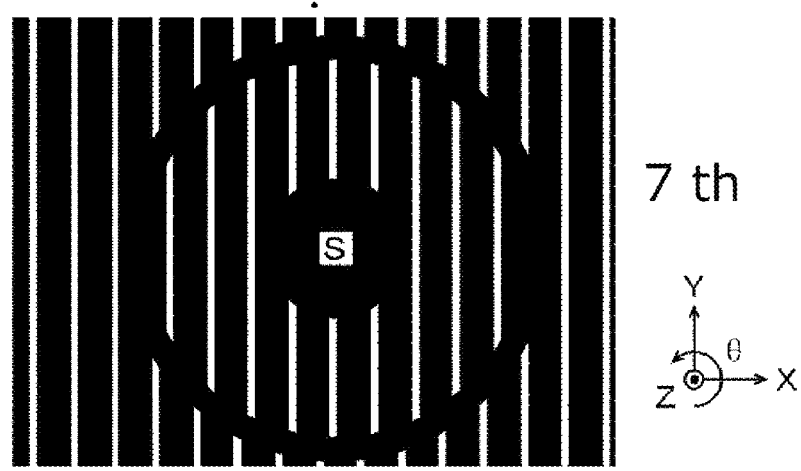
FIG. 14B — 7 th
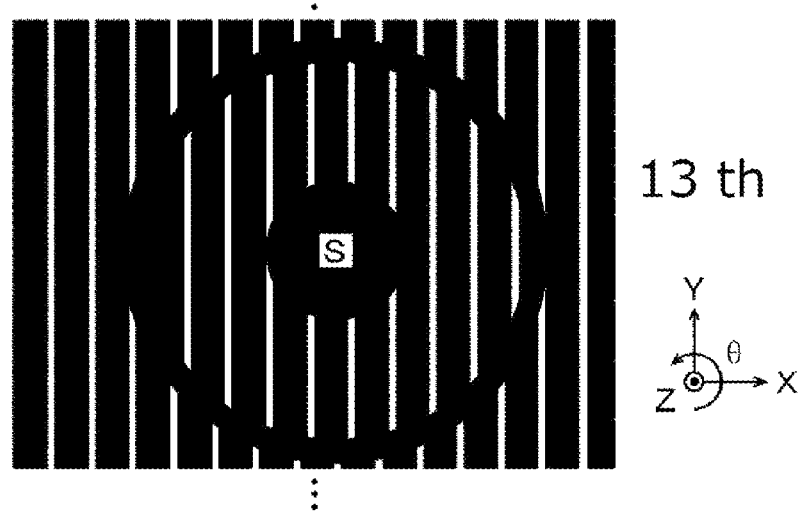
FIG. 14C — 13 th

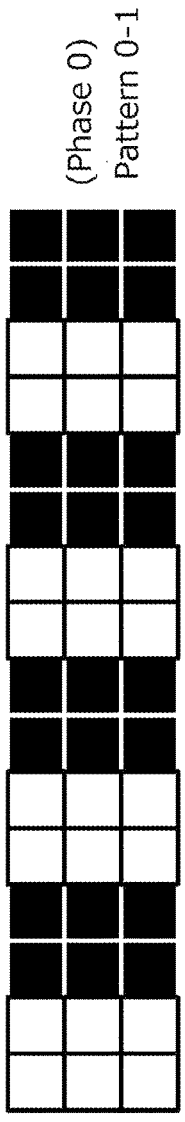
FIG. 20A (Phase 0) Pattern 0-1
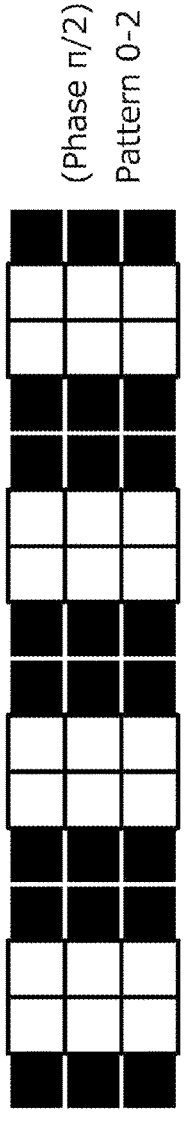
FIG. 20B (Phase π/2) Pattern 0-2
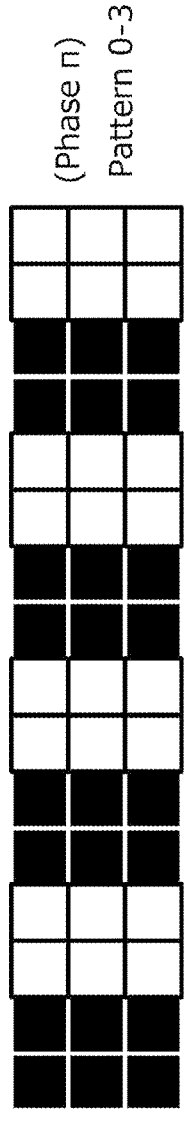
FIG. 20C (Phase π) Pattern 0-3
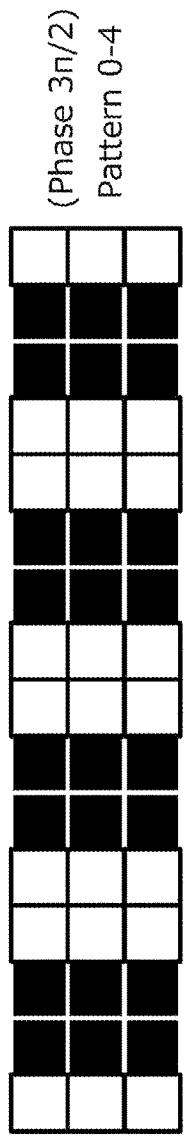
FIG. 20D (Phase 3π/2) Pattern 0-4

Pattern 2-1

Pattern 2-2

Pattern 2-3

Pattern 2-4

Pattern 3-1

Pattern 3-2

Pattern 3-3

Pattern 3-4

Pattern 0-1

Pattern 1-1

Pattern 2-1

Pattern 3-1

Pattern 0-2

Pattern 1-2

Pattern 2-2

Pattern 3-2

Pattern 0-3

Pattern 1-3

Pattern 2-3

Pattern 3-3

Pattern 0-4

Pattern 1-4

Pattern 2-4

Pattern 3-4

FIG. 29
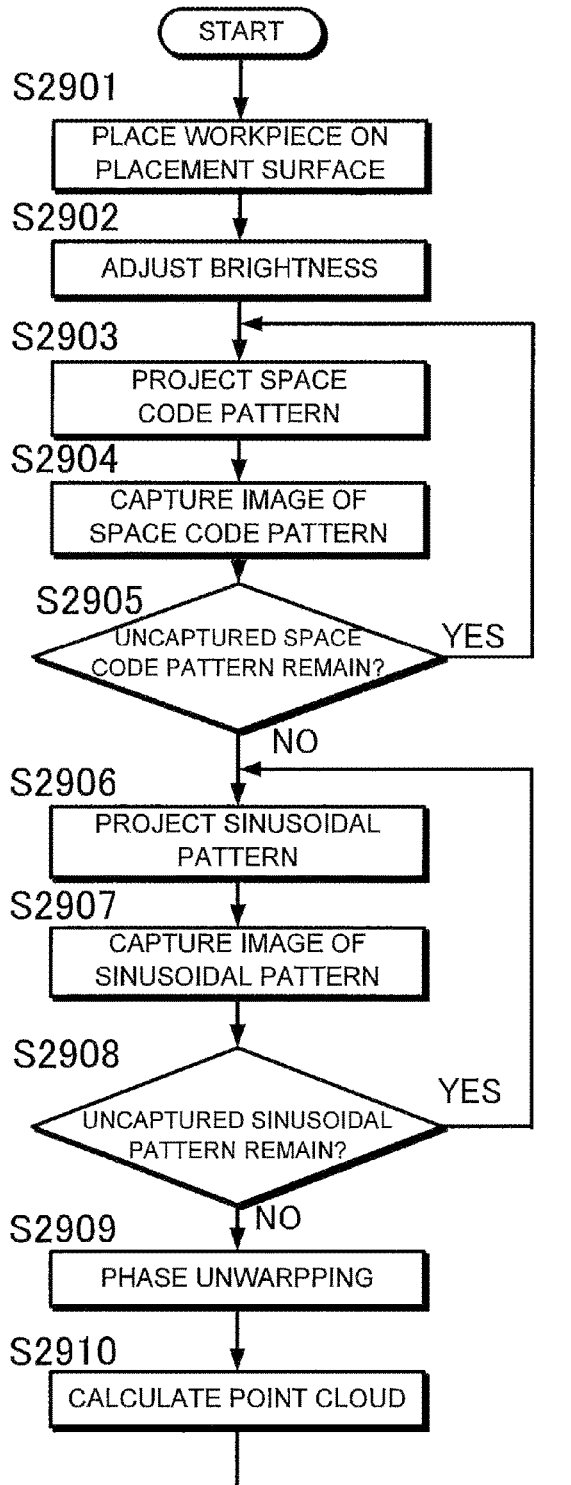
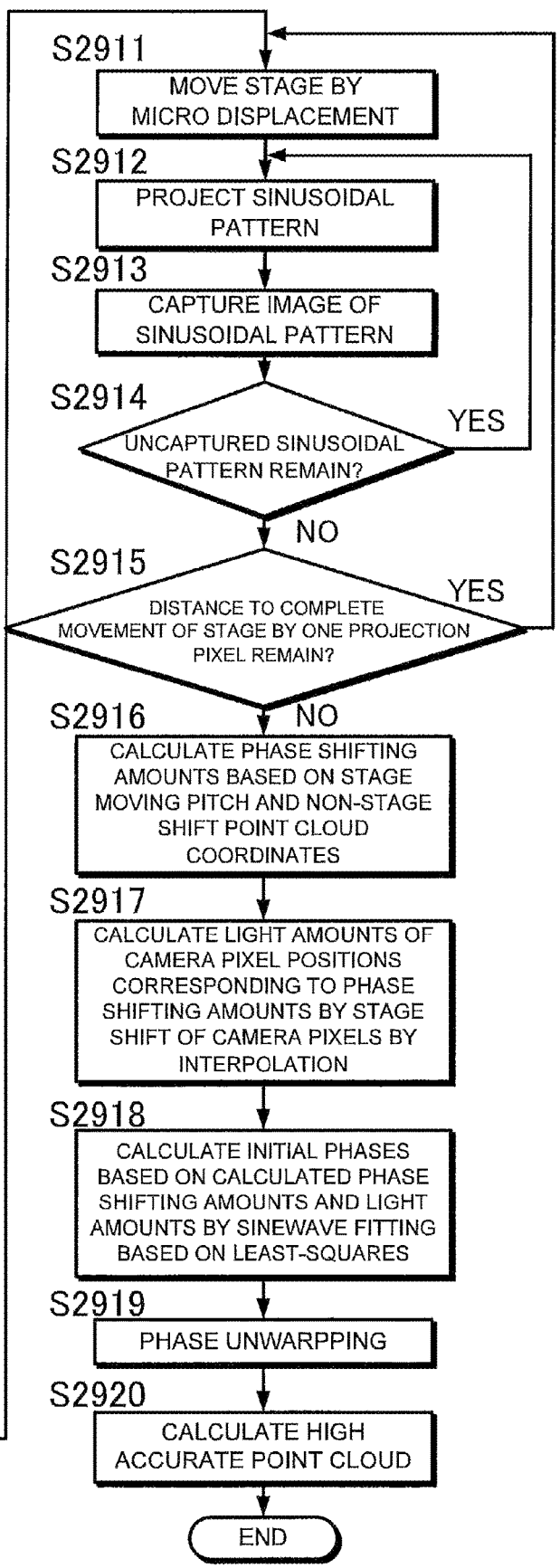

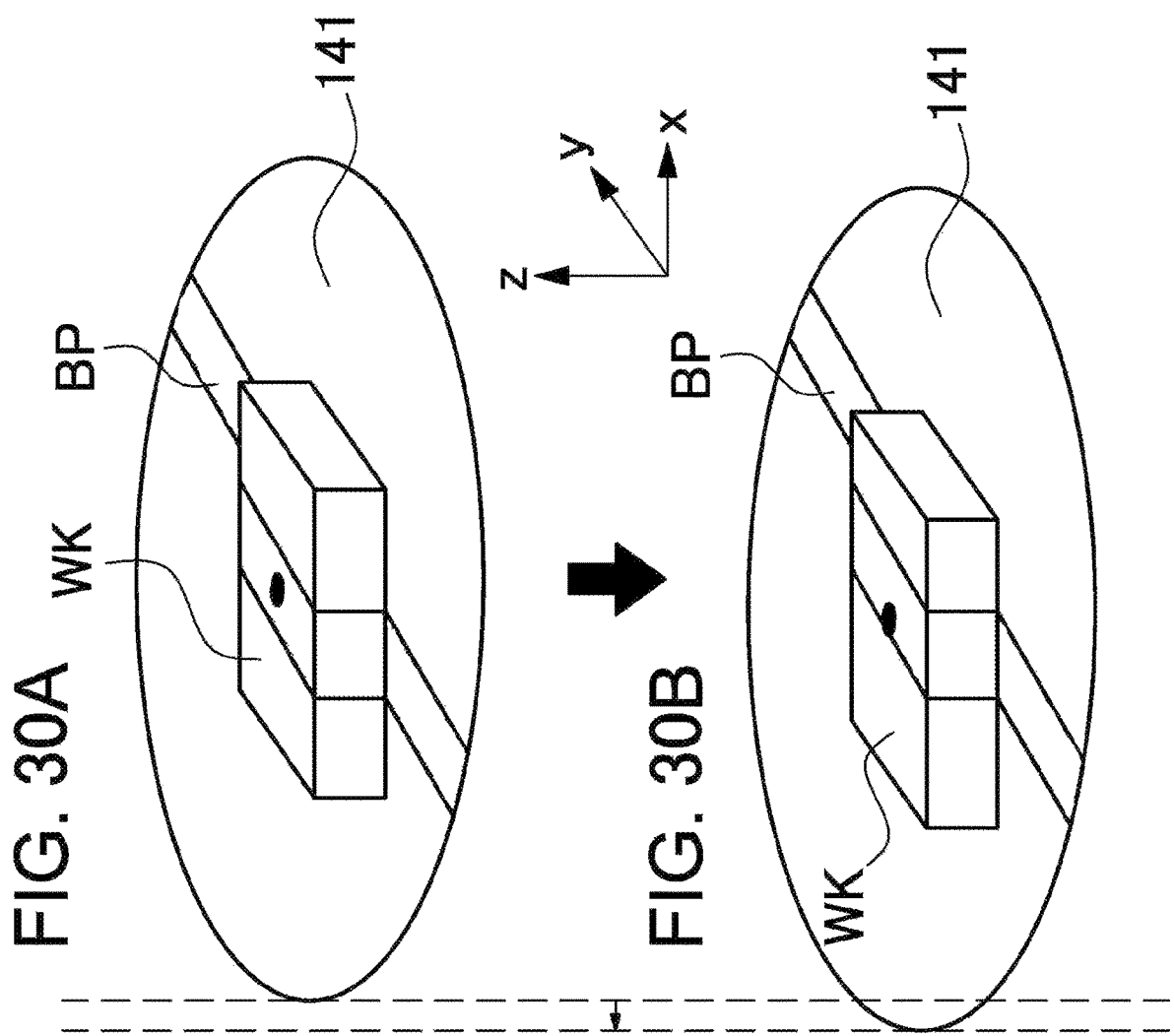

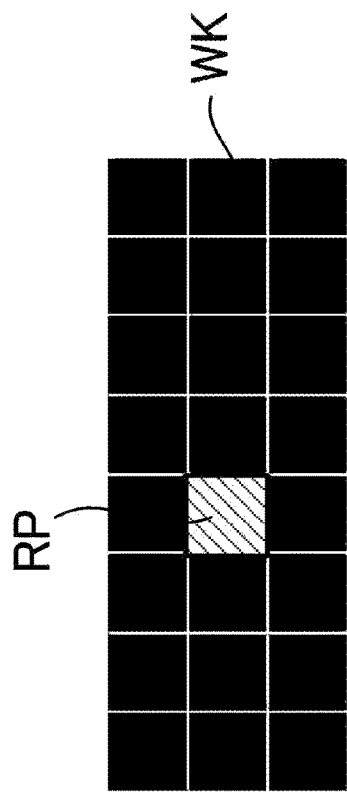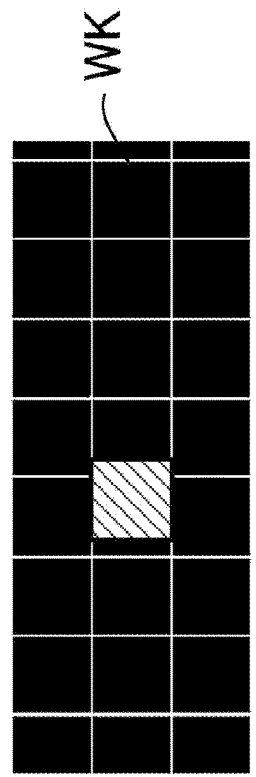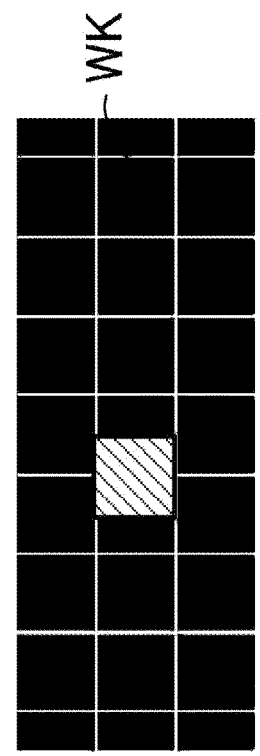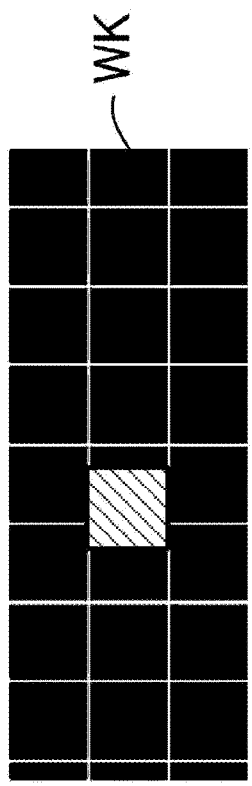
FIG. 31A Reference Position (Stage Position 1)
FIG. 31B Stage Position 2
FIG. 31C Stage Position 3
FIG. 31D Stage Position 4

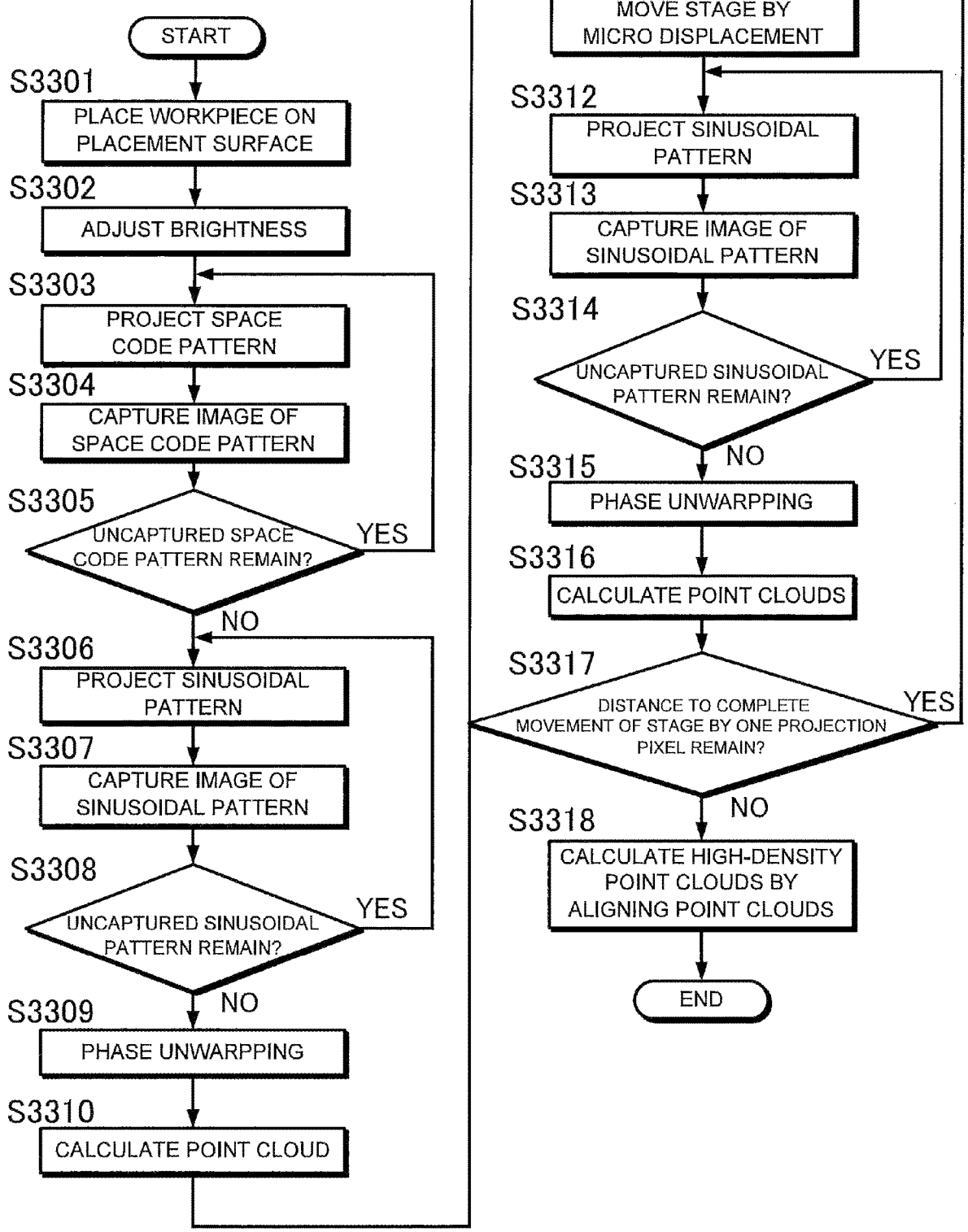

THREE-DIMENSIONAL SHAPE MEASURING APPARATUS, THREE-DIMENSIONAL SHAPE MEASURING METHOD, THREE-DIMENSIONAL SHAPE MEASURING COMPUTER-READABLE STORAGE MEDIUM, AND THREE-DIMENSIONAL SHAPE MEASURING COMPUTER-READABLE STORAGE DEVICE

CROSS-REFERENCE TO RELATED APPLICATIONS

The present application claims priority under 35 U.S.C. § 119 to Japanese Patent Application No. 2019-144,967, filed on Aug. 6, 2019, the contents of which are incorporated herein by reference.

BACKGROUND OF THE INVENTION

1. Field of the Invention

The present disclosure relates to a three-dimensional shape measuring apparatus, a three-dimensional shape measuring method, a three-dimensional shape measuring program, a three-dimensional shape measuring computer-readable storage medium and a three-dimensional shape measuring computer-readable storage device which perform predetermined inspections including a height information inspection on a three-dimensional measurement object.

2. Description of the Related Art

A triangulation-type three-dimensional shape measuring apparatus is known (for example, JP 2018-4,278 A). The three-dimensional shape measuring apparatus includes a stage on which a measurement object is placed, and a head which is fixedly coupled to the stage to illuminate the measurement object with measuring light and receive reflected light from the measurement object. According to this, its robustness against external environment change such as resistance to vibration can be improved, and a three-dimensional shape of the measurement object can be stably measured. In addition, in the three-dimensional shape measuring apparatus, the stage is a rotatable stage which rotates the measurement object in order to measure a three-dimensional shape of the measurement object from a plurality of directions.

In such a three-dimensional shape measuring apparatus, where the rotatable stage on which the measurement object is placed has a limited size, users sometimes desire to measure a three-dimensional shape of a long measurement object which cannot be held on the rotatable stage. To address this case, it is conceivable that a translational stage which can move a measurement object in parallel on an XY plane is provided in addition to the rotatable stage which rotates the measurement object. In this case, measurement accuracy of a three-dimensional shape depends on a physical resolution of a device which illuminates the measurement object with measuring light, for example, of a DMD or the like. For this reason, measurement accuracy cannot be easily improved to a degree more accurate than the physical resolution.

It is an object of the present invention to provide a three-dimensional shape measuring apparatus, a three-dimensional shape measuring method, a three-dimensional shape measuring program, a three-dimensional shape measuring computer-readable storage medium and a three-dimensional shape measuring computer-readable storage device which can improve measurement accuracy to a degree more accurate than a physical resolution of a measuring-light illuminating device.

SUMMARY OF THE INVENTION

A three-dimensional shape measuring apparatus according to a first aspect of the present invention is a three-dimensional shape measuring apparatus which measures a three-dimensional shape of a measurement object, the apparatus including a stage that includes a translation stage part having a placement surface on which a measurement object is placed and capable of translating the placement surface; an illuminator that includes a plurality of independently controllable and two-dimensionally-arranged projection devices, and illuminates the measurement object, which is placed on the stage, with measuring light having a predetermined projection pattern having alternating light-and-dark intervals; a photoreceptor that receives measuring light reflected by the measurement object illuminated by the illuminator, and to generate a projection pattern image; and a movement controller that controls the translational movement of the translation stage part by a moving pitch smaller than the minimum width of the projection pattern which can be projected on the stage by independently controlling the projection devices of the illuminator. According to this construction, in the three-dimensional shape measurement of the measurement object, the measurement accuracy can be improved to a physical spatial resolution smaller than the physical spatial resolution of projection patterns which can be generated by the illuminator which projects the projection patterns.

Also in a three-dimensional shape measuring apparatus according a second aspect of the present invention, in addition to the aforementioned aspect, the illuminator includes a measuring light source; and a pattern generator that includes the two-dimensionally-arranged projection devices each of which transmits or reflects light emitted from the measuring light source, and controls the transmission or reflection of each of the projection devices whereby generating the projection pattern. According to this construction, the measurement accuracy can be improved to a physical spatial resolution smaller than the physical spatial resolution of projection patterns which can be generated by the projection device which projects the projection patterns.

Also in a three-dimensional shape measuring apparatus according a third aspect of the present invention, in addition to any of the aforementioned aspects, the pattern generator is a DMD.

Also in a three-dimensional shape measuring apparatus according a fourth aspect of the present invention, in addition to any of the aforementioned aspects, the movement controller moves the translation stage part by the moving pitch in a direction parallel to the illumination direction of the measuring light of the illuminator with respect to the optical axis of the photoreceptor. According to this construction, the accuracy can be improved similar to the case in which the projection pattern is shifted by a micro displacement smaller than the spatial resolution of the projection device, and as a result the measurement accuracy can be improved without hardware improvement of the projection device to high precision.

Also in a three-dimensional shape measuring apparatus according a fifth aspect of the present invention, in addition to any of the aforementioned aspects, the projection pattern of the illuminator is a striped projection pattern including a plurality of lines which are aligned parallel to each other, and the movement controller translates the translation stage part by the moving pitch in a direction intersecting lines included in the striped projection pattern which are projected on the stage. According to this construction, the accuracy can be improved similar to the case in which the stripe-projection pattern is shifted by a micro displacement smaller than the spatial resolution of the projection device in the stripe alignment direction, and as a result the measurement accuracy can be improved without hardware improvement of the projection device to high precision.

Also in a three-dimensional shape measuring apparatus according a sixth aspect of the present invention, in addition to any of the aforementioned aspects, a point cloud data generator that generates point cloud data representing a three-dimensional shape of the measurement object based on a plurality of projection pattern images which are generated by the photoreceptor at positions after the translation stage part is translated by the moving pitch by using the movement controller is further provided, and the point cloud data generator measures a surface shape of the measurement object by calculating positions of the light and dark peaks which are included in each of the projection pattern images by using a phase shift method based on a first pattern set as a set of the projection pattern images that are captured corresponding to a plurality of projection patterns having a different phase with which the illuminator illuminates the measurement object when the translation stage is positioned at a first position, and a second pattern set as a set of the projection pattern images that are captured corresponding to a plurality of projection patterns having a different phase with which the illuminator illuminates the measurement object when the translation stage is positioned at a second position which is shifted by the moving pitch from the first position. According to this construction, where projection patterns having a different phase, because the phase pitch can be apparently reduced by using the translation stage part to a pitch smaller than the pitch which can be physically provided by the projection device, and the peak position or initial phase estimation can be calculated based on the reduced phase pitch, a three-dimensional shape can be measured with accuracy higher than the resolution of the projection device.

Also in a three-dimensional shape measuring apparatus according a seventh aspect of the present invention, in addition to any of the aforementioned aspects, the point cloud data generator sorts the projection pattern images which are included in the first and second pattern sets according to the phase shift amounts, and measures a surface shape of the measurement object by calculating positions of the light and dark peaks which are included in each of the projection pattern images by using the phase shift method based on the sorted projection pattern images. According to this construction, the peak positions can be easily estimated based on the sorted projection pattern images, and as a result the shape can be measured with accuracy higher than the resolution of the projection device.

Also in a three-dimensional shape measuring apparatus according an eighth aspect of the present invention, in addition to any of the aforementioned aspects, the point cloud data generator converts, with reference to a position of the translation stage part when one projection pattern image at an arbitrary position in the plurality projection pattern images, other projection pattern images into pixel values which are estimated on the presumption that they are generated at said position of the translation stage part, and generates the point cloud data based on the one projection pattern image and the estimated projection pattern images. According to this construction, in three-dimensional shape measurement of a measurement object, because an arbitrary position of one projection pattern image is added with other projection pattern images as pixel value in accordance with the sampling position, finer three-dimensional measurement can be realized.

Also in a three-dimensional shape measuring apparatus according a ninth aspect of the present invention, in addition to any of the aforementioned aspects, the point cloud data generator converts the moving pitch of the stage by the movement controller into a moving amount in the projection pattern image, and generates the point cloud data.

Also in a three-dimensional shape measuring apparatus according a tenth aspect of the present invention, in addition to any of the aforementioned aspects, the point cloud data generator overlays the plurality of projection pattern images on each other in consideration of positions of the translation stage part at which the plurality of projection pattern images are generated, and generates the point cloud data. According to this construction, because projection pattern images are deviated from and overlaid on each other in consideration of positions at which their corresponding projection pattern images are generated in three-dimensional shape measurement of a measurement object, three-dimensional shape measurement can be conducted based on a fine multiplexed fine image.

Also in a three-dimensional shape measuring apparatus according an eleventh aspect of the present invention, in addition to any of the aforementioned aspects, each pixel of the photoreceptor is smaller than each pixel of the projection device.

Also in a three-dimensional shape measuring apparatus according a twelfth aspect of the present invention, in addition to any of the aforementioned aspects, a stage shift selector that selects whether the translation stage part is translated by a micro displacement by the movement controller is further provided, and the movement controller translates the translation stage part by a micro displacement based on the selection result by the stage shift selector.

In addition, a three-dimensional shape measuring apparatus according a thirteenth aspect of the present invention is a three-dimensional shape measuring method which measures a three-dimensional shape of a measurement object, the method including generating a projection pattern image by illuminating a measurement object which is placed on a stage that includes a translation stage part having a placement surface on which the measurement object is placed and capable of translating the placement surface when the translation stage part is positioned at an initial position with measuring light having a predetermined projection pattern having alternating light-and-dark intervals by using an illuminator that includes a plurality of independently controllable and two-dimensionally-arranged projection devices, and receiving the measuring light reflected by the measurement object by using a photoreceptor; repeating a translation operation in which the translation stage part is translated by using a movement controller by a moving pitch smaller than the minimum width of the projection pattern which can be projected on the stage by independently controlling the projection devices of the illuminator, and generation of a projection pattern image by illuminating the measurement object with the measuring light by using the illuminator and receiving the measuring light reflected by the measurement object by using the photoreceptor at a position after the translation operation a predetermined number of times whereby capturing projection pattern images of the measurement object at the positions corresponding to the predetermined number of translation operations; and obtaining exterior shape information continuously representing a three-dimensional shape of the measurement object by combining sets of point cloud data representing the three-dimensional shape of the measurement object which are generated at the positions based on the projection pattern images by a point cloud data generator.

Accordingly, the exterior shape information of the measurement object can be obtained with high accuracy improved to a physical spatial resolution smaller than the physical spatial resolution of projection patterns which can be generated by the illuminator.

Also in a three-dimensional shape measuring method according a fourteenth aspect of the present invention, in addition to the aforementioned aspect, the generation of a projection pattern image at the initial position includes generating a first pattern set as a set of the projection pattern images that are captured corresponding to a plurality of projection patterns having a different phase with which the illuminator illuminates the measurement object, the generation of a projection pattern image at a position after the translation operation includes generating a second pattern set as a set of the projection pattern images that are captured corresponding to a plurality of projection patterns having a different phase with which the illuminator illuminates the measurement object, and the obtainment of the exterior shape information includes measuring a surface shape of the measurement object based on the first and second pattern sets by calculating positions of the light and dark peaks which are included in each of the projection pattern images by using a phase shift method. Accordingly, where projection patterns having a different phase, because the phase pitch can be apparently reduced by using the translation stage part to a pitch smaller than the pitch which can be physically provided by the projection device, and the peak position or initial phase estimation can be calculated based on the reduced phase pitch, a three-dimensional shape can be measured with accuracy higher than the resolution of the projection device.

Also in a three-dimensional shape measuring method according a fifteenth aspect of the present invention, in addition to any of the aforementioned aspects, the obtainment of the external information includes sorting the projection pattern images which are included in the first and second pattern sets according to the phase shift amounts, and measures a surface shape of the measurement object by calculating positions of the light and dark peaks which are included in each of the projection pattern images by using the phase shift method based on the sorted projection pattern images.

In addition, a three-dimensional shape measuring program according a sixteenth aspect of the present invention is a three-dimensional shape measuring program which causes a computer to perform measurement of a three-dimensional shape of a measurement object, the three-dimensional shape measuring program including generating a projection pattern image by illuminating a measurement object which is placed on a stage that includes a translation stage part having a placement surface on which the measurement object is placed and capable of translating the placement surface when the translation stage part is positioned at an initial position with measuring light having a predetermined projection pattern having alternating light-and-dark intervals by using an illuminator that includes a plurality of independently controllable and two-dimensionally-arranged projection devices, and receiving the measuring light reflected by the measurement object by using a photoreceptor; repeating a translation operation in which the translation stage part is translated by using a movement controller by a moving pitch smaller than the minimum width of the projection pattern which can be projected on the stage by independently controlling the projection devices of the illuminator, and generation of a projection pattern image by illuminating the measurement object with the measuring light by using the illuminator and receiving the measuring light reflected by the measurement object by using the photoreceptor at a position after the translation operation a predetermined number of times whereby capturing projection pattern images of the measurement object at the positions corresponding to the predetermined number of translation operations; and obtaining exterior shape information continuously representing a three-dimensional shape of the measurement object by combining sets of point cloud data representing the three-dimensional shape of the measurement object which are generated at the positions based on the projection pattern images by a point cloud data generator. Accordingly, the exterior shape information of the measurement object can be obtained with high accuracy improved to a physical spatial resolution smaller than the physical spatial resolution of projection patterns which can be generated by the illuminator.

A computer-readable storage medium or storage device according a seventeenth aspect of the present invention is a computer-readable storage medium or storage device having the aforementioned program. The storage medium can be CD-ROM, CD-R, CD-RW, flexible disk, magnetic tape, MO, DVD-ROM, DVD-RAM, DVD-R, DVD+R, DVD-RW, DVD+RW, Blu-ray (registered trademark), magnetic disk such as HD DVD (AOD), optical disc, magneto-optical disk, semiconductor memory, other medium that can store the program. The program can be distributed in a form stored in the storage medium, and be also distributed through network such as the Internet (downloaded). Also, the storage medium can include a device that can store the program, for example, a general-purpose device or special-purpose device on which the aforementioned program is installed in a form of executable software, firmware on the like. Processes or functions included in the program can be executed by the program software that can be executed by a computer. The processes of parts can be realized by hardware such as certain gate array (FPGA, ASIC, DSP) and microcomputer, or a form of combination of program software and partial hardware module that realizes parts of elements of hardware.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 14A to 14C are diagrams for explanation of a third pattern of measuring light;

FIG. 20A is a schematic view showing the striped pattern of FIG. 19;

FIGS. 20B to 20D are schematic views showing striped patterns which are shifted by one pixel of the projection device from the previous pattern;

FIG. 29 is a flowchart showing the procedure for calculating high precision point cloud by subdividing the phase shift interval by using stage shift measurement;

FIG. 30A is a perspective view showing a measurement object on which a striped pattern is projected;

FIG. 30B is a perspective view showing the measurement object which is shifted in the X direction when the striped pattern shown in FIG. 30A is unchanged;

FIG. 31A is a schematic plan view illustrating a reference point on a measurement object when a translation stage part is positioned at a reference position;

FIGS. 31B to 31D are schematic plan views showing observation of the reference point when the translation stage part is moved by a micro displacement from the previous position;

FIG. 33 is a flowchart illustrating the procedure for improving the camera pixel density by using the stage shift measurement;

DESCRIPTION

Figure 1:
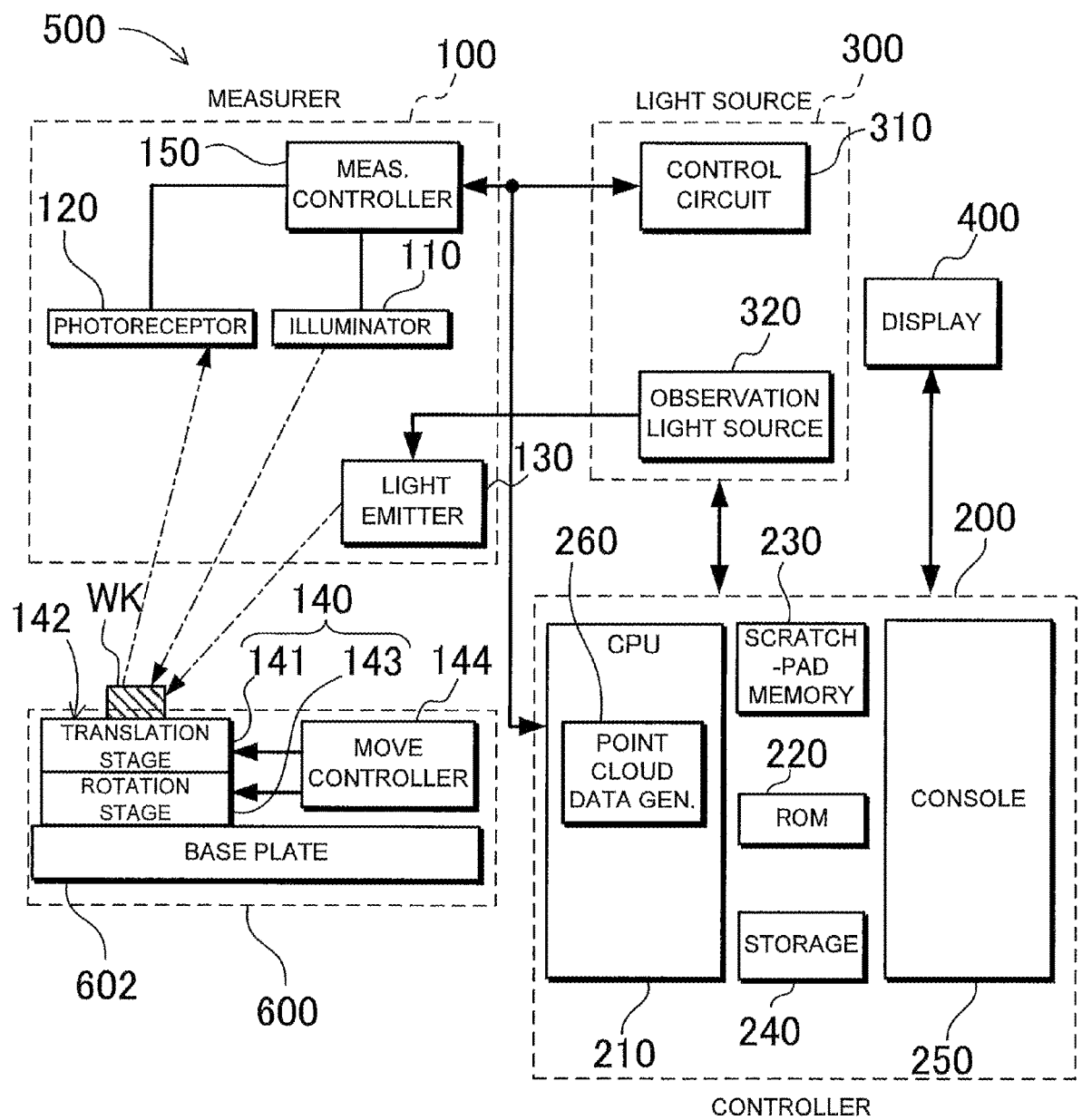
FIG. 1 is a block diagram showing an image inspection apparatus according to a first embodiment of the present invention.

The following description will describe embodiments according to the present invention with reference to the drawings. It should be appreciated, however, that the embodiments described below are illustrations of a three-dimensional shape measuring apparatus to give a concrete form to technical ideas of the invention, and a three-dimensional shape measuring apparatus of the invention is not specifically limited to description below. Furthermore, it should be appreciated that the members shown in claims attached hereto are not specifically limited to members in the embodiments. Unless otherwise specified, any dimensions, materials, shapes and relative arrangements of the parts described in the embodiments are given as an example and not as a limitation. Additionally, the sizes and the positional relationships of the members in each of drawings are occasionally shown exaggeratingly for ease of explanation. Members same as or similar to those of this invention are attached with the same designation and the same reference numerals and their description is omitted. In addition, a plurality of structural elements of the present invention may be configured as a single part that serves the purpose of a plurality of elements, on the other hand, a single structural element may be configured as a plurality of parts that serve the purpose of a single element.

In this specification, the term "texture image" refers to an observed image (typically, optical image) which includes texture information. In addition, the term "height image" is also referred to as depth map and the like, and is used to mean an image which includes height information. Examples of height images can be provided by images which have height information converted into luminance, chromaticity, or the like represented as a two-dimensional image, and images have height information as Z coordinate information represented as a three-dimensional image. Also, height images include a three-dimensional combined image which is obtained by applying a texture image as texture information onto the aforementioned exemplary height image. In addition, in this specification, display forms for height images are not limited to two-dimensional representation but can include three-dimensional representation. For example, the display forms for height images can include two-dimensional representation which has height information included in a height image converted into luminance or the like, and three-dimensional representation which has height information converted into Z coordinate information.

In addition, in this specification, the term "orientation" of a measurement object which is placed on a stage refers to a rotation angle of the measurement object. It is noted that in the case in which a measurement object is an axially symmetrical shape such as a circular cone which has a circle as viewed in a plan view its orientation is not required to be defined because the same result is obtained irrespective of its rotation angle.

In the following embodiments, in order to obtain height information of a measurement object, the measurement object is illuminated with measuring light having a predetermined pattern so that its height information is obtained by using signals obtained from reflected light which is reflected by surfaces of the measurement object. For example, a measuring method using triangulation which uses structured light as the measuring light having a predetermined pattern, projects it onto a measurement object, and uses projected pattern images obtained from the reflected light. However, the principle and construction for obtaining height information of a measurement object in the present invention are not limited to this but other method can be used to obtain height information of a measurement object.

First Embodiment

A three-dimensional shape measuring apparatus can measure heights in a measurement object image in three dimensions. Also, in addition to the three-dimensional measurement, two-dimensional measurement can be performed. FIG. 1 is a block diagram showing a three-dimensional shape measuring apparatus according to a first embodiment of the present invention. This illustrated three-dimensional shape measuring apparatus 500 includes a measurer 100, a mount 600, a controller 200, a light source 300, and a display 400. The three-dimensional shape measuring apparatus 500 illuminates a measurement object WK with structured light by using the light source 300, captures projected pattern images of the measurement object WK to generate a height image including height information, and can measure the three-dimensional dimensions and shape of the measurement object WK based on the height image. Because the measurement using such striped projection can measure height without moving the measurement object WK or the optical system such as lenses in the Z direction, there is an advantage that measurement time can be reduced.

The measurer 100 includes an illuminator 110, a photoreceptor 120, a measurement controller 150, and an illumination light emitter 130. The illuminator 110 illuminates the measurement object WK, which is placed on the stage 140, with measuring light having a predetermined pattern. The photoreceptor 120 is fastened to the placement surface 142 in an inclined orientation. The photoreceptor 120 is illuminated by the illuminator 110, and receives measuring light reflected from the measurement object WK to provide light-reception signals representing a light reception amount. The photoreceptor 120 can generate an observed image for observing the entire shape of the measurement object WK by capturing images of the measurement object WK which is placed on the stage 140.

The mount 600 includes the stage 140 and a movement controller 144. This mount 600 supports the stage 140 on a base plate 602. The movement controller 144 serves as a member which moves the stage 140. Although the movement controller 144 is provided on the mount 600 side, it may be provided on the controller 200 side.

The light source 300 is connected to the measurer 100. The light source 300 emits measuring light, and provides it to the measurer 100. The controller 200 controls image capture in the measurer 100. The display 400 is connected to the controller 200, displays generated images, and serves as an HMI for necessary settings.

(Stage 140)

The mount 600 shown in FIG. 1 includes the stage 140 and the movement controller 144. The stage 140 has the placement surface 142 on in which the measurement object WK is placed. This stage 140 includes a rotation stage part 143 which rotates the placement surface 142, and a translation stage part 141 which translates the placement surface 142.

(Movement Controller 144)

The movement controller 144 controls rotational movement of the rotation stage part 143 and translational movement of the translation stage part 141 based on a measurement area which is defined by a measurement area setting part 264. In addition, the movement controller 144 controls movement operation of the stage 140 by a stage movement part based on the measurement area which is defined by the later-discussed measurement area setting part 264.

The controller 200 includes a CPU (central processing unit) 210, a ROM (read-only memory) 220, a scratch-pad memory 230, a storage 240, and a console 250. PCs (personal computers) or the like can be used for the controller 200. Also, the CPU 210 realizes the function of a point cloud data generator 260 which generates point cloud data (discussed later in details) and the like.

(Block Diagram of Measurer 100)

Figure 2:
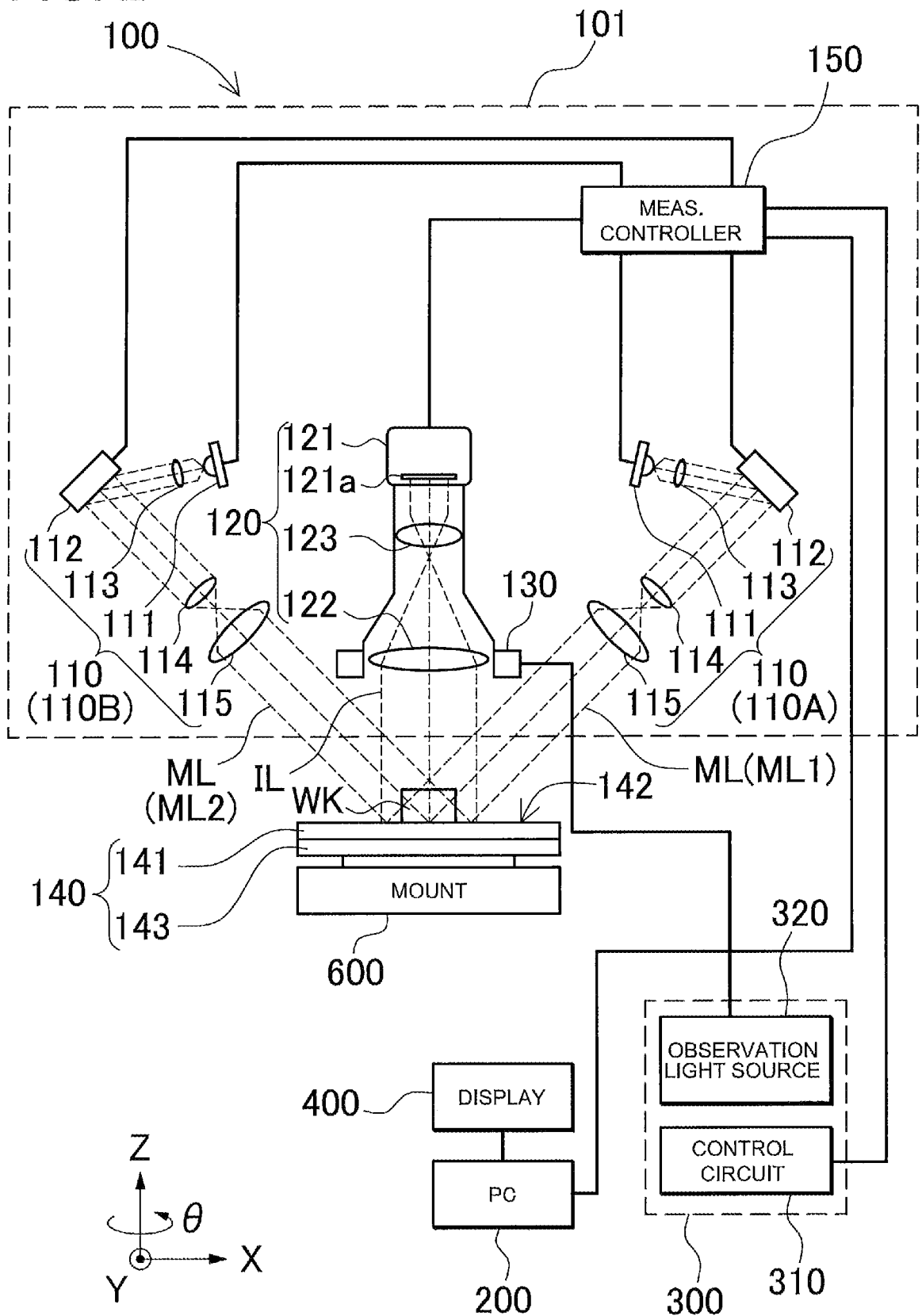
FIG. 2 is a block diagram showing the construction of a measurer in FIG. 1.

FIG. 2 is a block diagram showing the construction of the measurer 100 of the three-dimensional shape measuring apparatus 500 shown in FIG. 1. The measurer 100 is a microscope, for example, and includes the illuminator 110, the photoreceptor 120, the illumination light emitter 130, the measurement controller 150, a body case 101 which accommodates them, and the stage 140. The illuminator 110 includes a measuring light source 111, a pattern generator 112, and a plurality of lenses 113, 114 and 115. The photoreceptor 120 includes a camera 121, and a plurality of lenses 122 and 123. The measurement object WK is placed on the stage 140. The body case 101 is a resin or metal casing. It is noted that FIG. 2 shows the three-dimensional shape measuring apparatus 500 as viewed front the front side, and the illuminator 110 is fixed in an inclined orientation with respect to the depth (near-and-far) direction in the paper plane as shown in FIG. 1.

(Illuminator 110)

The illuminator 110 is arranged obliquely above the stage 140. This measurer 100 illuminates a measurement object WK which is placed on the stage 140 with the measuring light. The measuring light has a predetermined projection pattern. The measurer 100 includes a number of projection devices which are two-dimensionally arranged and can be independently controlled. The projection devices produce a predetermined projection pattern having alternating light-and-dark intervals. The projection devices can represent light and dark, or variable density. Also, the illuminator 110 can include the measuring light source 111 and the pattern generators 112. The pattern generator 112 includes a number of two-dimensionally-arranged projection devices. The pattern generator 112 can generate various projection patterns by selecting light or dark as binary for every projection device, that is, by selectively transmitting or reflecting the measuring light from the measuring light source 111, for example. In this case, the projection devices are independently controlled to selectively transmit or reflect the measuring light emitted by the measuring light source 111.

The illuminator 110 can include a plurality of illuminators 110. In the embodiment shown in FIG. 2, the measurer 100 includes two illuminators 110. In this embodiment, a first measuring-light illuminator 110A (right side in FIG. 2) which can illuminate the measurement object WK with first measuring light ML1 in a first direction, and a second measuring-light illuminator 1106 (left side in FIG. 2) which can illuminate the measurement object WK with second measuring light ML2 in a second direction different from the first direction are provided. The first measuring-light illuminator 110A and the second measuring-light illuminator 1106 are symmetrically arranged with respect to the optical axis of the photoreceptor 120. It is noted that three or more illuminators may be provided, or a common illuminator may be provided but a measurement object can be illuminated with light in different illumination directions by moving the common illuminator and the stage relative to each other. On the other hand, although a plurality of illuminators 110 are provided and the common photoreceptor 120 receives light in the foregoing embodiment, a plurality of photoreceptors may be provided to receive light from a common illuminator. In addition, although an illumination angle of illumination light 8 (see FIG. 6, etc.) which is emitted by the illuminator is fixed with respect to the vertical direction in this embodiment, the illumination angle can be changed.

(Measuring Light Source 111)

The first and second measuring-light illuminators 110A and 1106 include first and second measuring light sources, respectively, as the measuring light source 111. The measuring light sources 111 are a halogen lamp which emits white light, for example. The measuring light source 111 may be a light source which emits monochromatic light, other light source such as white LED (light emitting diode) or organic electroluminescence which emits white light, for example. Light which is emitted by the measuring light source 111 (hereinafter, referred to as "measuring light") is properly condensed by the lens 113 and then enters the pattern generator 112.

(Pattern Generator 112)

The pattern generator 112 reflects light which is emitted by the measuring light source 111 to illuminate the measurement object WK with measuring light. The measuring light which enters the pattern generator 112 is converted into a predetermined pattern and predetermined intensity (brightness) and emitted from the pattern generator 112. The measuring light which is emitted from the pattern generator 112 is converted into light having a larger diameter than an observable and measurable field of view of the photoreceptor 120 by the lenses 114 and 115, and then incident on the measurement object WK on the stage 140.

The pattern generator 112 is a member which can separately change a number of projection devices (projection pixels) included in this pattern generators 112 between an illumination state in which the measurement object WK is illuminated with measuring light and a non-illumination state in which the measurement object WK is not illuminated with measuring light. A DMD (digital micro mirror device) can be suitably, used for the pattern generator 112, for example. The pattern generator 112 which uses a DMD can be controlled by the measurement controller 150 between a reflection state in which measuring light is reflected to travel along an optical path as the illumination state and a light interception state in which the measuring light is intercepted as the non-illumination state.

The DMD is an element which includes a number of micro mirrors (very small mirror surfaces) MM arranged in a flat plane. The micro mirrors serve as the projection devices which form their corresponding projection pixel of the pattern generator 112. Because the micro mirrors can be individually switched between ON and OFF states by the measurement controller 150, desired projection patterns can be formed by combination of ON and OFF states of the micro mirrors. Accordingly, the measurement object WK can be measured by generating a pattern required for triangulation. Consequently, the DMD serves as a projection pattern optical system which illuminates the measurement object WK with an alternate projection pattern for measurement when the measurement object WK is measured. In addition, such a DMD has an advantage of high response speed and high operating speed compared with shutters and the like.

It is noted that although the pattern generator 112 has been illustratively described to use the DMD in the foregoing embodiment, the pattern generator 112 is not limited to a DMD but other member can be used as the pattern generator. For example, a LCOS (Liquid Crystal on Silicon: reflective liquid crystal element) may be used as the pattern generator 112. Alternatively, instead of reflective members, a transmissive member may be used to adjust a transmission amount of measuring light. In this case, the pattern generator 112 is arranged on the optical path of measuring light, and separately changes the projection devices included in this pattern generators 112 between the illumination state in which the measuring light passes through the pattern generator 112 and the light interception state in which the measuring light is intercepted. An LCD (liquid crystal display) can be suitably, used for the pattern generator 112, for example. Alternatively, the pattern generator 112 may be constructed of a projection system using a plurality lines of LEDs or a projection system using a plurality of light paths, an optical scanner system constructed of a laser and galvanometer mirrors, etc., an AFI (Accordion fringe interferometry) system using interference fringes produced by superposing beams divided by a beam splitter, a projection system using gratings constructed of a piezo stage, high resolution encoder, etc. and a moving mechanism, or the like.

In addition, although the three-dimensional shape measuring apparatus has been illustratively described to include two measuring-light illuminators in the embodiment shown in FIG. 2, etc., the present invention is not limited to this but the three-dimensional shape measuring apparatus can include three or more the measuring-light illuminators. Alternatively, the three-dimensional shape measuring apparatus can only include a single measuring-light illuminator. In this case, the measurement object WK can be illuminated with measuring light in different directions by moving the single measuring-light illuminator which is movable between different positions.

(Photoreceptor 120)

The photoreceptor 120 is arranged above the stage 140. Measuring light which is reflected upward of the stage 140 by the measurement object WK is condensed to form an image by the lenses 122 and 123 of the photoreceptor 120, and is then received by the camera 121.

(Camera 121)

The camera 121 is a CCD (charge-coupled device) camera which includes an image pickup device 121a as the photo-receiving device and lenses, for example. The image sensor 121a is a monochromatic CCD (charge-coupled device), for example. The image pickup devices 121a may be other image pickup device such as CMOS (complementary metal-oxide semiconductor) image sensor. Because color image pickup devices necessarily includes pixels which receive red light, green light, and blue light, color image pickup devices have lower measurement resolution as compared with monochromatic image pickup devices, and color image pickup devices have lower sensitivity because color filters are necessarily provided to their pixels. For this reason, in this embodiment, a monochromatic CCD is used as the image pickup device, and color images are captured by separately illuminating a measurement object with R light, G light, and B light which are emitted by the later-discussed illumination light emitter 130 at different timing. According to this construction, color images of the measurement object can be captured without reduction of measurement accuracy.

However, needless to say, a color image pickup device may be used as the image pickup device 121a. In this case, although measurement accuracy or sensitivity will be reduced, the illumination light emitter 130 does not necessarily emit R light, G light, and B light at different timing, and the illumination optical system can be simple because color image can be captured by emitting only white light. The pixels of the image pickup device 121a provide analog electric signals corresponding to amounts of their received light (hereinafter, referred to as "light-reception signals") to the measurement controller 150.

Such captured images of a measurement object WK form a similar figure very accurately similar to the measurement object WK in accordance with the characteristics of the lens. In addition, the dimensions in the image and the dimensions in the actual measurement object WK can be accurately associated with each other by calibration using scaling of the lens.

(Measurement Controller 150)

The measurement controller 150 includes an A/D convertor (analog/digital converter) and FIFO (First In First Out) memory (not shown). The light-reception signals which are provided from the camera 121 are periodically sampled at a fixed sampling period by the ND convertor of the measurement controller 150, and are converted into digital signals under control of the light source 300. The digital signals which are provided from the A/D convertor are sequentially accumulated in the FIFO memory. The digital signals which are accumulated in the FIFO memory are sequentially transmitted as pixel data to the controller 200.

(Controller 200)

As shown in FIG. 1, the controller 200 includes the CPU 210, the ROM 220, the scratch-pad memory 230, the storage 240, and the console 250. The console 250 can include a keyboard and a pointing device. A mouse or joy stick can be used as the pointing device.

The ROM 220 stores a system program. The scratch-pad memory 230 is constructed of a RAM (random access memory), and is used for various types of data processing. The storage 240 is constructed of a hard disk and the like. The storage 240 stores a three-dimensional shape measurement program for operating the three-dimensional shape measuring apparatus. In addition, the storage 240 is used to save various types of data such as pixel data which are provided by the measurement controller 150 and the like.

Also, the storage stores illuminance information, height information, and attribute information of pixels which are included in the measurement image.

(CPU 210)

The CPU 210 is a control circuit or a controlling device which performs various types of computations by operation on provided signals and data, and provides the calculation results. In this specification, the term "CPU" refers to a device or circuit which performs computations, and is not limited to a processor such as CPU for general-purpose PC, MPU, GPU and TPU but used to include a processor or microcomputer such as FPGA, ASIC, and LSI, or a chip set such as SoC.

Figure 3:
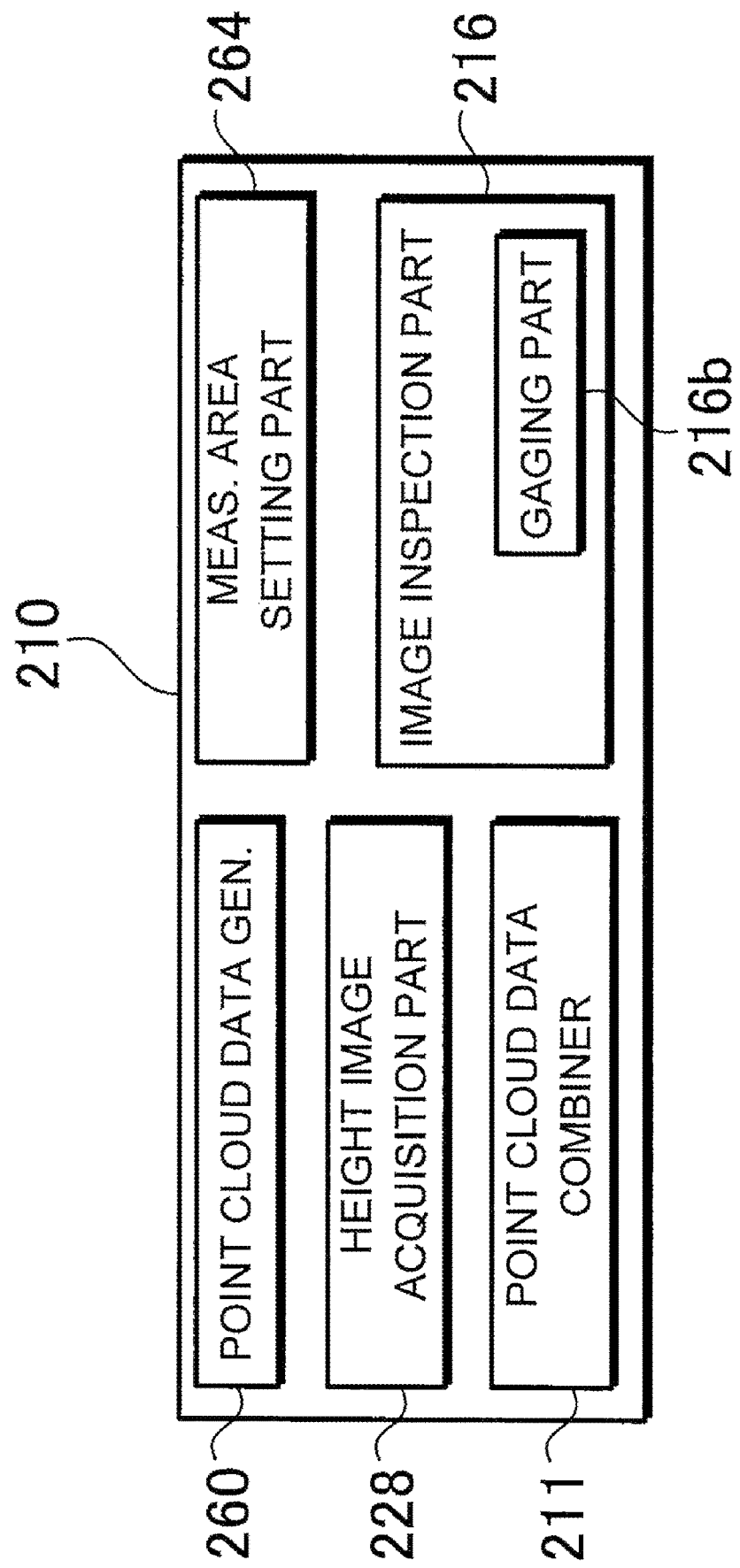
FIG. 3 is a block diagram showing the construction of a CPU of a controller in FIG. 1.

The CPU 210 generates image data based on pixel data provided from the measurement controller 150. In addition, the CPU 210 performs various types of processing on the generated image data by using the scratch-pad memory 230, and displays images based on the image data on the display 400. FIG. 3 is a block diagram of the CPU 210. The CPU realizes functions of the point cloud data generator 260, the measurement area setting part 264, a height image acquisition part 228, and a point cloud data combiner 211, and the like.

(Point Cloud Data Generator 260)

The point cloud data generator 260 generates point cloud data as a set of points including three-dimensional position information representing a three-dimensional shape of a measurement object WK based on the light-reception signals which are provided by the photoreceptor 120.

(Measurement Area Setting Part 264)

The measurement area setting part 264 defines a measurement area on an observed image which is displayed on the display 400.

The height image acquisition part 228 produces a height image which includes height information based on two or more projected pattern images. In addition, the point cloud data combiner 211 combines two or more sets of point cloud data generated by the point cloud data generator 260. Here, the point cloud refers to a set of data points in space which includes coordinates in a three-dimensional space (e.g., XYZ Cartesian coordinate system). Thus, the surface shape of a measurement object can be more precisely represented by superposing items of sets of point cloud data of the measurement object, which are generated at different positions of the stage, corresponding to the same coordinate in the three-dimensional space by using the point cloud data generator 211.

(Image Inspection Part 216)

The image inspection part 216 performs predetermined image inspections of an image of a measurement object WK which is captured by the measurer 100. This image inspection part 216 can include a gaging part 216b which performs predetermined measurement of a measurement object image. According to this construction, image inspection can be performed based on the measurement results which are measured by the gaging part 216b. Inspections such as determination of non-defective/defective can be performed based on the measurement results of lengths and angles of predetermined parts of the measurement object WK, for example. In the measurement by the gaging part 216b, a profile graph can be displayed on the display 400 by calculating contour lines which pass through a profile line selected in the texture image and are taken by a flat plane perpendicular to the screen, or a radius of a circle, a length of a straight line and the like can be calculated by extracting the circle, straight line and the like from the contour lines shown in the profile graph.

As discussed above, the CPU 210 solely serves as different parts for realizing various functions. However, needless to say, the present invention is not limited to the construction in which one member solely serves as different parts but two or more members which serve as their corresponding parts or realize their corresponding functions may be provided, or two or more members to which the parts or functions to be realized are assigned one by one may be individually provided.

(Display 400)

The display 400 is a member which displays a projected pattern image obtained by the measurer 100, a height image generated by the height image acquisition part 228 based on the projected pattern image, or a texture image captured by the measurer 100. The display 400 is constructed of an LCD panel or organic electroluminescence (electroluminescence) panel, for example. Also, the display can serves as the console in the case in which the display includes a touch panel.

In addition, the display 400 displays an observed image which is generated by the photoreceptor 120.

(Stage 140)

Two directions which perpendicularly intersect each other in a flat plane on the stage 140 where the measurement object WK is placed (hereinafter, referred to as "placement surface") are defined as the X and Y directions which are shown by arrows X and Y in FIG. 2, respectively. A direction which perpendicularly intersects the placement surface 142 of the stage 140 is defined as the Z direction, and is shown by an arrow Z. A rotational direction (angular coordinate) which rotates about an axis parallel to the Z direction is defined as a θ direction, and is shown by an arrow θ.

The stage 140 includes the translation stage part 141 and the rotation stage part 143. The translation stage part 141 includes an X-direction movement mechanism and a Y-direction movement mechanism. The rotation stage part 143 includes a θ-direction rotation mechanism. The stage 140 is constructed of the translation stage part 141 and the rotation stage part 143. In addition, the stage 140 may include a fastening member (clamp) which fastens a measurement object WK to the placement surface 142. Also, the stage 140 may include a tilt stage which includes a tiltable mechanism which can rotate about an axis parallel to the placement surface 142.

Here, as shown in FIG. 2, the relative positional relationship between the photoreceptor 120, the illuminator 110, and the stage 140 is defined so that the center axes of the right and left illuminators 110, and the center axis of the photoreceptor 120 intersect each other at a point in which a proper position of the measurement object WK on the stage 140, and a proper depth of field of the illuminator 110 and the photoreceptor 120 are provided. In addition, the center rotation axis of the θ direction agrees with the center axis of the photoreceptor 120 so that the measurement object WK can be rotated about the rotation axis within a field of view without getting out of the field of view when the stage 140 rotates in the θ direction. It is noted that, because the measurer 100 includes its arrangement which is rotated about the X direction in the paper plane in FIG. 2, the optical axis of the photoreceptor 120 and the top surface normal of the stage 140 (Z direction) do not necessarily agree each other.

(Light Source 300)

The light source 300 includes a control circuit board 310 and an observation illumination light source 320. A CPU (not shown) is mounted on the control circuit board 310. The CPU in the control circuit board 310 controls the illuminator 110, the photoreceptor 120, and the measurement controller 150 based on instructions from the CPU 210 in the controller 200. It is noted that this construction is illustrative, and other construction may be used. For example, the illuminator 110 and the photoreceptor 120 may be controlled by the measurement controller 150, or the illuminator 110 and the photoreceptor 120 are controlled by the controller 200 so that the control circuit board can be omitted. Alternatively, a power supply circuit for driving the measurer 100 may be arranged in the light source 300.

(Observation Illumination Light Source 320)

The observation illumination light source 320 includes three colors of LEDs which emit red light, green light, and blue light, for example. Any color of light can be can be produced by the observation illumination light source 320 by controlling luminance of light emitted by the LEDs. Illumination light IL which is produced by the observation illumination light source 320 is emitted by the illumination light emitter 130 of the measurer 100 through a light guiding member (light guide). It is noted that suitable light sources other than LEDs such as semiconductor laser (LD), halogen light, and HID can be used for the observation illumination light source. In particular, in the case in which a device capable of capturing color images is used as the image pickup device, a white light source can be used for the observation illumination light source.

The illumination light IL emitted from the illumination light emitter 130 is switched between red light, green light, and blue light when a measurement object WK is illuminated separately with these colors of light at different timing. Accordingly, a texture image can be generated by combining images which are captured when the measurement object WK is illuminated separately with RGB colors of light so that a color texture image is obtained and displayed on the display 400.

The illumination light emitter 130 in FIG. 2 has a ring shape, and is arranged above the stage 140 to surround the photoreceptor 120. According to this arrangement, the illumination light emitter 130 illuminates the measurement object WK with illumination light in a ring shape without shadow appearance.

Also, in addition to such ring illumination, the illumination light emitter 130 can additionally include transmitted illumination and coaxial vertical light illumination. In the embodiment shown in FIG. 2, a transmitted illumination part is provided in the stage 140. The transmitted illumination part illuminates the measurement object WK with light from a lower part of the stage 140. To achieve this, the stage 140 includes a transmitted illumination light source, a reflecting plate, and an illumination lens system.

It is noted that the ring illumination and transmitted illumination may be suitably omitted. If they are omitted, two-dimensional images can be captured by using the illumination for three-dimensional measurement (i.e., the illuminator).

In the embodiment shown in FIG. 1, the observation illumination light source 320 is not included in the body case 101, but the observation illumination light source 320 is provided in the light source 300 added externally to the measurer 100. According to this arrangement, the quality of illumination light provided from the observation illumination light source 320 can be easily improved. For example, because the RGB LEDs which are included in the observation illumination light source 320 have different light distribution characteristics from each other, lighting color unevenness will occur in the field of view if the different light distribution characteristics are not treated when RGB texture images are captured by the monochromatic image pickup device 121a. To address this, optical systems desiccated to their corresponding LED adjusted to its light distribution characteristics are provided and combined with each other so that the light distribution characteristic difference is accommodated, and uniform white illumination without color unevenness is produced and then guided to the measurer 100.

Also, adverse influence of heat generated by the observation illumination light source 320 on the optical system of the measurer 100 can be prevented. That is, if a heat source is located near members of the optical system, thermal expansion may affect their dimensions and reduce measurement accuracy, but because the observation illumination light source which is a heating source is arranged outside the body case 101 such a problem resulting from the heat generated by observation illumination light source can be avoided. In addition, as a result, there is an advantage that a high-output light source which will generate a large amount of heat can be used for the observation illumination light source.

The measuring light source 111 of each of the illuminators 110A and 1108 is a blue LED (light emitting diode), for example. The measuring light sources 111 may be other light source such as halogen lamp. Light which is emitted by the measuring light source 111 (hereinafter, referred to as measuring light) is properly condensed by the lens 113 and then enters the pattern generator 112.

The pattern generator 112 is a DMD (digital micro mirror device), for example. The pattern generator 112 may be an LCD (liquid crystal display), LCOS (Liquid Crystal on Silicon: reflective liquid crystal element), or mask. The measuring light which enters the pattern generator 112 is converted into a predetermined pattern and predetermined intensity (brightness) and emitted from the pattern generator 112. The measuring light which is emitted from the pattern generator 112 is converted into light having a larger diameter than the dimensions of the measurement object WK by the lens 114, and then incident on the measurement object WK on the stage 140.

The measuring light source 111, the lens 113, and the pattern generator 112 of the illuminator 110A are aligned with each other substantially parallel to the optical axis of the photoreceptor 120. Similarly, the measuring light source 111, the lens 113, and the pattern generator 112 of the illuminator 1108 are aligned with each other substantially parallel to the optical axis of the photoreceptor 120. On the other hand, the lenses 114 of the illuminators 110A and 1108 are offset relative to the measuring light source 111, the lens 113, and the pattern generator 112. According to this arrangement, the optical axes of the illuminators 110A and 1108 are inclined with respect to the optical axis of the photoreceptor 120 so that measuring light is emitted toward the measurement object WK from the both sides of the photoreceptor 120.

In this embodiment, in order to provide a wide illumination area of the measuring light, the illuminators 110A and 1108 are constructed to have a certain angle of view. The angle of view of the illuminators 110A and 1108 is defined by the dimensions of the pattern generator 112 and the focal length of the lens 114, for example. In the case in which a wide illumination area of the measuring light is not required, a telecentric optical system which has an angle of view substantially zero degree may be used for the illuminators 110A and 110B.

Measuring light which is reflected upward of the stage 140 by the measurement object WK is condensed to form an image by the lens 122 of the photoreceptor 120, and is received by the image pickup device 121a of the camera 121.

In this embodiment, in order to provide a wide imaging visual field of the photoreceptor 120, the photoreceptor 120 is constructed to have a certain angle of view. In this embodiment, the imaging visual field of the photoreceptor 120 refers to the spatial area whose image can be captured by the photoreceptor 120. The angle of view of the photoreceptor 120 is defined by the dimensions of the image pickup device 121a and the focal length of the lens 122, for example. In the case in which a wide field of view is not required, a telecentric optical system may be used for the photoreceptor 120. Here, the lenses 122 of two photoreceptors 120 which are included in the measurer 100 have a different scaling factor. In this case, images of the measurement object WK can be captured by two scaling factors different from each other by selectively using the two photoreceptors 120. The two photoreceptors 120 are preferably to be arranged so that the optical axes of the two photoreceptors 120 are parallel to each other.

The camera 121 is a CCD (charge-coupled device) camera, for example. The image sensor 121a is a monochromatic CCD (charge-coupled device), for example. The image pickup devices 121a may be other image pickup device such as CMOS (complementary metal-oxide semiconductor) image sensor. The pixels of the image pickup device 121a provide analog electric signals corresponding to amounts of their received light (hereinafter, referred to as light-reception signals) to the control circuit board 150.

Dissimilar to color CCDs, monochromatic CCDs do not necessarily include pixels that receive light of red wavelength, pixels that receive light of green wavelength, and pixels that receive light of blue wavelength. Here, in the case in which a particular wavelength such as blue wavelength is used, color CCDs can use only pixels that receive light of the particular wavelength, but monochromatic CCDs do not have such a restriction. For this reason, monochromatic CCDs have measurement resolution higher than color CCDs. Also, dissimilar to color CCDs, monochromatic CCDs do not necessarily include color filters provided for pixels. For this reason, monochromatic CCDs have sensitivity higher than color CCDs. Therefore, later-discussed point cloud data can be obtained with high accuracy. For these reasons, a monochromatic CCD is provided for the camera 121 in this embodiment.

In this embodiment, the illumination light emitter 130 separately emits light of red wavelength, light of green wavelength, and light of blue wavelength toward the measurement object WK at different timing. According to this construction, color images of the measurement object WK can be captured by the photoreceptor 120 which uses such a monochromatic CCD.

On the other hand, in the case in which a color CCD has sufficient resolution and sensitivity, the image pickup device 121a may be such a color CCD. In this case, the illumination light emitter 130 does not necessarily separately illuminate the measurement object WK with light of red wavelength, light of green wavelength, and light of blue wavelength toward at different timing but illuminate the measurement object WK with white light. Accordingly, the illumination light source 320 can have a simple structure.

Figure 4:
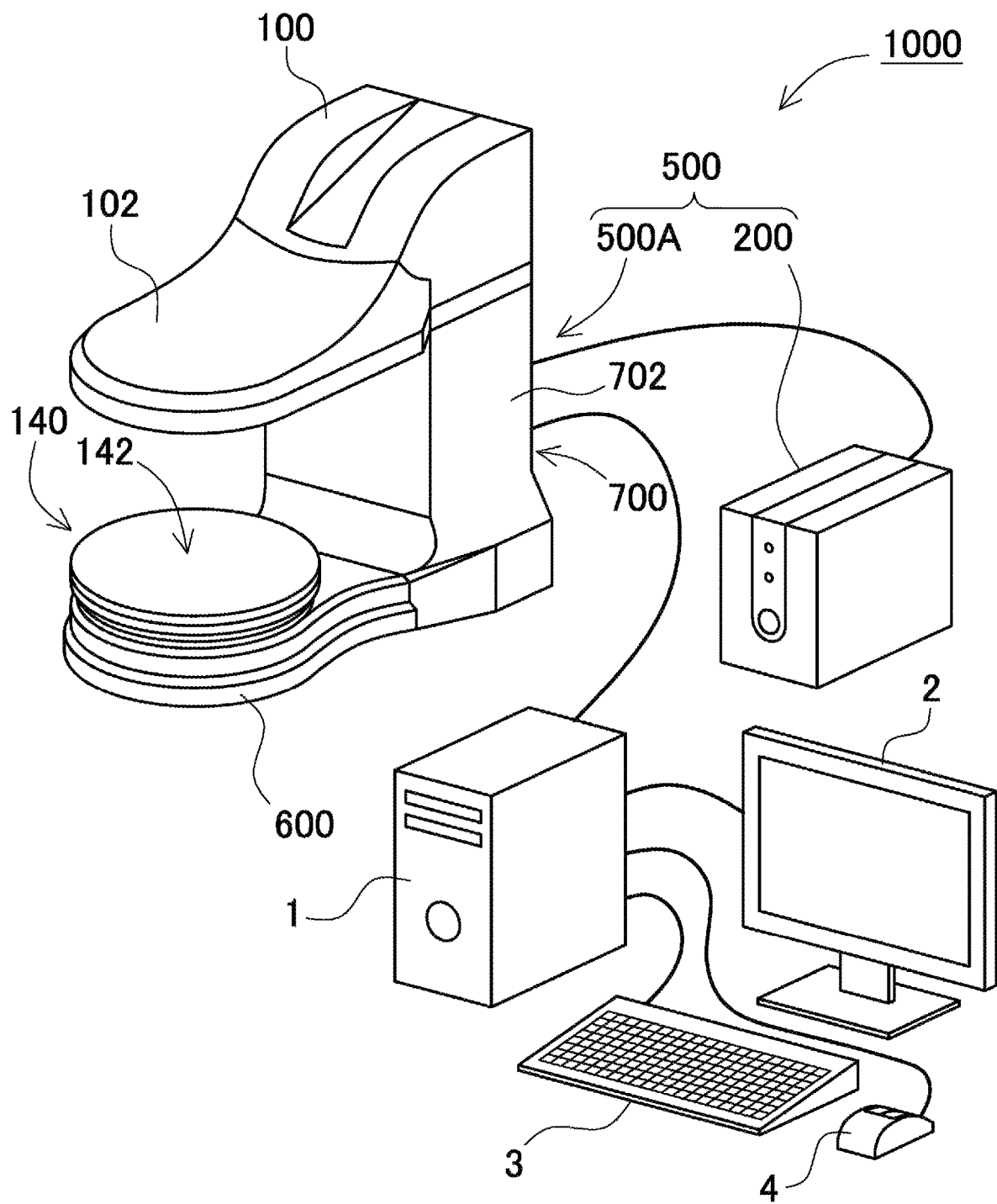
FIG. 4 is a block diagram showing a three-dimensional shape measurement system.

FIG. 4 shows a three-dimensional shape measurement system 1000 which includes a three-dimensional shape measuring apparatus 500 according to the first embodiment. In this illustrated three-dimensional shape measurement system 1000, a PC 1 used for control, a monitor 2, a keyboard 3, and a input device 4 (e.g., mouse) are connected to the three-dimensional shape measuring apparatus 500 which is constructed of a three-dimensional shape measuring apparatus main body 500A and the controller 200. A three-dimensional shape measuring program for executing three-dimensional shape measurement by using the three-dimensional shape measuring apparatus 500 is installed in the control PC 1. Users can instruct settings and execution (e.g., image capture, measurement, etc.) of the three-dimensional shape measuring apparatus 500 by using the three-dimensional shape measuring program.

It is noted that, although the controller 200 is provided separately from the three-dimensional shape measuring apparatus main body 500A in the embodiment shown in FIG. 4, the controller may be integrally constructed with the three-dimensional shape measuring apparatus main body side. Alternatively, the function of the controller may be included in the control PC.

Figure 5:
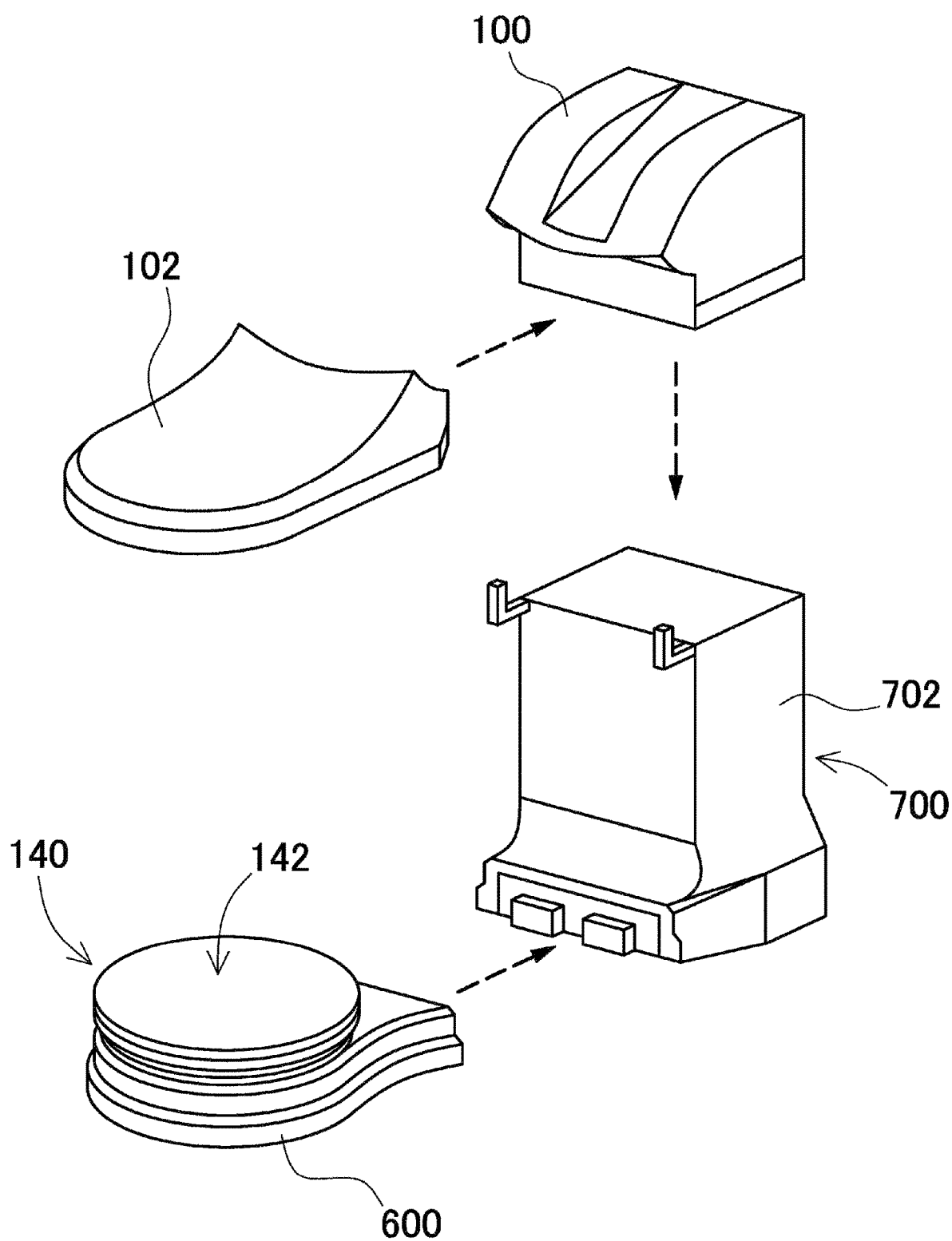
FIG. 5 is an exploded perspective view of a main body of the three-dimensional shape measuring apparatus shown in FIG. 4.

The three-dimensional shape measuring apparatus 500 includes the measurer 100, a support 700, the mount 600, and a light-shielding cover 102. The measurer 100, the support 700, the mount 600, and the light-shielding cover 102 are constructed as detachable units as shown in an exploded perspective view of FIG. 5. According to this construction, these members are advantageous in terms of ease of maintenance and portability. The light-shielding cover 102 extends frontward of the photoreceptor 120 and the illuminator 110 to cover them, and is held above the placement surface 142 in an orientation spaced away from the placement surface 142 to intercept external light from the measurement area above the placement surface 142. The light-shielding cover 102 can be detached depending on a measurement object, and the basic minimum configuration for measurement is a combination of the measurer 100 and the mount 600.

The mount 600 includes the stage 140. This stage 140 includes the rotation stage part 143 for rotating the placement surface 142 on which the measurement object is placed as discussed above, and the translation stage part 141 for translating the placement surface 142. Here, the stage 140 is constructed of an XYθ stage which includes an XY stage as the translation stage part 141 mounted on the upper surface of a θ stage as the rotation stage part 143.

The mount 600 holds the measurer 100 in a vertical orientation through the support 700. In addition, the measurer 100 fixedly holds the illuminator 110 and the photoreceptor 120 in inclined orientations in which their optical axes are inclined with respect to the placement surface 142. To this end, the measurer 100 includes a fixer 125 which fixes the illuminator 110 and the photoreceptor 120. The fixer 125 is supported by a support stand 702 in an orientation in which the fixer 125 is spaced away from the mount 600 as discussed later with reference to FIG. 7. In addition, the fixer fixes the illuminator 110 and the photoreceptor 120 in inclined orientations in which their optical axes are inclined with respect to the placement surface 142. According to this arrangement, the measurement area to be measured with the measuring light is defined above the stage 140. In addition, the optical system such as the illuminator 110 and photoreceptor 120 is held in an orientation in which they face the measurement area obliquely downward.

The support 700 couples the mount 600 and the measurer 100 to each other. The measurer 100 is held by the support 700, and arranged above the stage 140. The measurer 100 includes the illuminator 110 and the photoreceptor 120 as an observation optical system as discussed above. The measurer 100 is held with respect to the placement surface 142 of the stage 140, which is arranged in the mount 600, not vertically above the placement surface 142 but in an orientation in which the measurer 100 faces the placement surface 142 obliquely downward. According to this arrangement, there is an advantage that the shapes of upper and side surfaces of the measurement object can easily obtained by a single measurement operation. In particular, to acquire height-directional information, the information on the side surfaces which have large height difference in the measurement object is useful. On the other hand, it is difficult to grasp the entire shape of the measurement object based on only the side surfaces. For this reason, in order that the measurer 100 is brought in an orientation in which the measurer 100 can see the measurement object from a point which is located obliquely above the measurement object so that both the upper surface which can provide easy grasp of the entire exterior shape and the side surfaces which can provide easy grasp of height information can be obtained by a single measurement operation, it is useful to hold the measurer 100 in an orientation in which the measurer 100 is inclined with respect to the placement surface 142. In the embodiment shown in a side view of FIG. 6, the measurer 100 is held an inclined orientation in which the optical axes of the illuminator 110 and the photoreceptor 120 of the measurer 100 form an angle of approximately 45° with respect to the placement surface 142 of the XYθ stage. According to this arrangement, the measurer 100 is coupled to the mount 600 by the support 700 to maintain a bird's eye view of the measurement object at 45°. As a result, the measurer 100 constantly sees the placement surface 142 at a fixed angle from a fixed position, and the positional relationship between the three axes of XYθ as the driving axes of the placement surface 142 and the observation optical system is kept fixed.

Figure 7:
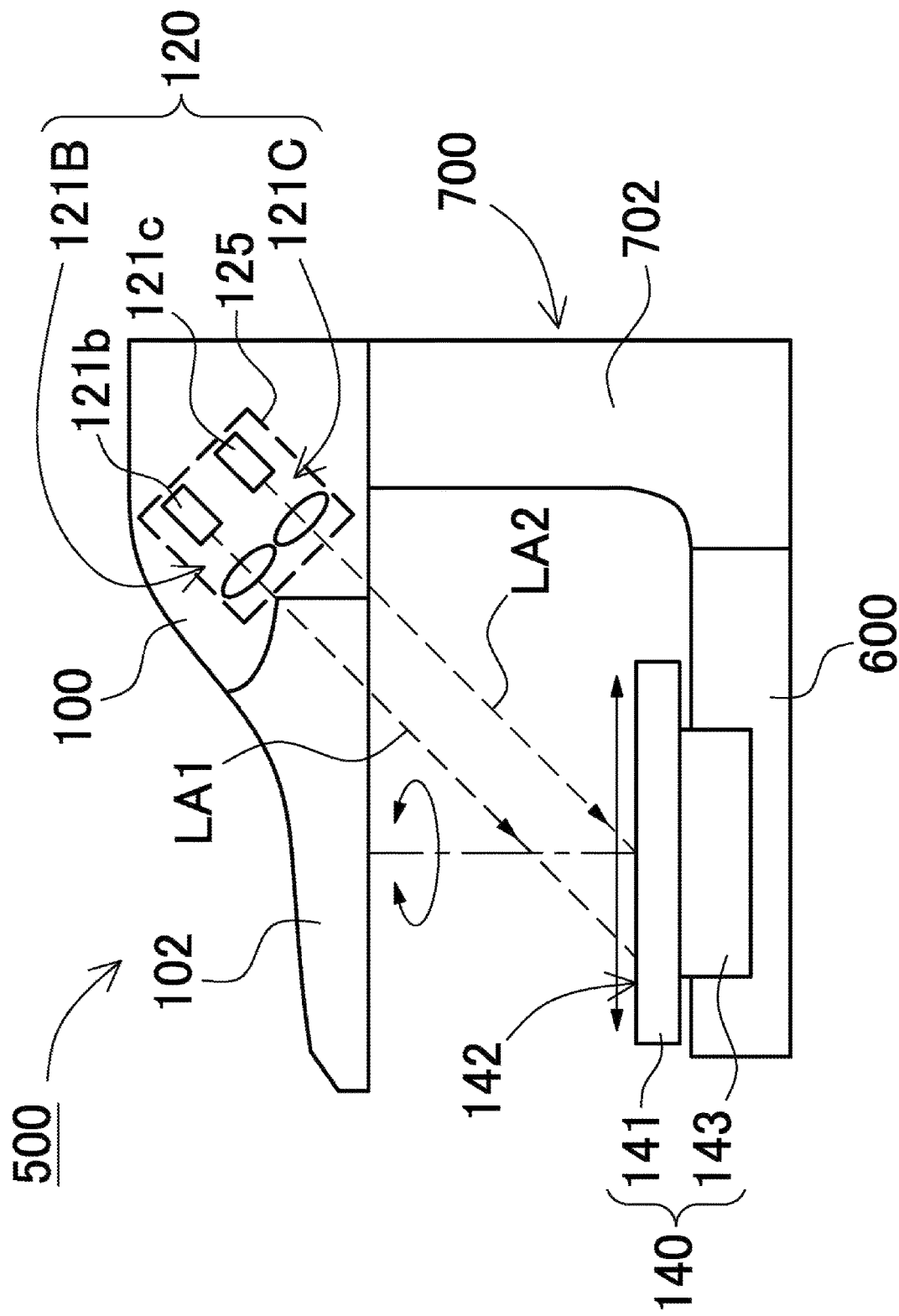
FIG. 7 is a side view of the three-dimensional shape measuring apparatus which includes a plurality of photoreceptors having a scaling factor different from each other.

The photoreceptor 120 may include two or more optical systems having a different scaling factor. Such an exemplary photoreceptor is shown in FIG. 7. In this example, the photoreceptor 120 includes a first optical system having a first scaling factor and a second optical system having a second scaling factor higher than the first scaling factor. According to this, because the optical systems having a different scaling factor, one of their corresponding fields of view can be selected in accordance with a size of a measurement object WK which is placed on the placement surface 142. In this example, first and second photo-receiving devices 121b and 121c which are optically connected to the first and second optical systems respectively are provided as photo-receiving devices. Hereinafter, the first optical system and the first photo-receiving device 121b are occasionally referred together to as a first camera 121B, and the second optical system and the second photo-receiving device 121c are occasionally referred together to as a second camera 121C. In the case in which two or more photo-receiving devices are prepared, and the photo-receiving devices independently capture images by using their own optical system, image-capturing processes for processing images captured by the optical systems can be performed in parallel so that the processing speed can be improved and optical coupling can be simplified. However, two or more optical systems may be optically coupled to a single photo-receiving device.

The first and second optical systems are arranged so that their optical axes are parallel to each other. First and second optical axes LA1 and LA2 of the first and second optical systems are both inclined approximately 45° with respect to the placement surface 142. Here, the second optical system having a higher scaling factor, that is, the second camera 121C is aligned with the first camera 121B as the first optical system, and arranged on the lower side of the first camera 121B in the fixer 125. According to this arrangement, because when the optical system is switched from the first optical system to the second optical system the viewpoint moves to the closer side of a measurement object WK, there is an advantage that users can relatively easily grasp the viewpoint change. More exactly, in the case in which a measurement object WK placed on the placement surface is large in the first optical system having a larger field of view (lower scaling factor), or on the other hand in the case in which a measurement object WK placed on the placement surface is small in the second optical system having a smaller field of view (higher scaling factor), the measurement object WK can be entirely included in their fields of view under the whole rotation of the measurement object WK in either case.

(XYθ Stage)

Figure 8:
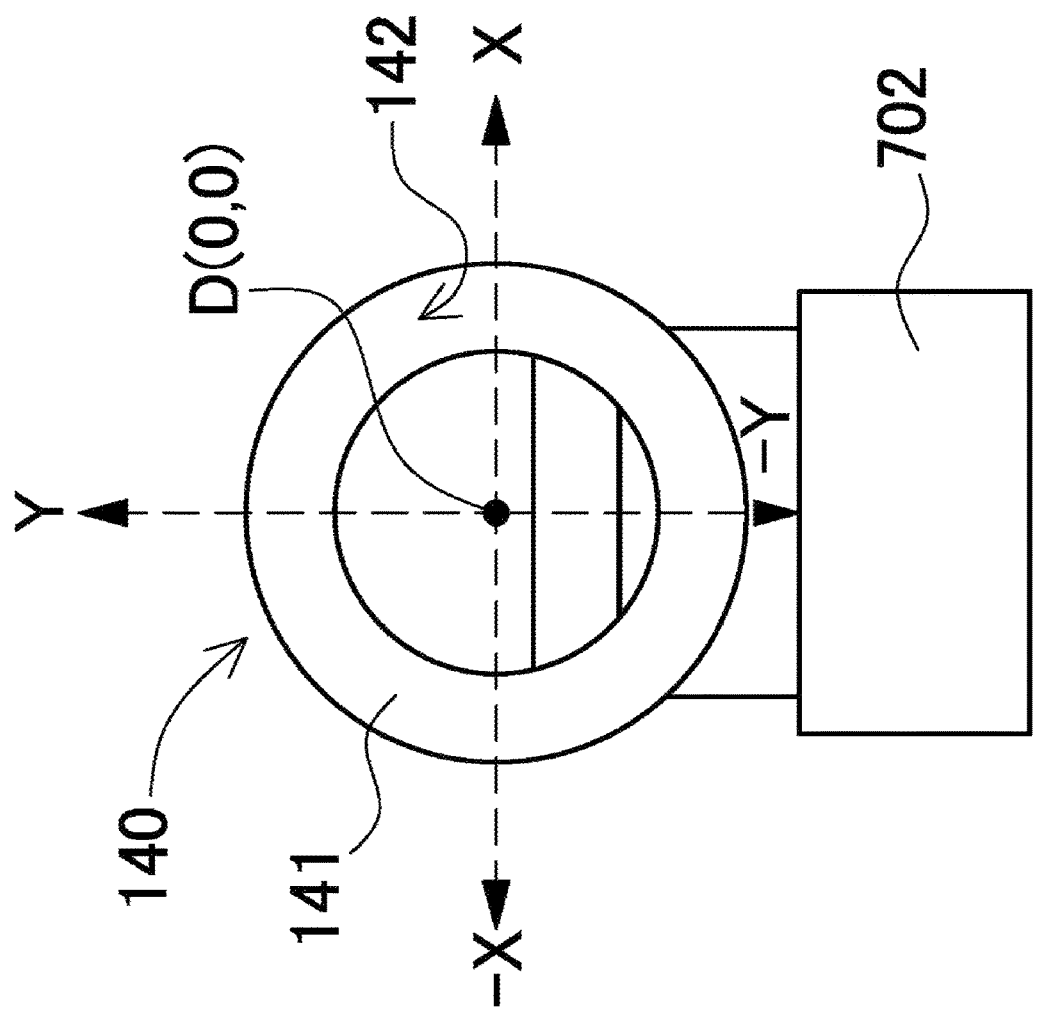
FIG. 8 is a plan view showing driving directions of a placement surface.
Figure 9:
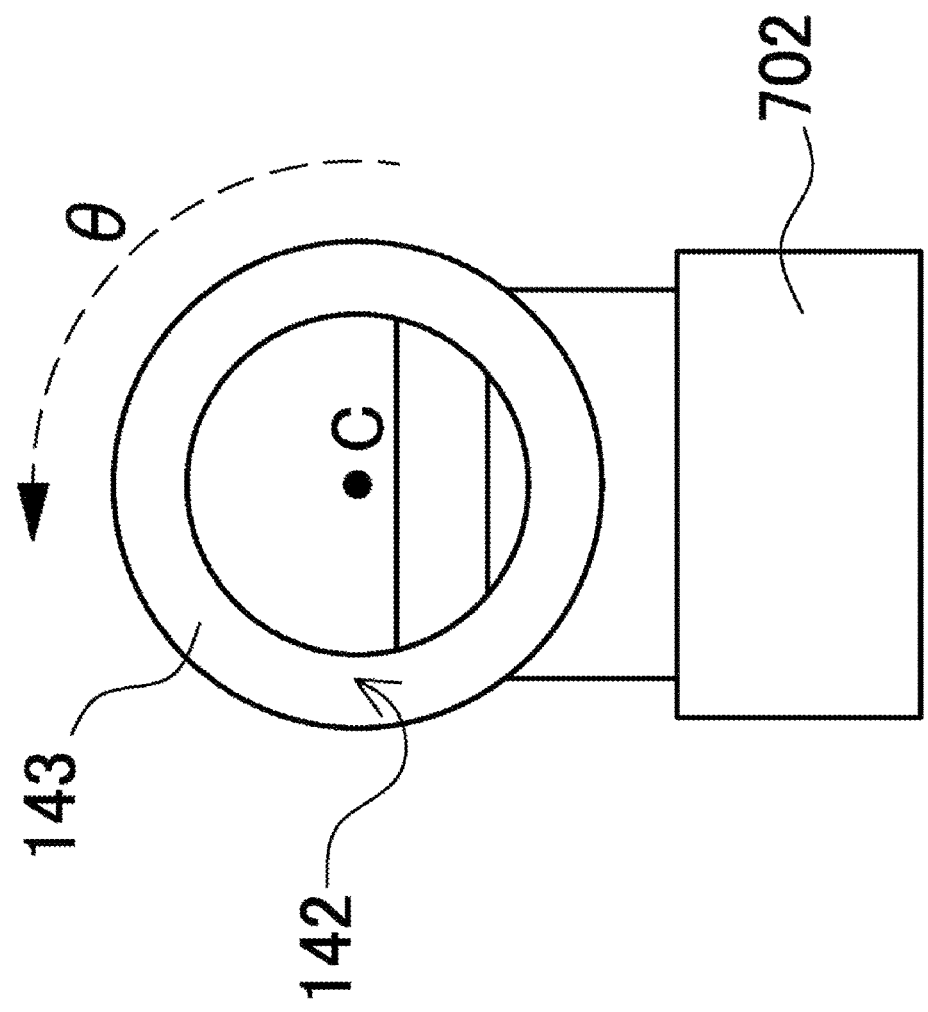
FIG. 9 is a plan view showing driving directions of the placement surface.

Exemplary configuration of the mount 600 is now described with reference to FIGS. 7 to 9. In the embodiment shown in FIG. 7, the XYθ stage includes the θ stage as the rotation stage part 143 which is fixed on the mount 600, and the XY stage as the translation stage part 141 which is placed on the θ stage. Also, the rotation stage part 143 is arranged so that its rotation axis intersects both the optical axes of the first and second optical systems at an angle of 45°. The translation stage part 141 placed on the rotation stage part 143 has a structure in which the XY driving axes rotate together with rotation of the rotation stage part 143 as shown in the plan views of FIGS. 8 and 9. The X and Y axes in which the translation stage part 141 can be moved are shown in FIG. 8. The θ direction in which the rotation stage part 143 can rotate is shown in FIG. 9. According to this arrangement in which the translation stage part 141 is placed on the rotation stage part 143, the optical axis of the measurer 100 and the rotation axis of the rotation stage part 143 can easily have a fixed relationship in which they are mechanically secured to each other. In addition, stage driving axes in the coordinate system in the observation space of the measurer 100 can be grasped by calibration of a moving direction of the translation stage part 141, and calibration of a rotational direction about the stage rotation axis when necessary.

Also, as shown in FIG. 8, the reference position relating to the movement of the translation stage part 141 is a position with respect to which the translation stage part is translated, for example. Typically, the point of origin D (0, 0) in the XY plane is defined as the reference position. In addition, a point C shown in FIG. 9 is the center of rotational movement in the θ direction, and agrees with the rotation axis of the rotation stage part 143 in the case of FIG. 9. In the case in which the translation stage part 141 is arranged on the rotation stage part 143 so that the point C agrees with the point D, the movement of the translation stage part 141 can be easily controlled.

Figure 10:
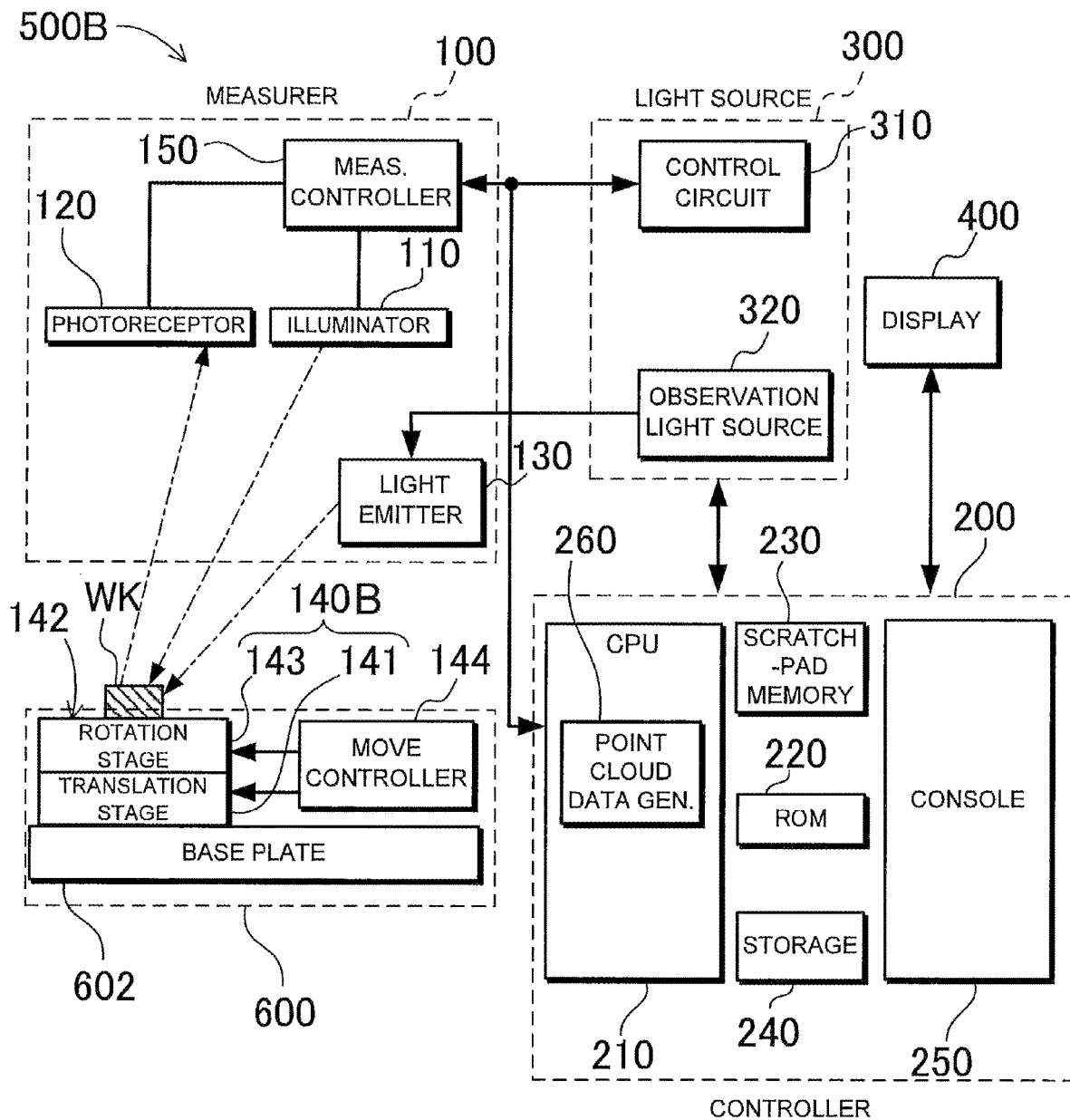
FIG. 10 is a block diagram showing a three-dimensional shape measuring apparatus according to a second embodiment.

However, the stage 140 in the present invention is not limited to this arrangement, the rotation stage part 143 may be arranged on the upper surface of the translation stage part 141 as shown in a three-dimensional shape measuring apparatus 500B according to a second embodiment shown in FIG. 10, for example. Also, according to this arrangement of the stage 140, all-directional full 3D data of a measurement object which partially extends off the observation visual field can be similarly obtained by similar measurement and superposition.

In addition, in the arrangement in which the rotation stage part 143 and the translation stage part 141 are provided together, to rotate the rotation stage part 143, it is preferable that the translation stage part 141 is returned to the predetermined reference position prior to rotation of the rotation stage part 143. In this case, it is possible to avoid increase of a rotation radius of the stage 140 on which a measurement object placed, and to avoid unintentional collision of the measurement object with other members. The reference position is defined by the original position of the XY plane on which the translation stage part 141 is moved, for example. Alternatively, the reference position may be defined by another particular coordinate position. Additionally, the rotation stage part 143 and the translation stage part 141 are not moved at the same time so that one of the stages is moved without moving another stage. In this case, collision detection and collision prevention can be easily provided, and as a result the safety can be improved.

(Three-Dimensional Shape Data Representing Three-Dimensional Shape of Measurement Object)

(1) Shape Measurement by Triangulation Method

Figure 11:
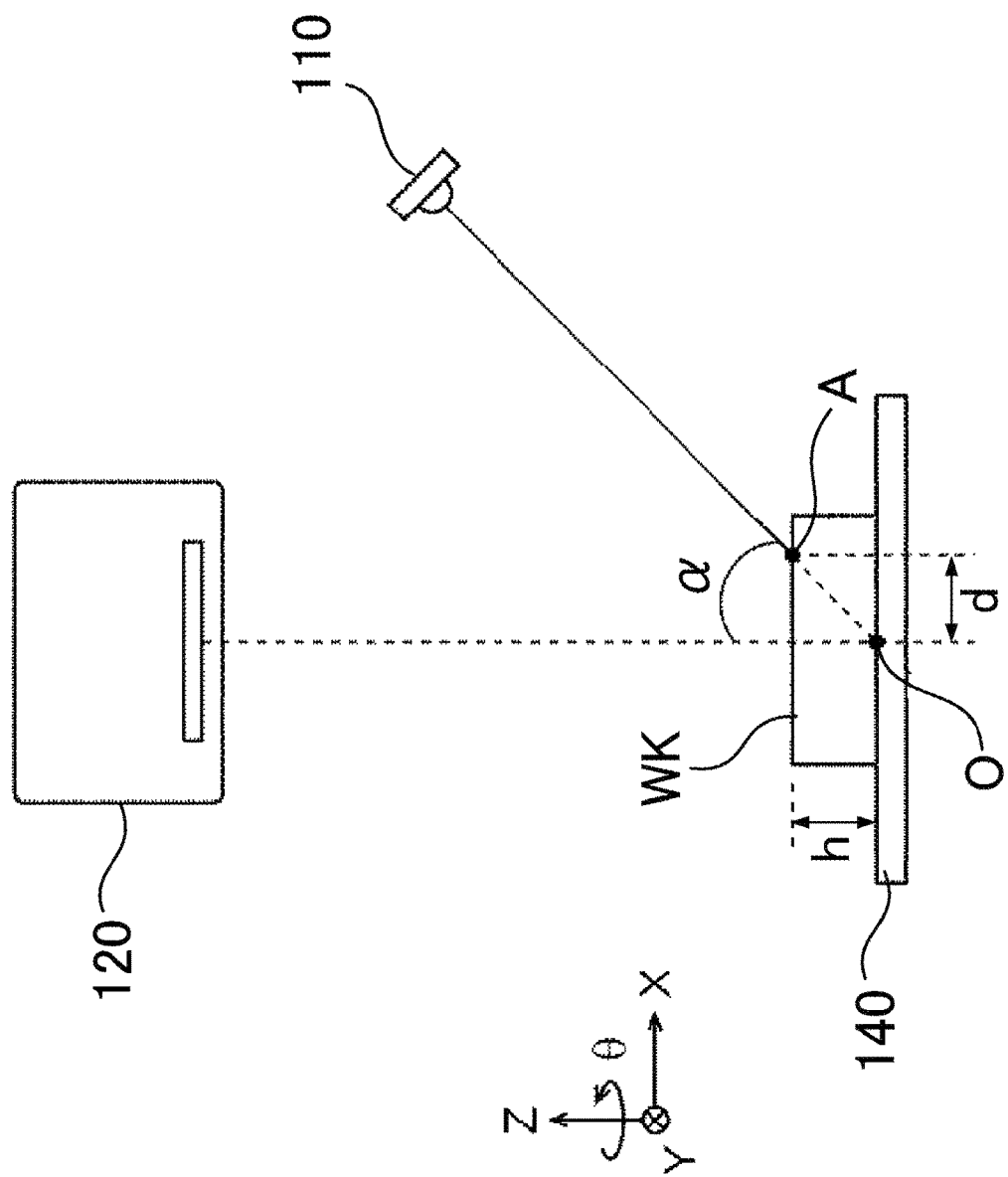
FIG. 11 is a diagram illustrating the principle of the triangulation method for explanation.

Shape measurement by using a triangulation method is described below with reference to FIGS. 11 to 16D. In the three-dimensional shape measuring apparatus according to this embodiment, the measurer 100 obtains height information for measuring a shape of a measurement object WK by using a triangulation method. It is noted that actual measurement can be conducted by the CPU side (e.g., point cloud data generator 260) as well as by the measurer 100. FIG. 11 is a diagram illustrating the principle of a triangulation method for explanation. The X, Y, Z, and θ directions which are defined similarly to a device coordinate system are shown by arrows in FIG. 11, and in FIGS. 12A to 12B, 13A to 13D, 14A to 14C, and 16A to 16D with reference to which the shape measurement will be discussed later.

As shown in FIG. 11, the optical axis of the measuring light emitted by the illuminator 110 and the optical axis of the measuring light incident on the photoreceptor 120 (optical axis of the photoreceptor 120) form a predetermined angle α. The angle α is greater than zero and smaller than 90°.

If a measurement object WK is not placed on the stage 140, a measuring light emitted by the illuminator 110 is reflected at the point O on the placement surface 142 of the stage 140, and is then incident on the photoreceptor 120. On the other hand, if a measurement object WK is placed on the stage 140, a measuring light emitted by the illuminator 110 is reflected at a point A on the surface of the measurement object WK, and is then incident on the photoreceptor 120.

Where the distance in the X direction between the point O and the point A is defined as d, the height h of the point A on the measurement object WK with respect to the placement surface 142 of the stage 140 is given by h=d/tan (a). The CPU 210 of the PC 200 measures the distanced between the point O and the point A in the X direction based on pixel data of the measurement object WK which is provided by the control circuit board 150. In addition, the CPU 210 calculates the height h of the point A on the surface of the measurement object WK based on the measured distance d. Based on calculation of the height of every point on the surface of the measurement object WK, coordinates of any point which is illuminated with the measuring light can be defined by the device-coordinate system. Accordingly, a three-dimensional shape of the measurement object WK can be measured.

In order to illuminate all the points on the surface of the measurement object WK with measuring light, the measuring light which has various patterns is emitted by the illuminators 110 shown in FIG. 2. The patterns of measuring light are controlled by the pattern generator 112 shown in FIG. 2. The patterns of measuring light are described below.

(2) First Pattern of Measuring Light

Figure 12A:
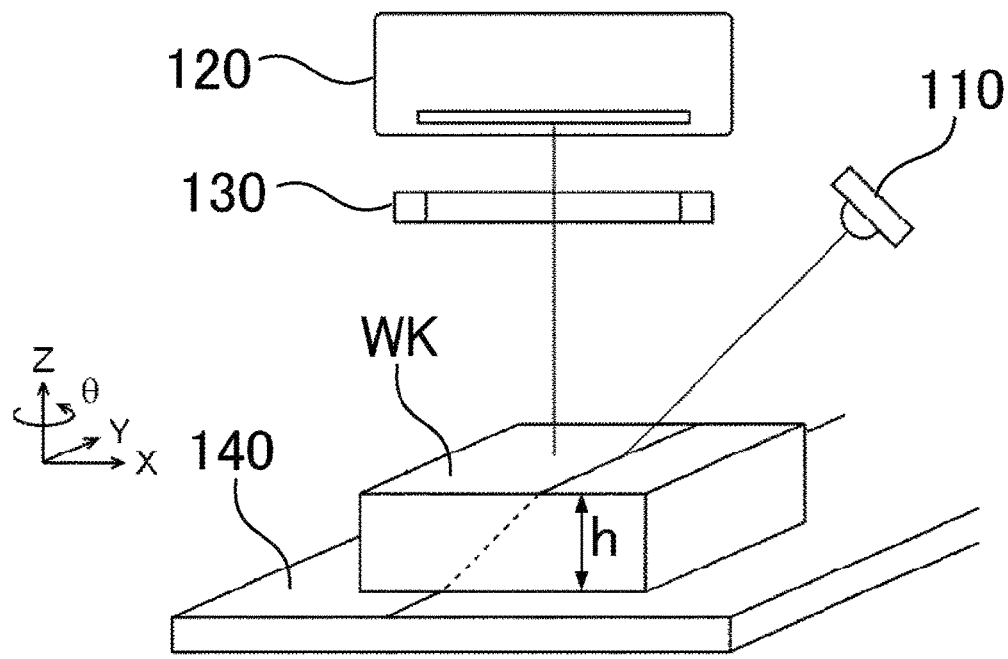
FIGS. 12A to 12B are diagrams for explanation of a first pattern of measuring light.
Figure 12B:
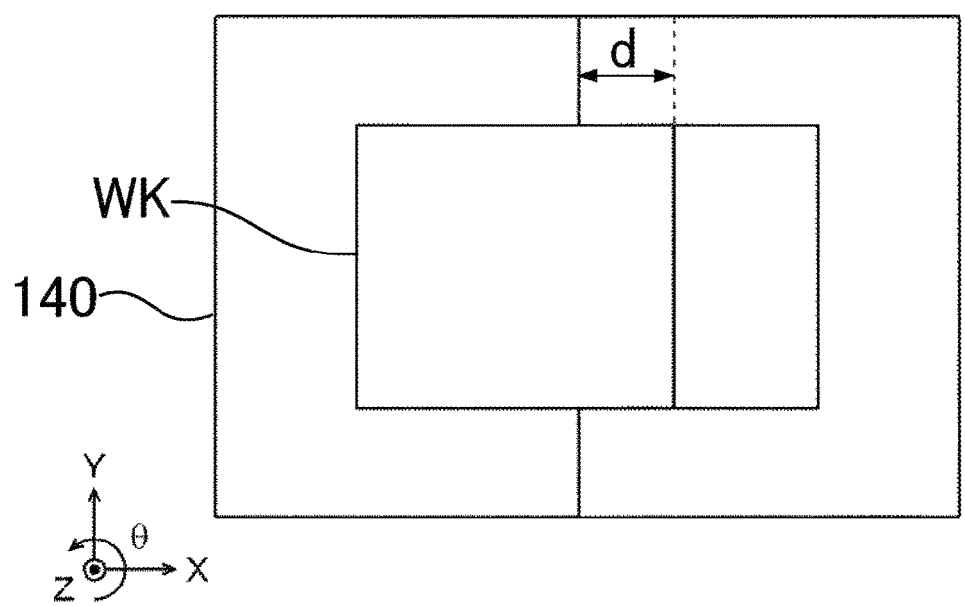

FIGS. 12A to 12B are diagrams for explanation of a first pattern of measuring light. FIG. 12A shows the measurement object WK on the stage 140 which is illuminated with the measuring light by the illuminator 110. FIG. 12B is a plan view of the measurement object WK which is illuminated with the measuring light. As shown in FIG. 12A, measuring light having a first pattern which has a straight line shape extending parallel to the Y direction on a plane parallel to the Y direction (hereinafter, referred to as line-shaped measuring light) is emitted by the illuminator 110. In this case, as shown in FIG. 12B, a part on the stage 140 which is illuminated with the line-shaped measuring light is shifted in the X direction by a distance d corresponding to a height h of the surface of the measurement object WK from a part on the surface of the measurement object WK which is illuminated with the line-shaped measuring light. Accordingly, the height h of the measurement object WK can be calculated by measuring the distance d.

If the surface of the measurement object WK includes a plurality of parts which extend in the Y direction and have a different height from each other, the heights h of the plurality of parts, which extend in the Y direction, can be calculated by measuring the aforementioned distances d corresponding to these parts.

In addition, after the distances d corresponding to the plurality of parts, which extend in the Y direction, at one position in the X direction, the line-shaped measuring light which extends parallel to the Y direction is moved in the X direction so that the CPU 210 shown in FIG. 1 measures distances d corresponding to the plurality of parts, which extend in the Y direction, at other positions in the X direction. As a result, the heights h of the plurality of parts of the measurement object WK, which extend in the Y direction, at different positions in the X direction can be calculated. For this reason, the heights h of all the points on the surface of the measurement object WK can be calculated by scanning an area wider than a dimension in the X direction of the measurement object WK in the X direction with the line-shaped measuring light. Consequently, a three-dimensional shape of the measurement object WK can be measured.

(3) Second Pattern of Measuring Light

FIGS. 13A to 13D are diagrams for explanation of the second pattern of measuring light. As shown in FIGS. 13A to 13D, measuring light having a second pattern which includes a straight lines extending parallel to the Y direction on a plane parallel to the Y direction and whose intensity sinusoidally varies in the X direction (hereinafter, referred to as sinusoidal measuring light) is emitted at two or more different times (four times in this embodiment) by the illuminator 110.

Figure 13A:
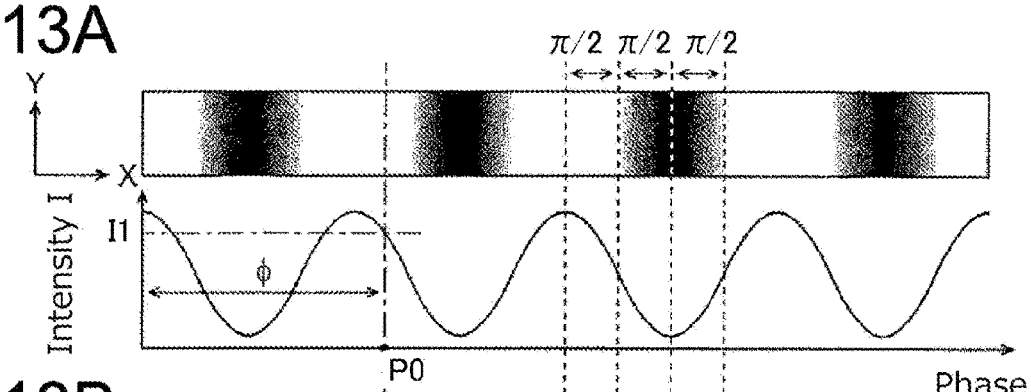
FIGS. 13A to 13D are diagrams for explanation of a second pattern of measuring light.

FIG. 13A shows sinusoidal measuring light which is emitted at first time. The sinusoidal measuring light which is emitted at first time has intensity at an arbitrary position P0 on the surface of the measurement object WK having an initial phase $\varphi$. When the sinusoidal measuring light is emitted, the photoreceptor 120 receives light reflected on the surface of the measurement object WK. The intensity value of the received light is measured based on pixel data of the measurement object WK. The intensity of the light reflected at the position P0 on the surface of the measurement object WK is defined as I1.

Figure 13B:
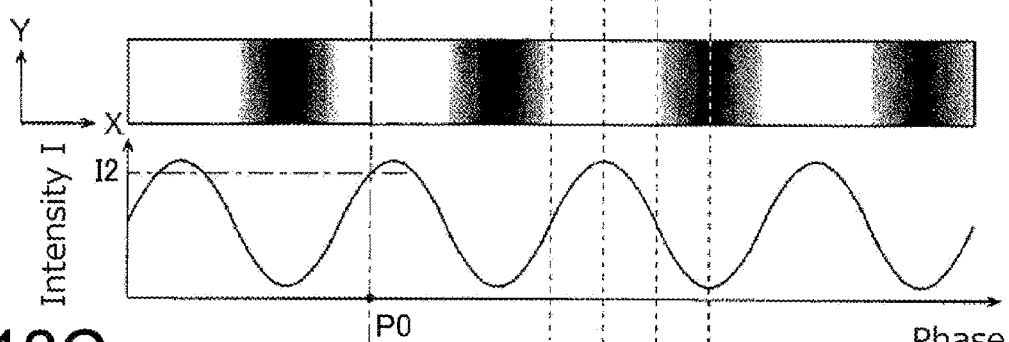

FIG. 13B shows sinusoidal measuring light which is emitted at second time. The sinusoidal measuring light which is emitted at second time has intensity at the position P0 on the surface of the measurement object WK having a phase ($\varphi+\pi/2$). When the sinusoidal measuring light is emitted, the photoreceptor 120 receives light reflected on the surface of the measurement object WK. The intensity value of the received light is measured based on pixel data of the measurement object WK. The intensity of the light reflected at the position P0 on the surface of the measurement object WK is defined as I2.

Figure 13C:
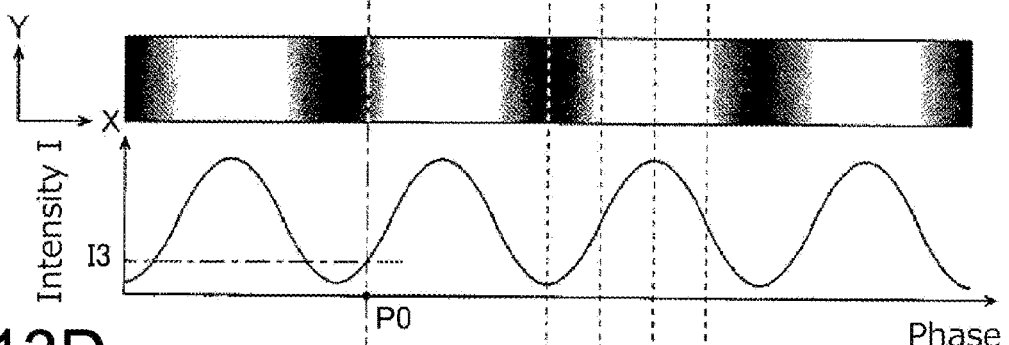

FIG. 13C shows sinusoidal measuring light which is emitted at third time. The sinusoidal measuring light which is emitted at third time has intensity at the position P0 on the surface of the measurement object WK having a phase ($\varphi+\pi$). When the sinusoidal measuring light is emitted, the photoreceptor 120 receives light reflected on the surface of the measurement object WK. The intensity value of the received light is measured based on pixel data of the measurement object WK. The intensity of the light reflected at the position P0 on the surface of the measurement object WK is defined as I3.

Figure 13D:
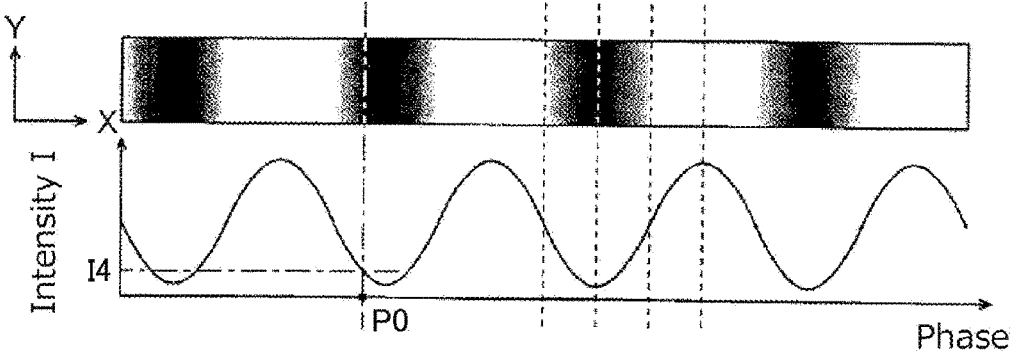

FIG. 13D shows sinusoidal measuring light which is emitted at fourth time. The sinusoidal measuring light at fourth time has intensity at the position P0 on the surface of the measurement object WK having a phase ($\varphi+3\pi/2$). When the sinusoidal measuring light is emitted, the photoreceptor 120 receives light reflected on the surface of the measurement object WK. The intensity value of the received light is measured based on pixel data of the measurement object WK. The intensity of the light reflected at the position P0 on the surface of the measurement object WK is defined as I4.

The initial phase $\varphi$ is given by $\varphi=\tan-1[(I1-I3)/(I2-I4)]$. The height h at an arbitrary position on the measurement object WK is calculated from the initial phase $\varphi$. According to this method, initial phases $\varphi$ at all the positions of the measurement object WK can be easily calculated at high speed and by four measurement operations of intensity of light. It is noted that the initial phase $\varphi$ can be calculated by emitting patterns of measuring light having a different phase at least three time and measuring intensity of the received light. A three-dimensional shape of the measurement object WK can be measured by calculating heights h of all the positions on the surface of the measurement object WK.

(4) Third Pattern of Measuring Light

FIGS. 14A to 14C are diagrams for explanation of a third pattern of measuring light. As shown in FIGS. 14A to 14C, measuring light having a third pattern which includes straight lines extending parallel to the Y direction on a plane parallel to the Y direction and aligned side by side in the X direction (hereinafter, referred to as striped measuring light) is emitted at two or more different times (sixteen times in this embodiment) by the illuminator 110. That is, in the striped measuring light, straight light and dark parts which extend parallel to the Y direction are alternately arranged in the X direction.

When the striped measuring light is emitted at first time, the photoreceptor 120 receives light reflected on the surface of the measurement object WK. The intensity value of the received light is measured based on pixel data in an image of the measurement object WK which is captured at first time. FIG. 14A shows the first captured image of the measurement object WK corresponding to the striped measuring light at first time (first striped measuring light).

Second striped measuring light has a pattern including light and dark parts which are shifted by one unit in the X direction from the first striped measuring light. When the striped measuring light is emitted at second time, the photoreceptor 120 receives light reflected on the surface of the measurement object WK. The intensity value of the received light is measured based on pixel data in an image of the measurement object WK which is captured at second time.

Third striped measuring light has a pattern including light and dark parts which are shifted by one unit in the X direction from the second striped measuring light. When the third striped measuring light is emitted at third time, the photoreceptor 120 receives light reflected on the surface of the measurement object WK. The intensity value of the received light is measured based on pixel data in an image of the measurement object WK which is captured at third time.

The intensity values of received light corresponding to fourth striped measuring light to sixteenth striped measuring light are measured based on pixel data in images of the measurement object WK which are captured at fourth to sixteenth times, respectively, by repeating the similar measurement operation. All the positions on the surface of the measurement object WK are illuminated with striped measuring light by emitting striped measuring light whose interval in the X direction is sixteen units at sixteen times. In this case, FIG. 14B shows the seventh captured image of the measurement object WK corresponding to the striped measuring light at seventh time (seventh striped measuring light). FIG. 14C shows the thirteenth captured image of the measurement object WK corresponding to the striped measuring light at thirteenth time (thirteenth striped measuring light).

Figure 15:
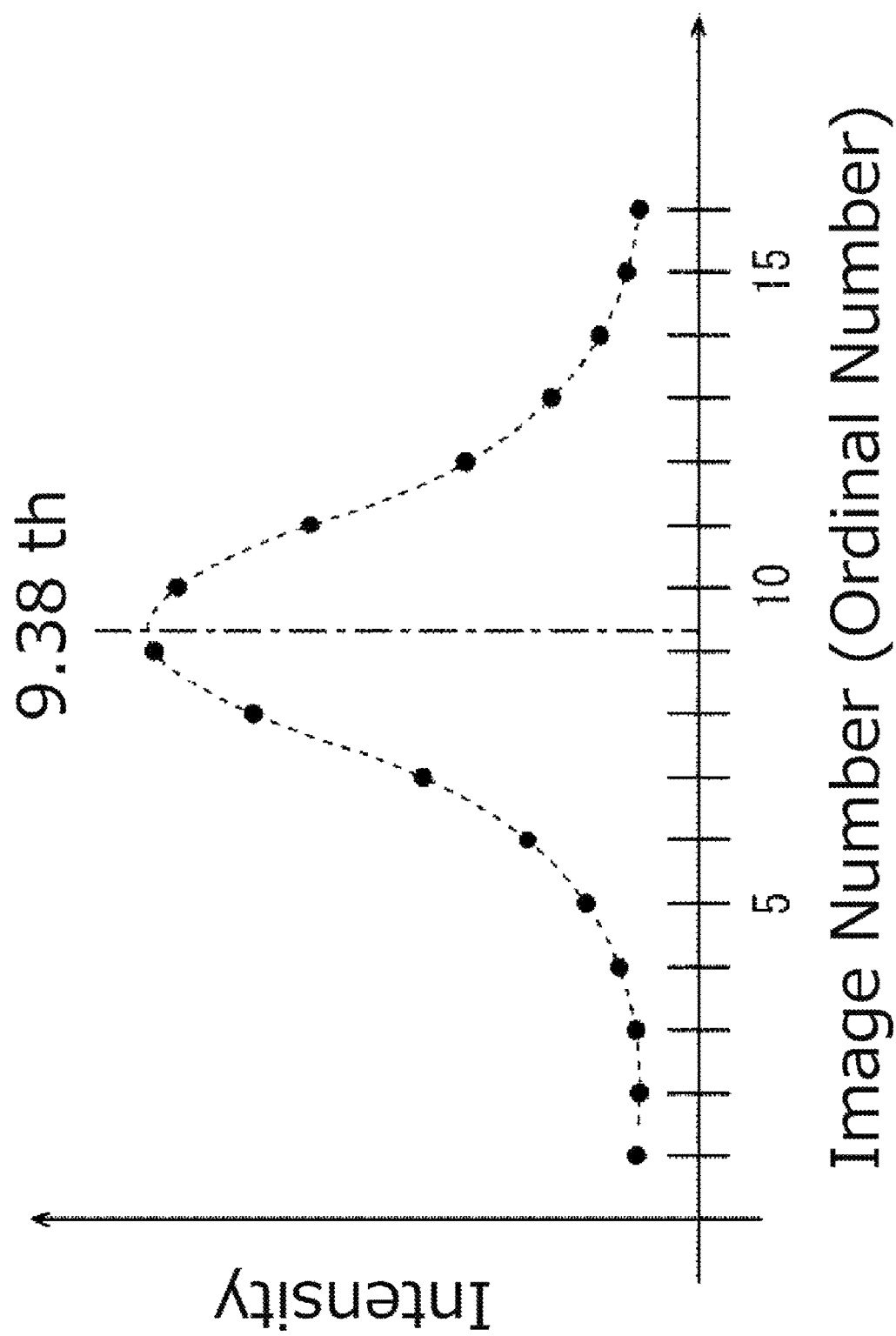
FIG. 15 is a graph showing a relationship between timing of image capture at a particular position (ordinal number) and intensity of received light.

FIG. 15 is a graph showing a relationship between timing of image capture at a particular position (ordinal number) and intensity of received light. The horizontal axis in FIG. 15 represents image capture timing number, and vertical axis represent intensity of received light. As discussed above, the first to sixteenth captured images of all the parts of the measurement object WK are generated. In addition, intensity values of light corresponding to the first to sixteenth captured images are measured.

As shown in FIG. 15, a scatter diagram is obtained by plotting light intensity values of each pixel in the captured images corresponding to the image capture timing numbers. The number (ordinal number) of the captured image in which the maximum light intensity will be obtained can be estimated with high accuracy of less than 1 by fitting Gaussian curve, spline curve, or parabola to the obtained scatter diagram. In an example shown in FIG. 15, it is estimated that the maximum intensity will be obtained at a 9.38th fictitious captured image which is assumed positioned between ninth and tenth captured images based on the curve shown by dotted line which is obtained by the fitting.

In addition, the maximum light intensity can be estimated based on the curve obtained by the fitting. The height h at each position on the measurement object WK based on the number of the estimated captured image in which the maximum light intensity will be obtained at the position of the measurement object WK. According to this method, the three-dimensional shape of the measurement object WK can be measured based on light intensity values which have sufficiently high S/N (signal/noise) ratio. As a result, the shape measurement accuracy of a measurement object WK can be improved.

It is noted that relative height (relative value of height) at each position of the surface of the measurement object WK is measured in the shape measurement of a measurement object WK using measuring light having alternating light-and-dark intervals such as sinusoidal measuring light or the striped measuring light. The reason is that all the straight lines (stripes) parallel to the Y direction which constitute their pattern cannot be distinguished from each other, and as a result there is uncertainty about an integral multiple of one period interval ($2\pi$) between the straight lines; therefore, the absolute phase cannot be determined. For this reason, data of the measured height may be complemented by well-known unwrapping on the assumption that height at one position on the measurement object WK continuously varies from height at other positions adjacent to the one position.

(5) Fourth Pattern of Measuring Light

FIGS. 16A to 16D are diagrams for explanation of a fourth pattern of measuring light. As shown in FIGS. 16A to 16D, measuring light having a fourth pattern which includes light and dark parts formed of areas having a straight line shape extending parallel to the Y direction on a plane parallel to the Y direction and aligned side by side in the X direction (hereinafter, referred to as coding measuring light) is emitted at two or more different times (four times in this embodiment) by the illuminator 110. The total percentage of the light part(s) or dark part(s) is 50%.

In this embodiment, the surface of the measurement object WK is divided into a plurality of areas (sixteen areas in the example of FIGS. 16A to 16D) which are aligned side by side in the X direction. Hereinafter, the areas into which the measurement object WK is divided in the X direction are referred to as first to sixteenth areas.

Figure 16A:
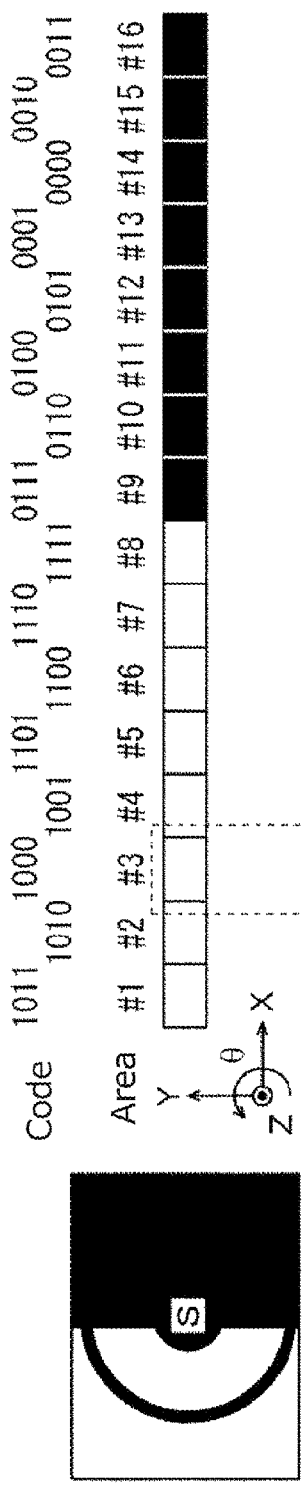
FIGS. 16A to 16D are diagrams for explanation of a fourth pattern of measuring light.

FIG. 16A shows coding measuring light which is emitted at first time. The coding measuring light which is emitted at first time includes a light part with which the first to eighth areas of the measurement object WK are illuminated. Also, the coding measuring light which is emitted at first time includes a dark part corresponding to the ninth to sixteenth areas of the measurement object WK. Accordingly, in the coding measuring light which is emitted at first time, the light part and the dark part extend parallel to the Y direction, and are aligned side by side in the X direction. In addition, the percentage of the light part and dark part of the coding measuring light which is emitted at first time is 50% each.

Figure 16B:
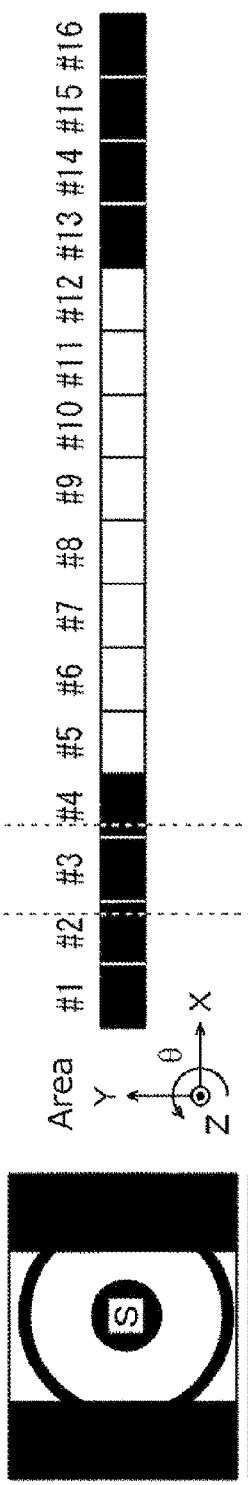

FIG. 16B shows coding measuring light which is emitted at second time. The coding measuring light which is emitted at second time includes a light part with which the fifth to twelfth areas of the measurement object WK are illuminated. Also, the coding measuring light which is emitted at second time includes dark parts corresponding to the first to fourth and the thirteenth to sixteenth areas of the measurement object WK. Accordingly, in the coding measuring light which is emitted at second time, the light part and the dark parts extend parallel to the Y direction, and are aligned side by side in the X direction. In addition, the percentage of the light part or the total percentage of the dark parts of the coding measuring light which is emitted at second time is 50%.

Figure 16C:
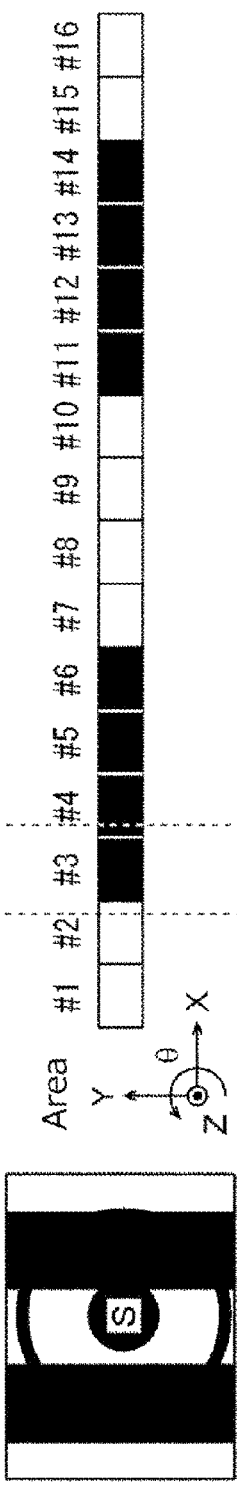

FIG. 16C shows coding measuring light which is emitted at third time. The coding measuring light which is emitted at third time includes light parts with which the first and second areas, the seventh to eighth areas, and the fifteenth and sixteenth areas of the measurement object WK are illuminated. Also, the coding measuring light which is emitted at third time includes dark parts corresponding to the third to sixth and the eleventh to fourteenth areas of the measurement object WK. Accordingly, in the coding measuring light which is emitted at third time, the light parts and the dark parts extend parallel to the Y direction, and are aligned side by side in the X direction. In addition, the total percentage of the light parts or the total percentage of the dark parts of the coding measuring light which is emitted at second time is 50% each.

Figure 16D:
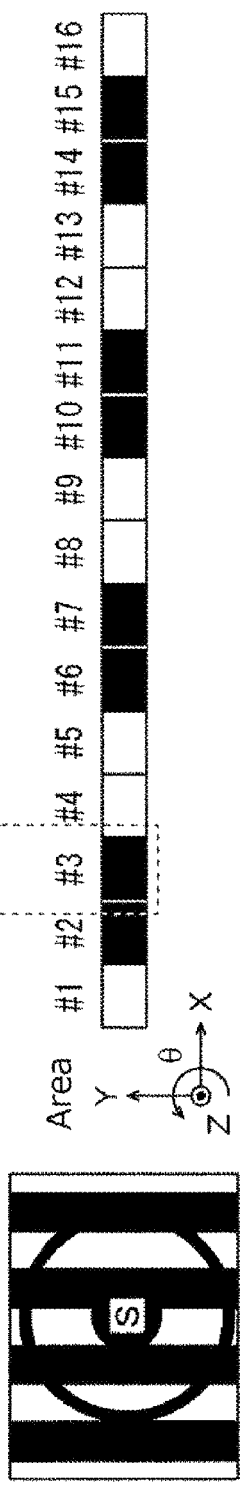

FIG. 16D shows coding measuring light which is emitted at fourth time. The coding measuring light which is emitted at fourth time includes light parts with which the first area, the fourth and fifth areas, the eighth and ninth areas, the twelfth and thirteenth areas, and the sixteenth area of the measurement object WK are illuminated. Also, the coding measuring light which is emitted at fourth time includes dark parts corresponding to the second and third areas, the sixth and seventh areas, the tenth and eleventh areas, and the fourteenth and fifteenth areas of the measurement object WK. Accordingly, in the coding measuring light which is emitted at fourth time, the light parts and the dark parts extend parallel to the Y direction, and are aligned side by side in the X direction. In addition, the total percentage of the light parts or the total percentage of the dark parts of the coding measuring light which is emitted at fourth time is 50% each.

Logic "1" is assigned to areas corresponding to the light part(s) of the coding measuring light, and logic "0" is assigned to areas corresponding to the dark part(s) of the coding measuring light. Also, a bit pattern which is a combination of logic 1 and logic 0 corresponding to the first to fourth cording measuring light with which each area of the measurement object WK is illuminated is referred to as code. In this case, the first area of the measurement object WK is illuminated with coding measuring light of code "1011". Accordingly, the first area of the measurement object WK is coded into code "1011".

The second area of the measurement object WK is illuminated with coding measuring light of code "1010". Accordingly, the second area of the measurement object WK is coded into code "1010". The third area of the measurement object WK is illuminated with coding measuring light of code "1000". Accordingly, the third area of the measurement object WK is coded into code "1000". Similarly, the sixteenth area of the measurement object WK is illuminated with coding measuring light of the code "0011". Accordingly, the sixteenth area of the measurement object WK is coded into code "0011".

As discussed above, the measurement object WK is illuminated with coding measuring light at a plurality of times so that only one of the digits of code corresponding to one area of the measurement object WK differs in one bit "1" from an area adjacent to the one area. In other words, measurement object WK is illuminated with coding measuring light at a plurality of times so that the light and dark parts alternately appear like Gray code.

The photoreceptor 120 receives light reflected in the areas on the surface of the measurement object WK. Code of each area of the measurement object WK which varies in accordance with the presence of the measurement object WK is obtained by measuring code of received light, and as a result a distance corresponding to the distance d shown in FIG. 11 can be calculated. Here, because of the feature of the measuring method using the coding measuring light in which the aforementioned code appears only once in the X axial direction in the image, an absolute value of the distance d can be calculated. Accordingly, the absolute height (absolute value of height) at an area of the measurement object WK can be calculated. A three-dimensional shape of the measurement object WK can be measured by calculating heights of all the areas on the surface of the measurement object WK.

In the aforementioned description, although the surface of the measurement object WK is divided in the X direction into the sixteen areas, and the coding measuring light is emitted at four times by the illuminator 110, the present invention is not limited to this. The surface of the measurement object WK may be divided in the X direction into N bits of code or 2N areas (N is a natural number), and the illuminator 110 may emit coding measuring light at N times. In the aforementioned description, N is set to 4 for ease of understanding. In the later-discussed generation process, N is set to 8. Accordingly, the surface of the measurement object WK is divided in the X direction into 256 areas.

In the shape measurement of the measurement object WK using the coding measuring light, the minimum spatial resolution is the minimum separation in distance between the light and dark parts of the coding measuring light at which they can be distinguished, that is, the distance corresponding to one pixel. Accordingly, in the case in which the number of pixels in the X direction in the field of view of the photoreceptor 120 is 1024 pixels, when a measurement object WK has a height of 10 mm, the height can be measured with 10-μm resolution which is obtained by 10 mm/1024=~(approximately equal to) 10 μm. Absolute values of height of a measurement object WK can be calculated with higher resolution by combining the shape measurement using the coding measuring light has low resolution but can calculate absolute values with the shape measurement using the sinusoidal measuring light or the striped measuring light which cannot calculate absolute values but has high resolution.

In particular, in the shape measurement of a measurement object WK using the striped measuring light shown in FIGS. 14A to 14C, the resolution can be improved to 1/100 pixel. Here, in the case in which the number of pixels in the X direction of the photoreceptor 120 in the field of view is 1024 pixels, a resolution of 1/100 pixel corresponds to division of the surface of the measurement object WK into the approximately 100000 areas in the X direction. For this reason, absolute values of height of a measurement object WK can be calculated with higher resolution by combining the shape measurement using the coding measuring light with the shape measurement using the striped measuring light.

Generally, the aforementioned method for scanning a measurement object WK with line-shaped measuring light is called light-section method. On the other hand, the methods for illuminating a measurement object WK with sinusoidal measuring light, striped measuring light, or coding measuring light are classified as pattern projection method. In addition, in the pattern projection method, the method for illuminating a measurement object WK with sinusoidal measuring light or striped measuring light are classified as phase shift method, and the method of illuminating a measurement object WK with coding measuring light is classified as space encoding method.

In the phase shift method, when the sinusoidal measuring light or striped measuring light as alternate projection pattern is emitted, height of a measurement object WK is calculated based on the phase difference between a phase corresponding to a measurement object WK absence case which is calculated based on a reception amount of light reflected at a reference height position and a phase corresponding to a measurement object WK presence case which is calculated based on a reception amount of light reflected at a surface of the measurement object WK. In the phase shift method, because alternate stripes cannot be distinguished from each other, there is uncertainty about an integral multiple of one period interval ($2\pi$) between the stripes, and a disadvantage that their absolute phase cannot be found. However, there are advantages that the measurement time is relatively short because the number of images to be captured is smaller as compared with the light-section method, and that the resolution of measurement is high.

On the other hand, in the space encoding method, code of each area of a measurement object WK which varies in accordance with the presence of the measurement object WK is obtained. Absolute height of the measurement object WK can be obtained by calculating difference at areas between obtained code and code corresponding to a measurement object WK absence case. Also in the space encoding method, there are advantages that the measurement can be conducted based on a relatively small number of images, and that absolute height can be obtained. However, resolution of measurement by the space encoding method is limited as compared with the phase shift method.

These projection methods have their own disadvantages and advantages but all of them use the principle of triangulation. Based on image data of a measurement object WK which is illuminated with measuring light having the aforementioned patterns (hereinafter, referred to as pattern image data), point cloud (point cloud) data representing a three-dimensional shape of the measurement object WK is generated.

In the following description, point cloud data representing a three-dimensional shape of a measurement object WK is referred to as three-dimensional shape data. The three-dimensional shape data includes positional information of a plurality of points on a surface of a measurement object WK. Positional information represents coordinates in the X, Y, and Z directions, for example. In this case, an arbitrary point in the three-dimensional shape data is defined as Pn (n is a natural number), Pn can be represented by coordinate values in the device-coordinate system (Xn, Yn, Zn), for example. It is noted that the three-dimensional shape data may be represented by surface information data which is generated based on the point cloud data, and may include other format of data such as polygon mesh. An image representing a three-dimensional shape of a measurement object WK (hereinafter, referred to as three-dimensional shape image) can be displayed based on the three-dimensional shape data.

In this embodiment, the three-dimensional shape image refers to an image in which the three-dimensional shape data is projected onto an arbitrary flat plane in which its two-dimensional coordinate system is defined, and through which users' instructions for definition of measurement area is received. Users can define the flat plane on which the three-dimensional shape data is projected as a viewing direction from which the measurement object WK viewed (position of the photoreceptor 120 with respect to the measurement object WK). Correspondingly, the orientation of the measurement object WK which is represented as the three-dimensional shape image is changed.

(6) Combination of Plurality Sets of Three-Dimensional Shape Data

If the position and orientation of a measurement object WK with respect to the illuminator 110 and the photoreceptor 120 are fixed, the measurement object WK is only partially illuminated with measuring light. Also, only a part of light which is reflected at a part of measurement objects WK is incident on the photoreceptor 120. For this reason, the three-dimensional shape data over a wide area of the surface of the measurement object WK cannot be obtained. To address this, images of a measurement object WK can be captured in two or more different directions by changing the position or orientation of the measurement object WK so that two or more sets of three-dimensional shape data corresponding to the two or more different directions are obtained, and the two or more sets of three-dimensional shape data can be combined.

(Stage Shifting Function)

In the three-dimensional shape measuring apparatus according to this embodiment, the accuracy of measurement higher than the spatial resolution or measurement capability of the three-dimensional shape measuring apparatus is realized by moving the stage 140 by a very small amount of distance by using the movement controller 144.

As a technique for obtaining a three-dimensional shape of a measurement object in a non-contact manner, a so-called stripe projection method in which a pattern of light is projected onto a measurement object WK from the illuminator 110 so that three-dimensional coordinates of the measurement object WK are obtained by using phase information of stripes of the pattern of light as shown in FIG. 2 is known. The stripe-projection method is conducted based on the principle of light section, and illuminates a measurement object with a plurality of stripes of light at the same time, and as a result the measurement by the stripe-projection method is faster than the light section method which illuminates a measurement object with a line of light.

As techniques for obtaining a three-dimensional shape by using the stripe projection, two or more methods can be provided including such as space encoding method, multi-phase-interval pattern projection method, single shot projection method, and the like. In all these methods, a plurality of patterns of light are projected onto a measurement object so that their projection pattern images are captured by an imaging optical system which is arranged at a certain angle with respect to their projection direction, and phase information on every pixel in the image is calculated based on image analysis. Three-dimensional coordinate values which may include shape distortion can be obtained by analyzing the calculated phase information. The methods will be described.

(1. Space Encoding Method)

The space encoding method is also called Gray code method. The projection patterns used in the space encoding method refer to patterns providing a rule that, from the viewpoint that white and black in the projection pattern are considered as bits, if emphasis is placed on a particular image-capture pixel or projection pixel, the bit pattern of this particular pixel corresponding to a plurality of projection patterns is uniquely determined. Because such projection patterns are projected, the arrangement of projection pixels in the image-capture pixels can be uniquely determined. As a result, absolute coordinates relating to a shape of a measurement object are calculated. However, in the space encoding method, its spatial resolution which can distinguish positions in code is limited by the minimum spatial resolution (pixel pitch) of the projection device included in the pattern generator 112, for example, DMD, LCD, LCOS, or the like. Because the pixel pitch of photo-receiving devices is smaller than the pixel pitch of typical projection devices, as long as such a projection device is used, the spatial resolution of the space encoding method generally must be low. To complement such low spatial resolution due to the space encoding method, various methods are combined with each other. In this specification, methods which are combined with such space encoding method to complement low spatial resolution are referred to as relative phase complementary method. A sinusoidal phase shift method, multi-slit method, edge detection method, and the like can be used as the relative phase complementary method, for example. The methods will be described.

(a) Sinusoidal Phase Shift Method

In space encoding, phase information of a sine wave at pixels can be obtained by calculation relating to stripe pattern images in which emphasis is placed on every pixel as shown in FIGS. 13A to 14C. In addition, because the calculated phase information is moved amounts (phases) within one period interval of the sine wave, only relative moved amounts from an initial phase value of a light-and-dark pattern which includes a plurality of light and dark stripes are obtained. Accordingly, conversion into absolute phases can be executed by using phases which are obtained by the space encoding method.

In the sinusoidal phase shift method, a sinusoidal stripe pattern is projected onto a measurement object and is moved by a pitch shorter than the period interval of the sine wave at a plurality of time so that a plurality of stripe pattern images are captured. The phase values at the pixels are calculated based on the captured sinusoidal stripe pattern image, and are converted into their height values. Because the sine wave includes three unknown values, required images to be captured are at least three. Here, the phases are calculated by four image capturing operations in which the sine wave is shifted by one quarter the period interval of the sine wave ($\pi/2$) after each image capturing operation. In the case in which images are captured at four shift positions with a pitch of $\pi/2$, the calculating formula can be very simple. In addition, because the number of required images to be captured in this method is very small (at least three), a three-dimensional shape can be measured at high speed.

(b) Multi-Slit Method

The multi-slit method is also called luminance peak method. In the multi-slit method, as shown in FIGS. 14A to 14C and FIG. 15, a measurement object is illuminated with pattern illumination which includes a plurality of thin stripes (multi slits), and images of the measurement object are captured at different positions (at a plurality of times) which are shifted by a pitch smaller than slit width from one another. In the multi-slit method, because the pattern is moved by a micro displacement so that all the pixels are illuminated with slit light, the number of images to be captured will be large, and as a result this method is not suitable for high-speed use. For example, in the case of sixteen pixel interval, three-pixel width slit light, and one-pixel moving pitch, the number of images to be captured is sixteen. On the other hand, when image capture timing (image's position in a sequence) in which the maximum luminance is obtained is calculated for every pixel by interpolation, because data on high luminance is always used, there is an advantage that the accuracy can be easily stably improved irrespective for any measurement objects.

In the multi-slit method, a measurement object is simultaneously illuminated with a plurality of binary stripes (only light and dark stripes) or Gaussian stripes (each stripe has a Gaussian luminance distribution) as a pattern, and images of the measurement object are captured at different projection positions which are shifted by a smaller distance from one another. The luminance variation of the captured images is analyzed for every pixel on which emphasis is placed so that the luminance peak coordinate of the emphasized pixel is estimated, and as a result its peak position is calculated as phase value. Here, the peak position is calculated as count unit of image's position in a sequence. It is noted that the estimated peak position is not represented by an integer but by a number including fractions (e.g., 2.689-th) and can be considered equivalent to time axis. Also, the calculated phase value represents only relative phase information with respect to the first captured image, and complements the space encoding by shift of phase corresponding to the minimum bit width of spatial height (the number of images to be captured) similar to the sinusoidal phase shift method.

(c) Edge Detection Method

In the edge detection method, a plurality of light and dark stripes as a pattern are projected onto a measurement object so that images of the measurement object are captured at positions in which the pattern is shifted by a micro displacement one after another, and from the captured stripe pattern images the boundaries of the light-and-dark pattern in the image (i.e., the edge) are extracted. The edges to be detected can be defined by typical zero crossings of the luminance gradient or luminance crossings in the right and left light-and-dark pattern. The edge coordinates calculated in the stripe pattern image are defined as phase value of this pattern. Because the value also represents only a relative shift amount with respect to an initial projecting position, fine absolute coordinate calculation (unwrapping) can be provided by combining the edge detection method with the space encoding method.

It has been illustratively described that the space encoding method is combined with relative position complementary methods as discussed above. However, the method of obtaining a three-dimensional shape by using stripe-projection method in the present invention is not limited to the space encoding method, other methods can be used. The following description will describe a multi-phase-interval pattern projection method and a single shot projection method in this order.

(2. Multi-Phase-Interval Pattern Projection Method)

In a multi-phase-interval pattern projection method, patterns which have a different phase are separately projected onto a measurement object so that stripe pattern images are captured at positions in which the projected pattern is shifted by a micro displacement one after another. After relative phase values are calculated for example by the sinusoidal phase shift method for every period interval pattern, absolute coordinates are uniquely determined by combining the results corresponding to the different phase patterns. In the case of multi-phase-interval pattern projection method, the space encoding method can be unnecessary, and as a result there are advantages of less possibility of occurrence of boundary error in each fixed space code area, and the like.

(3. Single Shot Projection Method)

Single shot projection methods estimate phases based on one image. A representative exemplary method is provided by Fourier transformation. In the Fourier transform, a projected stripe pattern image is Fourier transformed, and from the obtained spectrum only a part of the spectrum around the carrier frequency of the stripe-projection pattern is filtered, and is then shifted toward an origin point and inverse Fourier transformed so that phases are calculated by evaluating the arctangent of the ratio of the imaginary and real parts. Because the phases which are obtained by the Fourier transformation are also folded by the stripe pattern interval similar to the sinusoidal phase shift method and the like, they are necessarily complemented by phase unwrapping such as space encoding method to calculate absolute coordinates.

When a shape of a measurement object is measured by the aforementioned stripe projection method by using the gaging part 216b or the like, examples of the factors which determine reproducibility and minimum detection shape (resolution) of the measured shape can be provided by the resolution of the image pickup device which constitutes the photoreceptor 120 and the resolution of the projection device. The resolution of the image pickup device determines the space division capability (spatial resolution). On the other hand, the resolution of the projection device determines the projection pattern shifting resolution and the minimum width of the stripes which form the stripe-projection pattern, and therefore constitutes the factors which directly determine the reproducibility and resolution of the measured shape. Where such resolutions are determined by their corresponding member which are selected for the three-dimensional shape measuring apparatus or method, however, generally there is a difficulty that the resolution of the projection device is improved higher than the resolution of the image pickup device. For this reason, improvement of measurement capability of three-dimensional shape measuring apparatuses is conventionally limited by certain specifications, and largely depends on the specifications of devices which are selected for the three-dimensional shape measuring apparatus.

Contrary to this, the three-dimensional shape measuring apparatus according to this embodiment is aimed at realizing higher measurement reproducibility and resolution than those limited by its specifications without depending on its selected device configuration. Specifically, the translational movement of the translation stage part 141 by a very small moving pitch smaller than the minimum width of the projection pattern which can be projected on the stage 140 is controlled by independently controlling the projection devices of the illuminator 110 by using the movement controller 144. The point cloud data generator 260 then generates point cloud data representing a three-dimensional shape of a measurement object based on a plurality of projection pattern images. Accordingly, in the three-dimensional shape measurement of the measurement object, the measurement accuracy can be improved to a physical spatial resolution smaller than the physical spatial resolution of projection patterns which can be generated by the illuminator 110 which projects the projection patterns.

The three-dimensional shape measuring method which uses the stage shifting function is described below. A measurement object is first placed on the stage 140. It is in this placement, the illuminator 110 illuminates the measurement object which is positioned at an initial position on the translation stage part 141 with measuring light having a predetermined projection pattern so that the photoreceptor 120 receives measuring light reflected at the measurement object to capture a projection pattern image.

Subsequently, the translation stage part 141 is translated by a predetermined moving pitch by using the movement controller 144. The moving pitch is smaller than the minimum width of the projection pattern which can be projected on the placement surface 142 by the projection devices of the illuminator 110. Subsequently, the illuminator 110 illuminates the measurement object with measuring light at the position after the translational movement of the translation stage part 141 so that the photoreceptor 120 receives measuring light reflected at the measurement object to capture a projection pattern image again. In addition, the translation stage part 141 is moved by the moving pitch, and a projection pattern image is similarly captured. This operation is repeated a predetermined number of times so that projection pattern images are captured at their corresponding position after the translation stage part is moved by the moving pitch. Exterior shape information continuously representing a three-dimensional shape of the measurement object is obtained by combining sets of point cloud data representing the three-dimensional shape of the measurement object which are generated at the positions based on the projection pattern images by the point cloud data generator 260 as discussed above. As a result, the exterior shape information of the measurement object can be obtained with high accuracy improved to a physical spatial resolution smaller than the physical spatial resolution of projection patterns which can be generated by the illuminator 110.

In particular, in the case in which pixels of the photo-receiving device which constitute the photoreceptor 120 are smaller than pixels of the projection device, the aforementioned stage shifting function is effective, and fine three-dimensional measurement can be realized.

The projection pattern of the illuminator 110 is preferably a striped projection pattern including a plurality of lines which are aligned parallel to each other. On the other hand, the movement controller 144 translates the translation stage part 141 by the moving pitch in a direction intersecting the lines (i.e., the stripes) which constitute the stripe-projection pattern projected on the stage 140. Accordingly, the accuracy can be improved similar to the case in which the stripe-projection pattern is shifted by a micro displacement smaller than the spatial resolution of the projection device in the stripe alignment direction, and as a result the measurement accuracy can be improved without hardware improvement of the projection device to high precision.

Also, the moving direction of the translation stage part 141 may be parallel to the illumination direction in which the illuminator emits measuring light for the photoreceptor, in other words, an inclined direction in the triangulation. Alternatively, the translation stage part 141 may be moved in a direction away from the photoreceptor. Also, the moving direction of the translation stage part 141 can be determined based on the relationship between the translation stage part 141 and the support. For example, the translation stage part 141 may be translated in a direction intersecting the depth direction in which the stage 140 is moved toward and away from the support as viewed in a plan view of the placement surface 142, that is, the X direction, by the movement controller 144. Accordingly, the accuracy can be improved similar to the case in which the projection pattern is shifted by a micro displacement smaller than the spatial resolution of the projection device, and as a result the measurement accuracy can be improved without hardware improvement of the projection device to high precision.

The moving pitch of the translation stage part 141 can be determined in accordance with the period interval of the stripe-projection pattern. For example, where the interval between the lines of the stripe-projection pattern adjacent to each other is defined as one period interval, projection pattern images corresponding to the number of divided parts into which one period interval is divided are additionally captured.

Also, the point cloud data generator 260 can convert, with reference to a position of the translation stage part 141 when one projection pattern image at an arbitrary position in the plurality projection pattern images, other projection pattern images into pixel values which are estimated on the presumption that they are generated at said position of the translation stage part 141, and generates the point cloud data based on the one projection pattern image and the estimated projection pattern images. In this case, in three-dimensional shape measurement of a measurement object, because an arbitrary position of one projection pattern image is added with other projection pattern image as pixel value in accordance with the sampling position, finer three-dimensional measurement can be realized.

In addition, the point cloud data generator 260 may convert the moving pitch of the stage 140 controlled by the movement controller 144 into a moving amount in the projection pattern image (e.g., corresponding number of pixels) to generate the point cloud data.

Alternatively, the point cloud data generator 260 can overlay the plurality of projection pattern images on each other in consideration of positions of the translation stage part 141 at which the plurality of projection pattern images are generated, and generates the point cloud data. In this case, a multiplexed fine image can be obtained by multiplexing a plurality of projection pattern images in accordance with their generated positions.

Also, the point cloud data generator 260 can measure a surface shape of the measurement object by calculating positions of the light and dark peaks which are included in each of the projection pattern images by using the phase shift method as discussed above. Here, a plurality of projection pattern images are captured at the same position of the translation stage part 141. That is, where the light and dark stripes which constitute the projection pattern alternately appear at period intervals, the pattern generator 112 generates a plurality types of projection patterns having a different phase so that projection pattern images corresponding to their phase are captured. For example, at the position in which the translation stage part 141 is positioned at a first position (e.g., initial position or the reference position), the illuminator 110 illuminates a measurement object with a plurality of projection patterns having a different phase at different timing so that the projection pattern images are captured at their corresponding timing. A set of the projection pattern images is defined as first pattern set.

On the other hand, a second pattern set as a set of the projection pattern images that are captured corresponding to a plurality of projection patterns having a different phase with which the illuminator 110 similarly illuminates the measurement object when the translation stage 141 is positioned at a second position which is shifted by the moving pitch from the first position. A plurality of pattern sets can be obtained by repeating this operation. For example, where one period interval of the stripe-projection pattern is defined $2\pi$, four pattern sets having a different phase shifted by $\pi/2$ which is one quarter of $2\pi$ from one another are obtained by the period interval shifting. Also, the point cloud data generator 260 can measure a surface shape of the measurement object by calculating positions of the light and dark peaks which are included in the projection pattern images of the pattern sets by using the phase shift method. Accordingly, where projection patterns having a different phase, because the phase pitch can be apparently reduced by using the translation stage part 141 to a pitch smaller than the pitch which can be physically provided by the projection device, and the peak position (in the case of the multi-slit method) or initial phase estimation (in the case of the sinusoidal phase shift method) can be calculated based on the reduced phase pitch, a three-dimensional shape can be measured with accuracy higher than the resolution of the projection device.

Also, in this case, the point cloud data generator 260 sorts the projection pattern images included in the plurality of pattern sets in phase shift amount order, and calculates positions of the peaks of the light and dark stripes based on the sorted projection pattern images by using the phase shift method. Accordingly, the peak positions can be easily estimated based on the sorted projection pattern images, and as a result the shape can be measured with accuracy higher than the resolution of the projection device.

Figure 17:
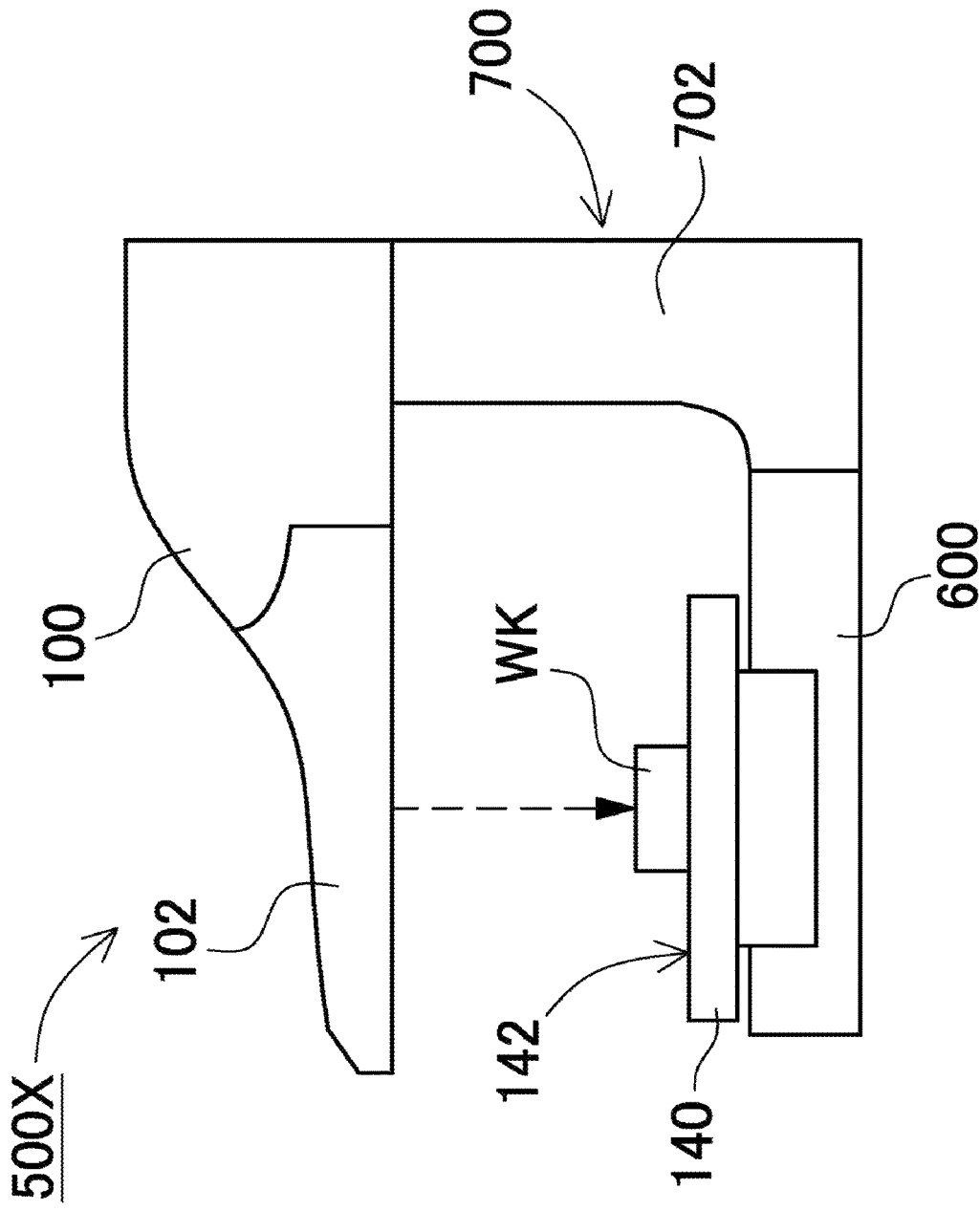
FIG. 17 is a block diagram showing a three-dimensional shape measuring apparatus of a comparative example.

Here, a three-dimensional shape measuring apparatus 500X which observes a measurement object from a position right above the measurement object shown in FIG. 17 is considered for the comparison. In this three-dimensional shape measuring apparatus 500X, the stage 140 can be moved in the height direction (Z direction), and both image-capture and projection systems use a telecentric optical system. In this arrangement, when the stage 140 is moved by a very small distance, i. e., micro displacement in the height direction, a measurement object WK which is placed in the placement surface 142 is moved by the micro displacement in the image capture system optical axis but in the telecentric range the position of the measurement object WK is not changed in a captured image. For this reason, at each of positions in the captured image, it can be considered that each pixel of the image pickup device sample the same point of the measurement object WK. Accordingly, when the stripe pattern is projected by the projection system, if the placement surface 142 is moved by a micro displacement in the height direction, the stripe-projection pattern is apparently moved by a micro displacement, and as a result the resolution can be improved higher than the resolution of the stripe-projection pattern by calculating the striped images at different heights as striped images in which the stripe-projection pattern is moved by a micro displacement and by combining these striped images with each other.

Figure 6:
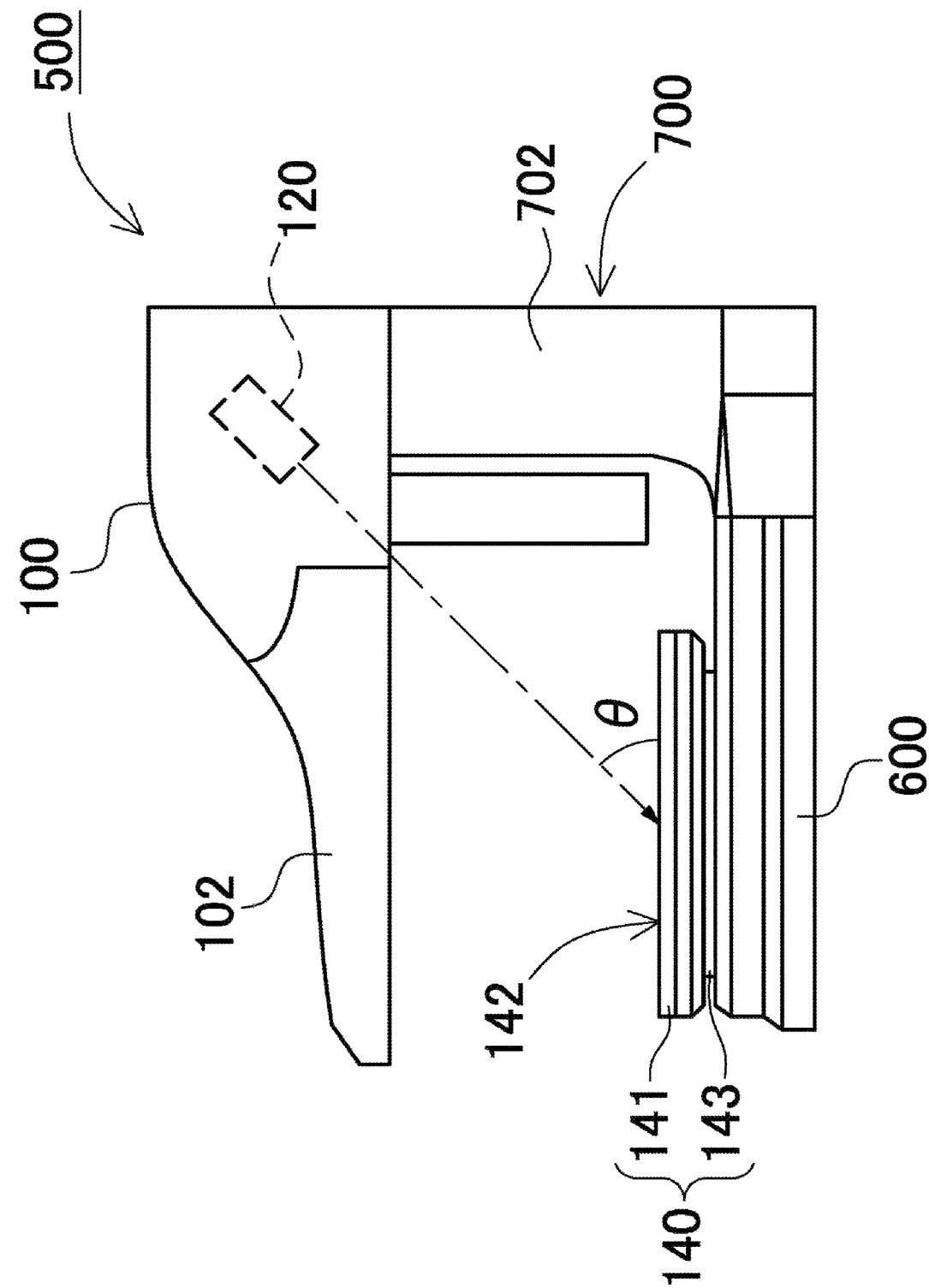
FIG. 6 is a side view of the main part of the three-dimensional shape measuring apparatus shown in FIG. 4.

Contrary to this, in this embodiment, as shown in FIG. 6, etc., because both the imaging and projection systems use a wide angle optical system having a certain angle of view, and a measurement object is observed in a slanting direction from the top, if the translation stage part 141 is moved and images are captured, the moving amount will vary depending on pixels in the image. That is, the moving amount will be greater in pixels that are positioned on the near side (close to the photoreceptor 120) in the image, and the moving amount will be smaller in pixels that are positioned on the far side (away from the photoreceptor 120). For this reason, even when the translation stage part 141 is moved by a micro displacement, because the moving amount varies depending on pixels, there is a problem that the images cannot be easily combined with each other. The following description will describe the stage shifting function which realizes measurement with resolution higher than the resolution of the pattern generator 112 by moving the placement surface 142 is by a very small amount in the three-dimensional shape measuring apparatus according to this embodiment.

(Details of Stage Shifting Function)

Figure 18:
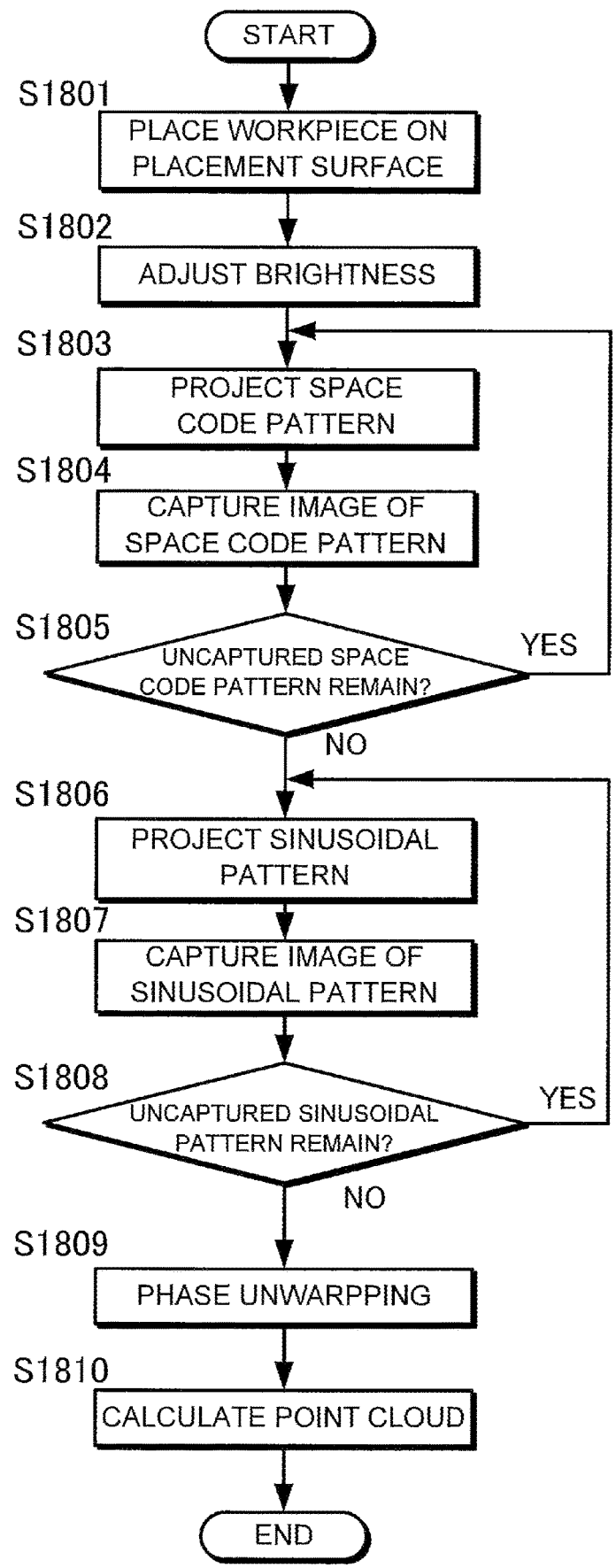
FIG. 18 is a flowchart illustrating the procedure of measurement in combination of a space encoding method and a sinusoidal phase shift method.

Here, among the aforementioned measuring methods, a method which combines the sinusoidal phase shift method with the space encoding method is described. It is noted that the measuring method of the present invention is not limited to this method but other measuring methods can be used. First, procedure which measures point cloud data by combining the space encoding method and the sinusoidal phase shift method when the placement surface 142 is fixed is described with reference to a flowchart of FIG. 18. Firstly, a measurement object is placed on the stage in Step S1801. Subsequently, in Step S1802, the brightness of the illumination light emitter 130 is adjusted if necessary. Subsequently, a space code pattern is projected in Step S1803, and an image of the space code pattern is captured in Step S1804. Subsequently, it is determined whether any uncaptured space code pattern remains or not in Step S1805, and if it remains the procedure returns to Step S1803 so that the aforementioned steps are repeated. On the other hand, if any uncaptured space code pattern does not remain, which in turn completes capture of images of all the space code patterns, the procedure goes to Step S1806 in which images of the sinusoidal patterns are similarly captured in Step S1807. Subsequently, it is determined whether any uncaptured sinusoidal pattern remains or not in Step S1808, and if it remains the procedure returns to Step S1806 so that the aforementioned steps are repeated. On the other hand, if any uncaptured sinusoidal pattern does not remain, which in turn completes capture of images of all the sinusoidal patterns, the procedure goes to Step S1809 in which phase unwrapping is performed, and then point cloud data is calculated in Step S1810 so that the procedure ends. According to this procedure, the point cloud data generator 260 generates the point cloud data representing a shape of the measurement object by combining the space encoding method and the sinusoidal phase shift method.

In the aforementioned sinusoidal phase shift method and the multi-slit method, the initial phase is estimated by sampling amounts of light projected on the measurement object at positions in which the stripe-projection pattern is shifted by a pixel unit of the photoreceptor 120. On the other hand, according to the stage shift measurement function, the estimation accuracy of the initial phase can be improved by substantially subdividing the interval of the phase shift.

(Photo-Receiving-Device Pixel Density Improving Function)

Also, in addition to this, an effect equivalent to improvement on pixel density of the photo-receiving device can be provided by estimating a phase between positions of pixels of the photo-receiving device (e.g., camera), which constitutes the photoreceptor 120, that are deviated less than one pixel from each other.

Which of the phase shift interval subdividing function or the photo-receiving-device pixel density improving function is more effective in shape measurement depends on relationships between the pixel size of the projection device, the resolution of the illumination-side optical system, the pixel size of the photo-receiving device, and the resolution of the light-reception-side optical system. For example, the case in which two light-reception-side optical systems having low and high scaling factors share one illumination-side optical system as shown in the exemplary arrangement is considered. In this case, on the high scaling factor side, because the pixel size of the projection device is too large relative to the light-reception-side pixel size and the resolution of the optical system, the quantization error will be very large. For this reason, reduction of the quantization error by the former, phase shift interval subdividing function is very effective.

On the other hand, on the low scaling factor side, because the pixel size of the projection device is not too large relative to the light-reception-side pixel size and the resolution of the optical system as compared with the high scaling factor side, the quantization error will be relatively small. For this reason, even if the phase shift interval is subdivided, the accuracy improvement cannot be expected as compared with the case of high scaling factor. However, if the light-reception-side optical system has an enough resolution relative to the pixel size of the photo-receiving device, there is a possibility that a shape can be measured in a smaller unit by the latter, photo-receiving-device pixel density improvement. It is noted that the aforementioned the phase shift interval subdividing function and photo-receiving-device pixel density improving function are not only alternatively used but also they can be used together.

(Method for Subdividing Phase Shift Interval by Stage Shift Measurement)

Figure 19:
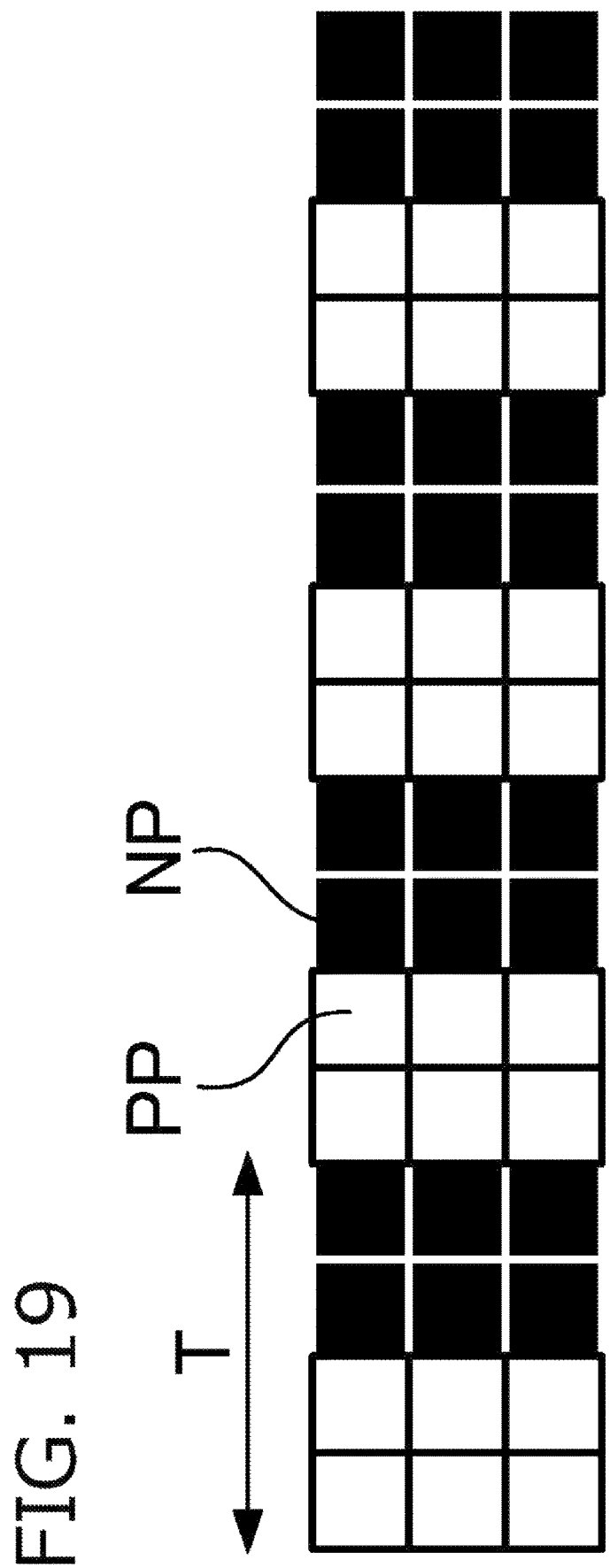
FIG. 19 is a schematic view showing an exemplary striped pattern for a sinusoidal phase shift method which is generated by a projection device.

In the case in which measuring light is projected by sinusoidal phase shift method by using the projection devices, each projection device often uses only two states (projection state and non-projection state). Specifically, a sinusoidal phase shift projection pattern is formed of a rectangular wave having a period interval T of four pixels of projection devices as shown in FIG. 19, for example. In this projection pattern including alternate stripes as shown in FIG. 19, projection pixels PP of two pixels and non-projection pixels NP of two pixels alternately appear. Four stripe-projection patterns which are equally shifted by one quarter the period interval ($\pi/2$) can be created by shifting the projection pattern shown in FIG. 19 by one pixel and projecting the shifted projection pattern as shown in FIGS. 20A to 20D. Four-point estimation by the sinusoidal phase shift method can be executed by capturing images of a measurement object onto which the four types of projection patterns are projected.

Figure 21:
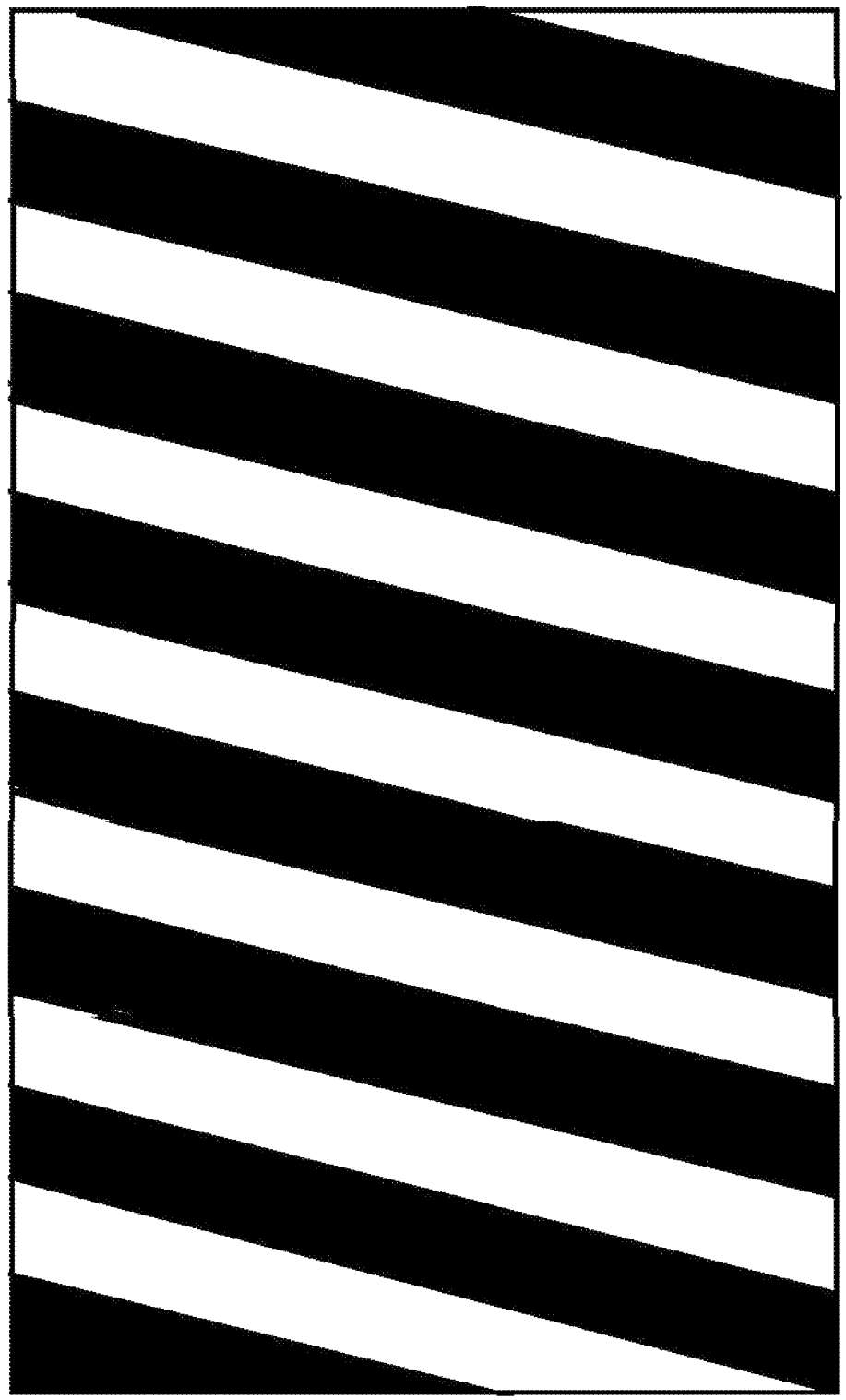
FIG. 21 is an image showing an exemplary projected rectangular wave pattern.
Figure 22A:
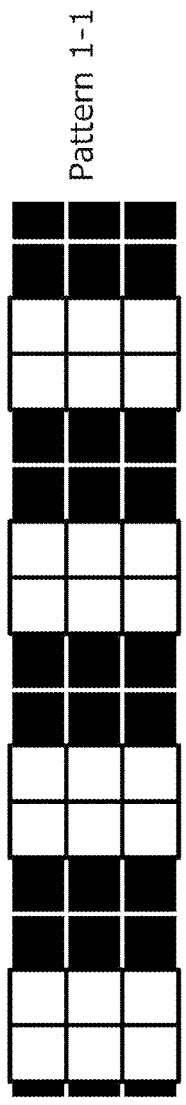
FIGS. 22A to 22D are schematic views showing projection pattern images corresponding to a pattern set 1 where a pattern set 0 shown in FIGS. 20A to 20D is defined as a reference.
Figure 22B:
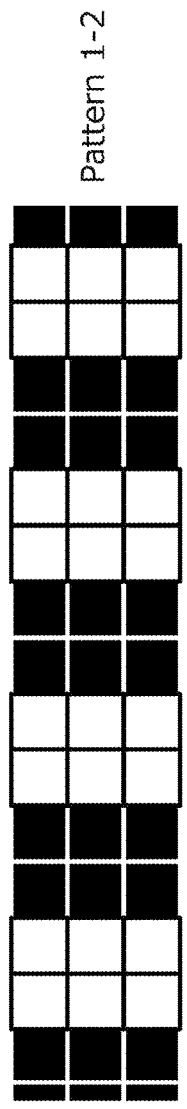
Figure 22C:
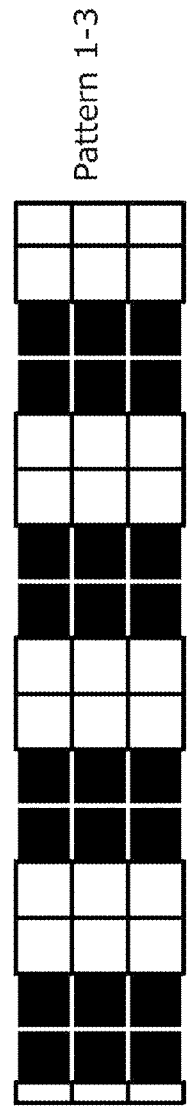
Figure 22D:
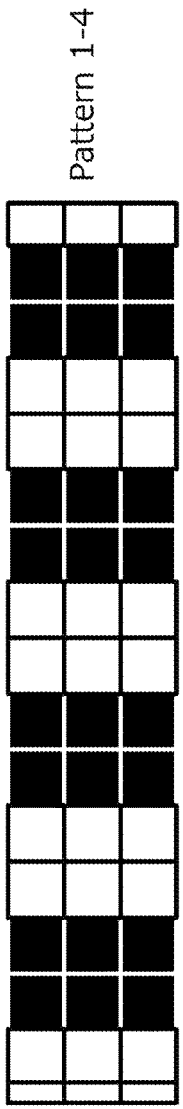
Figure 23A:
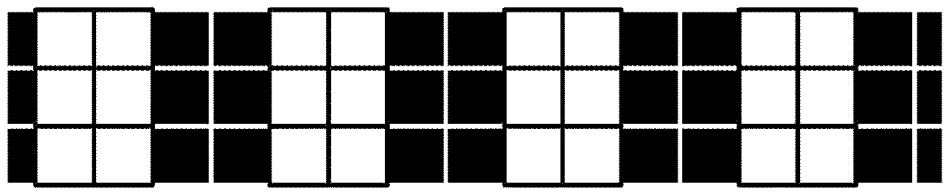
FIGS. 23A to 23D are schematic views showing projection pattern images corresponding to a pattern set 2 where a pattern set 0 shown in FIGS. 20A to 20D is defined as a reference.
Figure 23B:
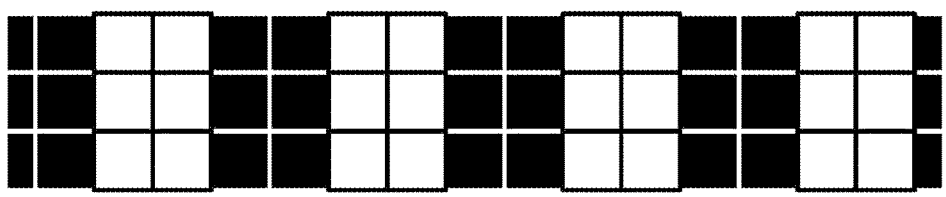
Figure 23C:
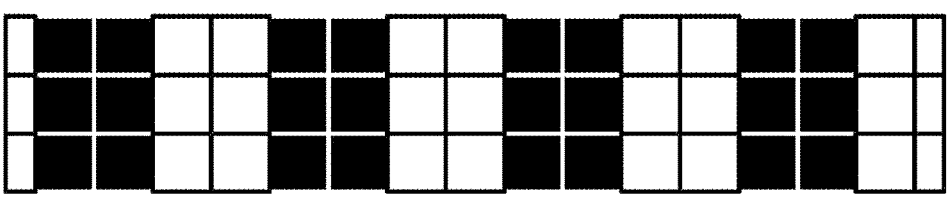
Figure 23D:
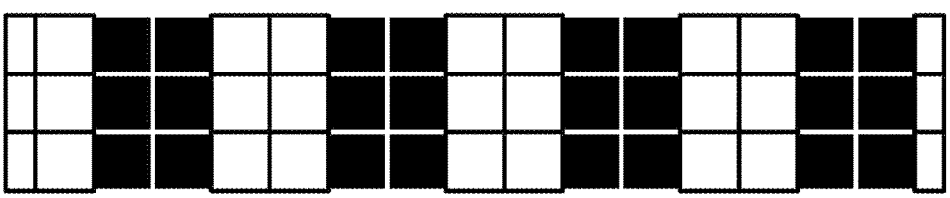
Figure 24A:
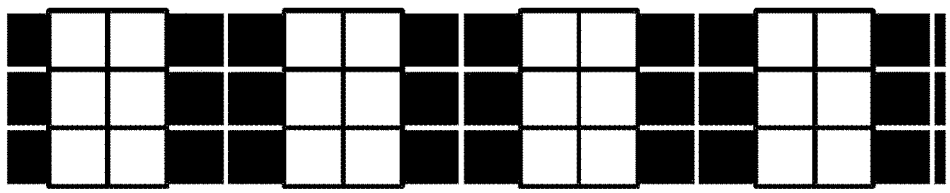
FIGS. 24A to 24D are schematic views showing projection pattern images corresponding to a pattern set 3 where a pattern set 0 shown in FIGS. 20A to 20D is defined as a reference.
Figure 24B:
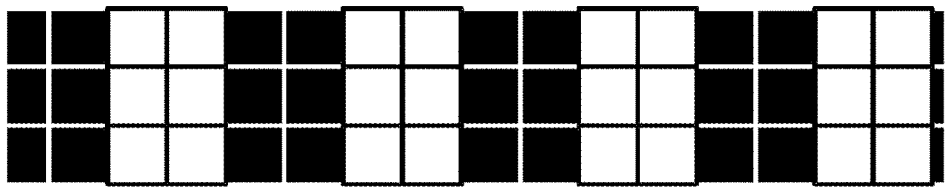
Figure 24C:
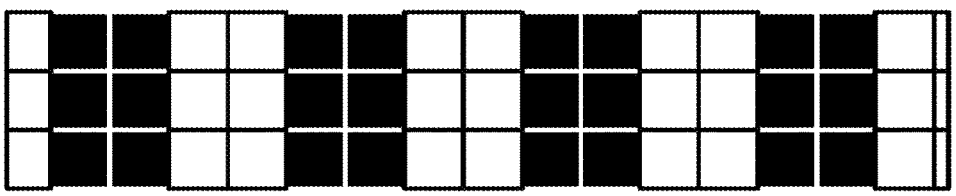
Figure 24D:
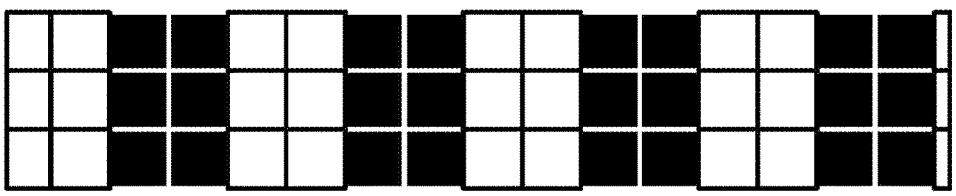

It is noted that although the projection pattern to be projected has a rectangular wave in the embodiment shown in FIG. 19 and FIGS. 20A to 20D, blurring caused by influences of optical elements and the like will occur in actual projection processes so that a stripe pattern image which is captured by the photoreceptor 120 when the projection pattern is actually projected onto the measurement object will have a shape very close to a sine wave as shown in FIG. 21.

Here, the phase shift between the four stripe patterns shown with FIGS. 20A to 20D is defined by the size of one pixel which constitutes the projection device. For this reason, the pattern cannot be shifted by a distance smaller than the size of one pixel of the projection device. In other words, the physical moving amount of the stripe pattern is determined by the specifications of the projection device (e.g., DMD).

Although a projection pattern having a four-pixel period interval is illustratively described in the foregoing embodiment, the present invention is not limited to this. For example, in the case in which a projection pattern has a six-pixel period interval (three illumination pixels and three non-illumination pixels), six types of projection patterns can be created by shifting the projection pattern by one pixel ($\pi/3$) from one another. However, the wavelength of the projection pattern is correspondingly increased. Even in this case, the minimum moving amount of the stripe pattern cannot be smaller than one pixel of the projection device.

To address this, the three-dimensional shape measuring apparatus according to this embodiment has the stage shift measurement function which shifts a measurement object to be projected instead of a function for physically shifting the projection pattern. Here, the translation of the stage 140 on which the measurement object is placed is translated by a distance smaller than the length of projection corresponding to one pixel of the projection device. Accordingly, a phase of a projection pattern which is shifted by a distance smaller than one pixel from another projection pattern can be created, and as a result finer stripe pattern images can be obtained.

In the stage shift measurement, images corresponding to one period interval are first captured at positions which are shifted by one pixel from one another without moving the stage 140 by the translation stage part 141. For example, in the case of the four-pixel period interval pattern, four stripe pattern images are captured.

Subsequently, the measurement object is translated by a very small amount by the translation stage part 141, and stripe pattern images corresponding to one period interval (e.g., four images) are similarly captured. After required images of patterns are captured by repeating the image capture operations, light amounts are sampled from the images of patterns. Accordingly, data corresponding to fine stripe pattern images captured at positions which are shifted by a very small shift amount can be acquired.

However, when the stage 140 is moved so that a position of a measurement object is shifted, a part of measurement object which is captured by the photoreceptor 120 is correspondingly shifted. For this reason, correspondence between images captured before movement of the stage 140 and images captured after movement of the stage 140 are necessarily established. Procedure for capturing stripe pattern images while establishing such correspondence between pixel positions is now described. Here, the case in which stripe pattern images are captured at positions which are shifted by one quarter the period interval of one pixel of the projection device as a very small amount of movement of the stage 140 (i.e., stage shift) in a rectangular wave projection pattern having a four-pixel unit is considered.

Firstly, the length of one pixel of the projection device is calculated in a measurement area of the measuring instrument when the stripe pattern is projected onto a measurement object. This calculation can be executed by the movement controller 144, for example. Subsequently, a moving unit for a very small amount of movement of the translation stage part 141 (i.e., shift amount) is calculated by dividing the calculated projection length of one pixel into quarters.

Subsequently, stripe pattern images corresponding to one period interval are captured without moving the translation stage part 141. The stripe patterns used to capture the stripe pattern images corresponding to one period interval are shows as a pattern set 0 corresponding to one period interval as shown in FIGS. 20A to 20D. FIG. 20A shows a pattern 0-1 having a phase of zero in the pattern set 0. FIG. 20B shows a pattern 0-2 having a phase of $\pi/2$ in the pattern set 0. FIG. 20C shows a pattern 0-3 having a phase of $\pi$ in the pattern set 0. FIG. 20D shows a pattern 0-4 having a phase of $2\pi/3$ in the pattern set 0.

Subsequently, the translation stage part 141 is moved by the aforementioned calculated shift amount, and stripe pattern images are captured as a pattern set 1 corresponding to one period interval as shown in FIGS. 22A to 22D. The phases of stripe patterns 1-1 to 1-4 included in the pattern set 1 are shifted by $\pi/2$ from each other similar to the aforementioned patterns shown in FIGS. 20A to 20D.

Such a set of processes is repeated another two times so that a pattern set 2 as shown in FIGS. 23A to 23D, and a pattern set 3 as shown in FIGS. 24A to 24D are obtained, and as a result total sixteen stripe pattern images are obtained.

Here, in the image capture of the pattern set 1, because the translation stage part 141 is moved by a very small amount as the shift amount which corresponding to one quarter the one pixel of the projection device, the measurement object is shifted by one quarter the one pixel of the projection device. For this reason, with reference to the pattern set 0, it is considered that the patterns in the pattern set 1 are shifted by approximately $(\pi/2)/4=\pi/8$ from the phase of their corresponding pattern in the pattern set 0 as shown in FIGS. 22A to 22D.

Figure 25A:
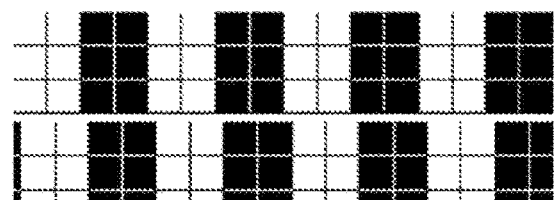
FIGS. 25A to 25P are schematic views showing striped patterns which are shifted by approximately π/8 from one another by sorting 16 patterns 0-1 to 3-4 in the four pattern sets in phase shifting amount.
Figure 25B:
Figure 25C:
Figure 25D:
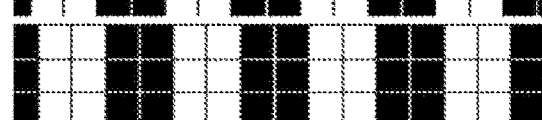
Figure 25E:
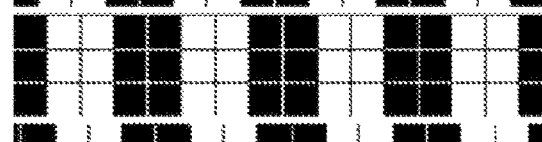
Figure 25F:
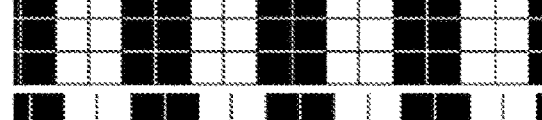
Figure 25G:
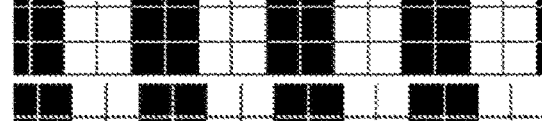
Figure 25H:
Figure 25I:
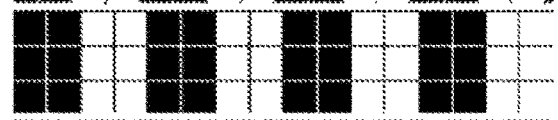
Figure 25J:
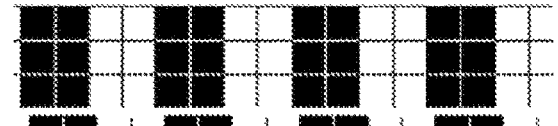
Figure 25K:
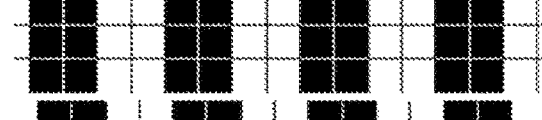
Figure 25L:
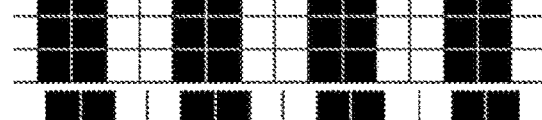
Figure 25M:
Figure 25N:
Figure 25O:
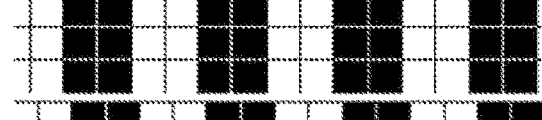
Figure 25P:
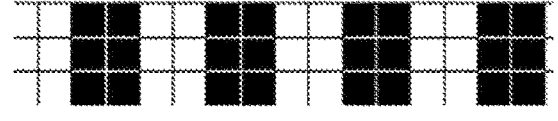

Similarly, it is considered that the patterns in the pattern set 2 are shifted by approximately $(\pi/8)\times 2=\pi/4$, that the patterns in the pattern set 3 are shifted by approximately $(\pi/8)\times 3=3\pi/8$ from the phase of their corresponding pattern in the pattern set 0. For these reasons, if the patterns in the pattern sets 0 to 3 having their phase are sorted in order of phase shifting amount, it is considered that sixteen stripe patterns having a phase shifted by approximately $\pi/8$ from one another as shown in FIGS. 25A to 25P.

Figure 26:
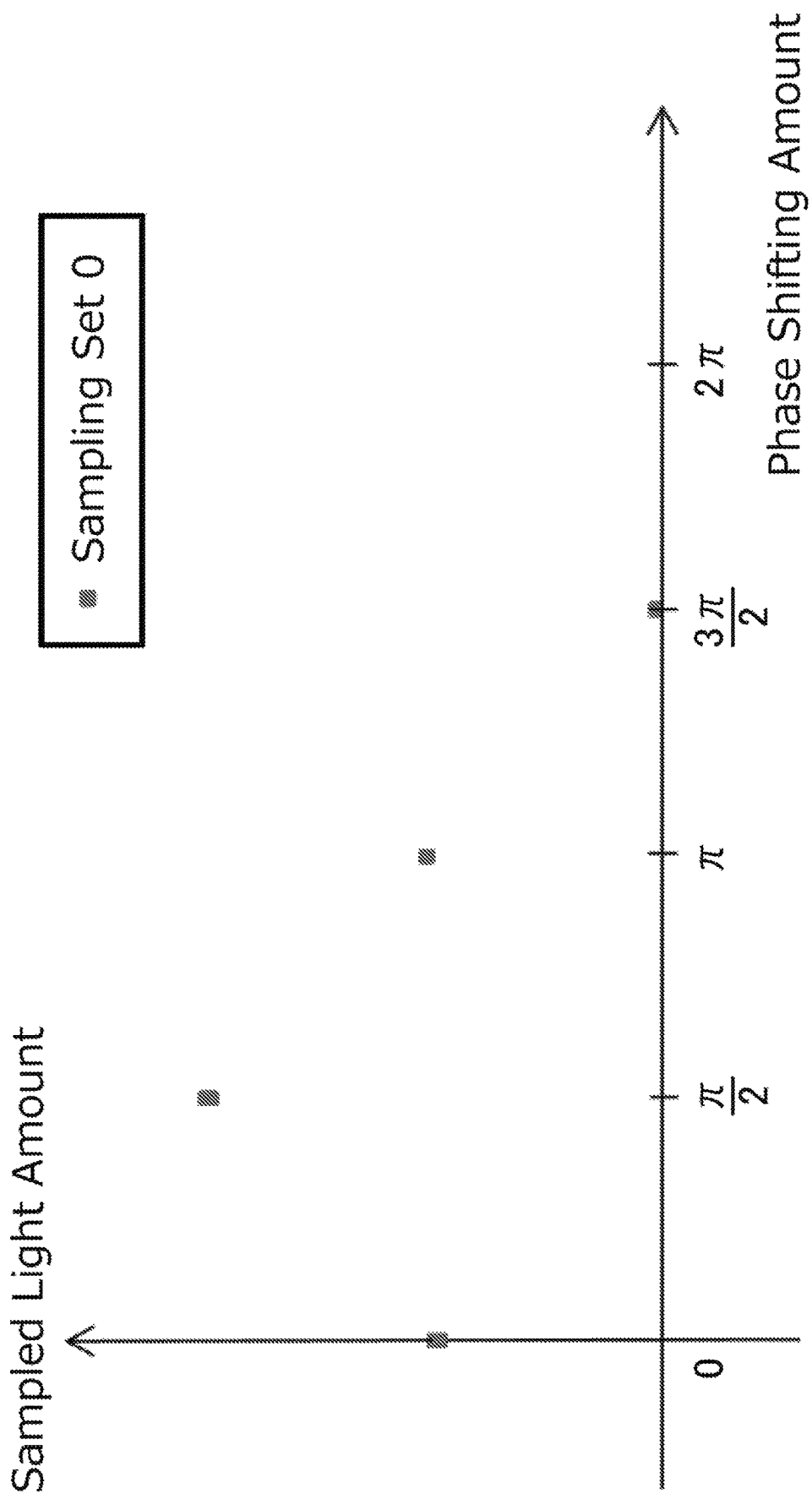
FIG. 26 is a graph showing the sampling light amounts in data which are obtained at phase shift amounts by the pattern set 0.

Accordingly, four sets of data corresponding to four phases shifted by $\pi/2$ from one another can be obtained by the photoreceptor 120 by using the pattern set 0 (i.e., four stripe patterns) without moving the translation stage part 141. Here, FIG. 26 is a graph showing a sampling set 0 as relation of phase shifting amounts corresponding to the sets of data obtained by the photoreceptor 120, and sampled light amounts in the pattern set 0. Here, four amounts of received light corresponding to the four phases shifted by $\pi/2$ from one another are obtained in each pixel of the photo-receiving device of the photoreceptor 120 (hereinafter, referred to as "camera pixel").

Figure 27:
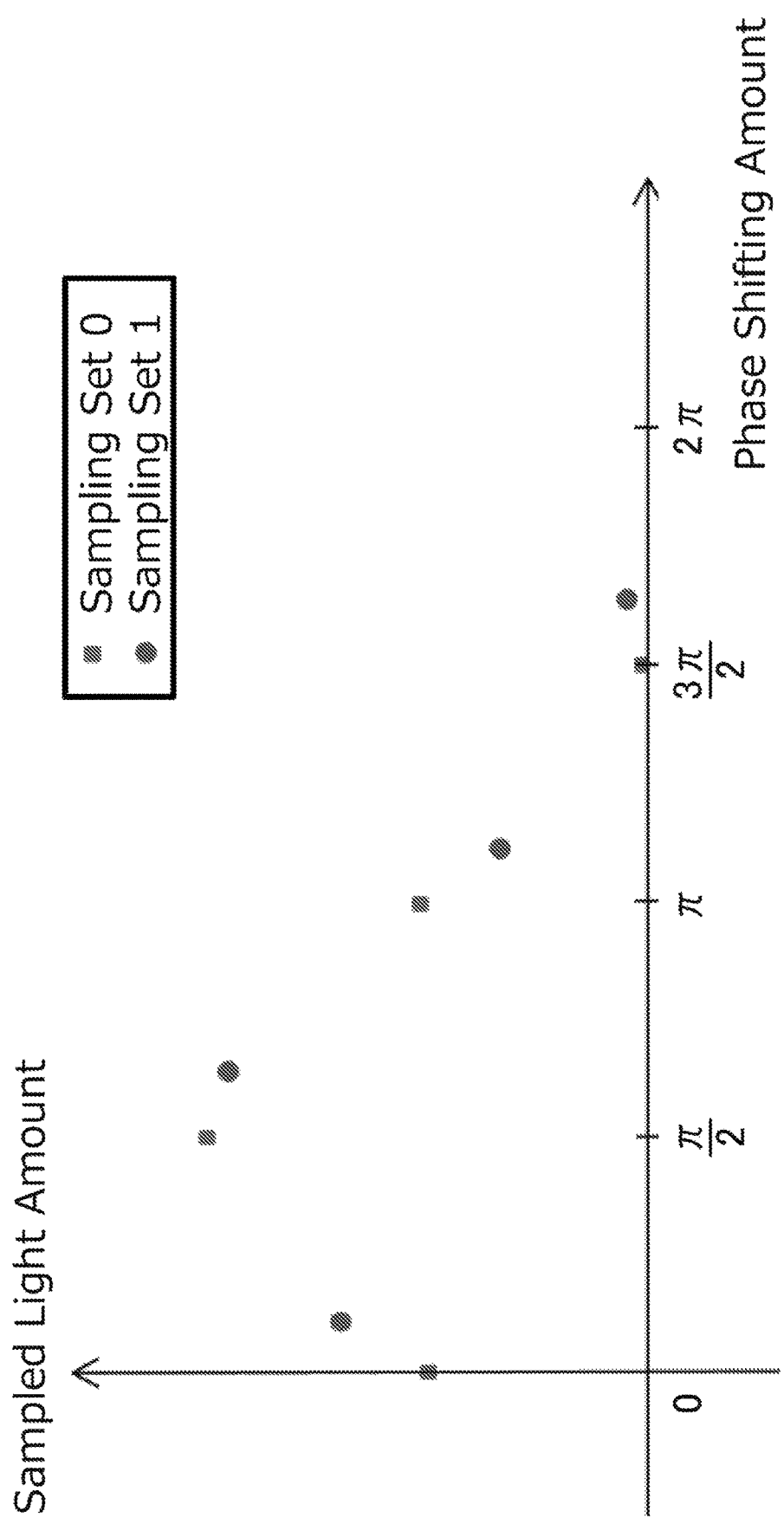
FIG. 27 is a graph showing the sampling light amounts in data which are obtained at phase shift amounts by the pattern set 0 and the pattern set 1.

Also, with reference to the data are obtained by the photoreceptor 120 in the pattern set 0 (sampling set 0), a shift amount corresponding to one quarter the one pixel of projection device is converted into a length on the photo-receiving device (camera pixel length) or into a number of camera pixels (how many camera pixels the one quarter the one pixel of projection device agrees with), and amounts of light (of pixels in the projection pattern image) in the data obtained in the pattern set 1 are shifted by a distance corresponding to the converted length or number of pixels and are then sampled as sampling set 1. FIG. 27 is a graph showing the result obtained by superposing the sampling set 1 onto the sampling set 0 shown in FIG. 26. In this superposition, because generally the shift amount corresponding to one quarter the one pixel of projection device is not an integral multiple of camera pixel, each sampled amount of light is obtained by calculating an amount of light at a camera pixel in consideration of the shift amount, which is generally not an integral multiple of camera pixel by interpolation.

Figure 28:
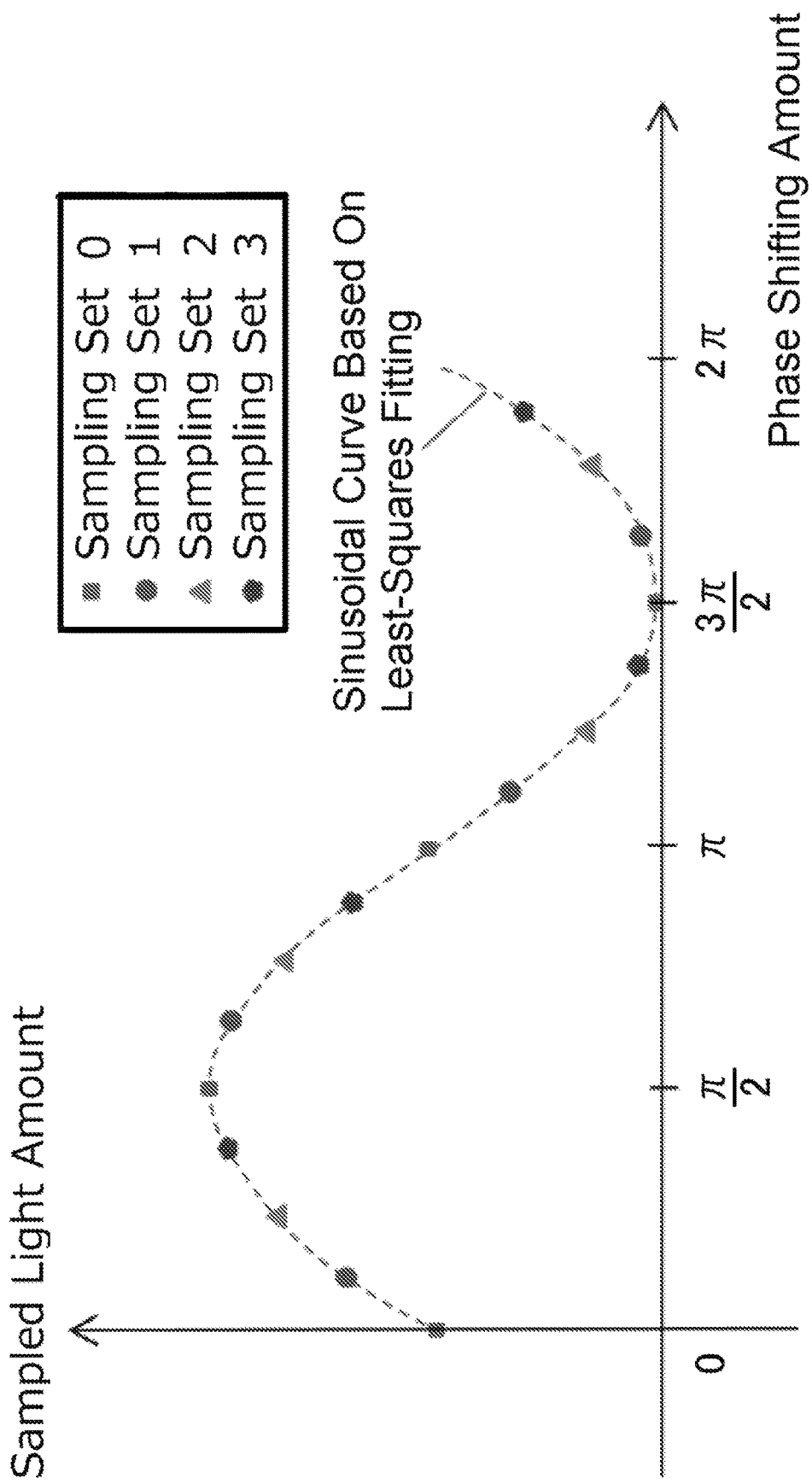
FIG. 28 is a graph showing the sampling light amounts in data which are obtained at phase shift amounts by the pattern sets 0 to 3.

Similarly, amounts of light in the pattern sets 2 and 3 which are shifted by their distance corresponding to two and three quarters the projection pixel are sampled as sampling sets 2 and 3, respectively. FIG. 28 is a graph showing the result.

Accordingly, amounts of light at sixteen points which are shifted by approximately $\pi/8$ from one another can be sampled. The phases are estimated based on the amounts of light (sampling sets 0 to 3) which are obtained as discussed above. Consequently, as compared with a conventional case in which amounts of light at only four points are sampled (FIG. 26), the phases can be estimated with high accuracy by reducing quantization error. Known methods such as sinewave fitting based on least-squares method can be used for approximation of sampling values, for example.

(Method of Correction in Conversion into Camera Pixel)

In the aforementioned stage shifting function, although the length corresponding to one pixel of the image capture device in the projection pattern image which is captured by the photoreceptor 120 when stripes are projected onto a measurement object can be calculated on the assumption that it is uniquely defined, correction may be made to this length to further improve the accuracy. In the case in which the illumination optical system of the three-dimensional shape measuring apparatus is not a telecentric optical system, the length corresponding to one pixel n the projection pattern image varies depending on a distance between the projection device and the measurement object. Also, the size corresponding to one pixel in the central part and the peripheral parts of the image may be changed by influences of distortion aberration of the lenses which constitute the optical system. For these reasons, strictly speaking, the length corresponding to one pixel of the image capture device in the projection pattern image cannot be uniquely defined. To address this, the length corresponding to one pixel of the image capture device in the projection pattern image which is captured when stripes are projected onto a measurement object can be calculated and corrected to measure the measurement object with higher accuracy. This procedure is described below.

First, phases are estimated by a four-point method by using four images in the pattern set 0. In addition, the unwrapping is performed by the space encoding method or the like, absolute phases are obtained, the distortion aberration of the lenses of the optical system is corrected, and point cloud data is estimated.

Subsequently, a distance between the projection device and the measurement object is calculated based on the space coordinates of the point corresponding to each camera pixel in the obtained point cloud data.

In addition, the length corresponding to one pixel of the image capture device in the projection pattern image which is captured when stripes are projected onto a measurement object is calculated based on the calculated distance.

(Method for Correcting Moving Pitch)

Also, in the aforementioned procedure, it is assumed that the stage 140 is accurately moved by one quarter the projection pixel unit. However, in actuality, due to the minimum movement resolution of the translation stage part, moving accuracy limitation, and the like, accurate movement of one quarter the projection pixel unit is difficult, and an error may be introduced. To address this, a method for sampling amounts of light in consideration that a deviation is introduced into the moving pitch when the stage part is actually moved by a very small amount is described.

As a precondition, the length of one pixel of the projection device has been calculated in the camera coordinates. Also, in the stage shift measurement, it is considered that the moving pitch of the translation stage part 141 has been obtained based on a driving pulse number of a stepping motor or by a displacement gauge or the like by a known method. An actual moving pitch of the placement surface 142 which is actually moved can be converted into a projection device length by combining these two sets of information. Accordingly, the shift amount of the phase in each pattern set can be estimated. Also, similarly, an actual moving pitch of the placement surface 142 which is actually moved can be converted into a camera pixel length based on the space coordinates of point cloud data. Here, by sampling an amount of light at a position which is shifted by the camera pixel corresponding to the moving pitch of the stage 140 by using interpolation, an amount of light at a pixel in which the placement surface 142 is not subjected to the very small amount of translation corresponding to the case in which a pattern is shifted by a very small phase shifting amount can be obtained.

Although it has been illustratively described that amounts of light are sampled at phases which are equally shifted by $\pi/8$ from one another in the foregoing embodiment, phase shifting amounts which are calculated based on the moving pitch of the placement surface 142 are actually used, and as a result amounts of light are sampled at unequally-shifted phases. Even in this case, phases can be estimated by least-squares fitting.

The aforementioned procedure for calculating high precision point cloud by subdividing the phase shift interval by stage shift measurement is described with reference to a flowchart of FIG. 29. Firstly, a measurement object is placed on the placement surface 142 in Step S2901. Subsequently, in Step S2902, the brightness of the illumination light emitter 130 is adjusted if necessary. Subsequently, the measurement object is illuminated with a space code pattern in Step S2903, and an image of the space code pattern is captured in Step S2904.

Subsequently, it is determined whether any uncaptured space code pattern remains or not in Step S2905, and if it remains the procedure returns to Step S2903 so that the aforementioned steps are repeated. On the other hand, if any uncaptured space code pattern does not remain in Step 2905, which in turn completes capture of images of all the space code patterns, the procedure goes to Step S2906 in which the measurement object is illuminated with a sinusoidal pattern. Subsequently, an image of the sinusoidal pattern is captured in Step S2907.

In addition, it is determined whether any uncaptured sinusoidal pattern remains or not in Step S2908. If any uncaptured sinusoidal pattern remains, the procedure returns to Step S2906 so that the aforementioned steps are repeated. On the other hand, if any uncaptured sinusoidal pattern does not remain in Step S2908, which in turn completes capture of images of all the sinusoidal patterns, the procedure goes to Step S2909 in which phase unwrapping is performed, and then point cloud data is calculated in Step S2910.

Subsequently, the stage 140 is translated by a micro displacement in Step S2911. The moving pitch is a shift amount which is previously calculated as discussed above. Subsequently, the measurement object is illuminated with a sinusoidal pattern in Step S2912, and an image of the sinusoidal pattern is captured in Step S2913. In addition, although the spatial encoding is commonly used and only images of the sinusoidal patterns are captured after each very small amount of movement in this exemplary flowchart, images of the space code patterns may be captured after each very small amount of movement. For example, in the case in which the minimum resolution of the spatial encoding is close to the very small amount of movement, the image capture of the space code patterns after each movement will be effective. However, because measuring time increases depending on the number of the positions after the movement, this embodiment is advantageous for the uses in which processing speed is given higher priority.

In addition, it is determined whether any uncaptured sinusoidal pattern remains or not in Step S2914. If any uncaptured sinusoidal pattern remains, the procedure returns to Step S2912 so that the aforementioned steps are repeated. On the other hand, if any uncaptured sinusoidal pattern does not remain in Step S2914, which in turn completes capture of images of all the sinusoidal patterns, the procedure goes to Step S2915 in which it is determined whether the translation stage part 141 is moved by one projection pixel or not. If not, the procedure returns to step S2911 so that the aforementioned steps are repeated. On the other hand, if it is determined that the translation stage part 141 is moved by one projection pixel, the procedure goes to Step S2916 in which phase shifting amounts are calculated based on the moving pitch of the translation stage part 141 and the non-stage shift point cloud coordinates. Subsequently, in Step S2917, amounts of light of camera pixel positions corresponding to the phase shifting amounts by the stage shift of the camera pixels are calculated by interpolation. In addition, initial phases are calculated based on the calculated phase shifting amounts and amounts of light by sinewave fitting based on least-squares method in Step S2918. In addition, phase unwrapping is performed in Step S2919, point cloud is calculated in Step S2920, and the procedure ends. As a result, high accurate point cloud can be obtained, and the measurement object can be measured with high accuracy.

Here, the positional relationship of the measurement object in the stage shift is described with reference to FIGS. 30A to 30B. In FIGS. 30A and 30B, a stripe pattern BP is unchanged, and the translation stage part 141 is translated in the X direction from the position shown in FIG. 30A (left side in the drawings) by a very small amount to the position shown in FIG. 30B. It is noted that a stripe pattern including only one stripe BP is illustrated in FIGS. 30A and 30B for ease of explanation. When the translation stage part 141 is moved by a very small amount, the measurement object on the placement surface 142 is moved together by the same amount. However, the position of the stripe pattern BP is unchanged, and as a result the position of the stripe projected onto the measurement object is shifted by the moving pitch of the translation stage part 141. The position of the black solid circle in FIGS. 30A and 30B indicates the same point on the measurement object, and it can be understood that the stripe is seemingly moved by the shift amount. Accordingly, it can be considered that an illumination result of the stripe pattern BP at the position shown in FIG. 30B substantially agree with an illumination result of a stripe pattern BP that is shifted by the moving pitch of the translation stage part 141 (advanced in phase) without moving the translation stage part 141. As discussed above, it can be confirmed that the stage shifting function provides similar effects to a very small amount of shift of the projection pattern.

After the stage shift, the position of an image which is captured by the camera is also shifted. In this case, because required information is brightness at the same point of the measurement object in the projection pattern that is shifted by a very small amount, brightness of a pixel of the camera that corresponds to the same point of the measurement object is sampled after the stage shift. Here, the same point in images of the measurement object which are captured by the camera is shown in FIGS. 31A to 31D when the translation stage part 141 is moved by a very small amount from one another. In these drawings, FIG. 31A shows a reference point RP on the measurement object WK when the translation stage part 141 is positioned at the reference position (stage position 1), and FIGS. 31B to 31D show the same reference point RP when the translation stage part 141 is moved by a very small amount from one another. In addition, the reference point RP on the measurement object WK is shown by a hatch pattern, and pixels of the image pickup device of the photoreceptor 120 are bounded by grid lines. As shown in FIGS. 31A to 31D, the position of the reference point RP in the images of the measurement object WK which are captured by the camera of the photoreceptor 120 changes in accordance with the very small amount of movement of the translation stage part 141. When the translation stage part is shifted, the position of the reference point RP is shifted, however it is not natural that its shift amount agrees with the size unit of pixels of the image pickup device. For this reason, to obtain brightness at the positions by using the image pickup device, the brightness is necessarily estimated by interpolation. For example, the reference point RP on the measurement object WK at a stage position 2 shown in FIG. 31B is the same point as a point that is shifted by 0.75 pixel leftward from the viewpoint of the reference position shown in FIG. 31A, (i.e., the reference point RP when the translation stage part 141 is not moved). Similarly, the reference points RP on the measurement object WK at stage positions 3 and 4 shown in FIGS. 31C and 31D are the same points as points that are shifted by 1.5 and 2.25 pixels leftward, respectively, from the viewpoint of the reference position shown in FIG. 31A. When the reference point RP on the measurement object WK is moved on the space, a number of pixels which is correspondingly shifted from a reference point as the same point in an image captured by the camera (how many pixels the shift amount agree with) can be calculated.

Similarly, as for the illumination side, when the translation stage part 141 is moved, the projection pixel representing the same point on the measurement object WK is also shifted, and a number of pixels of the projection device which corresponds to the shift amount (how many pixels the shift amount agree with) can be calculated. Because a shift amount of the projection device directly corresponds to a phase shift, a phase shift amount of the projection pattern which shifted by the stage shift (how much phase shift amount the shift amount of the projection device agree with) can be calculated. For example, assuming that a position which is shifted from one position by one quarter the projection pixel by movement of the translation stage part 141 corresponds to the reference point RP on the measurement object WK, because a shift of one projection pixel corresponds to a phase of $\pi/2$ in the four-point method, a sinusoidal pattern after the movement of the translation stage part 141 corresponds a pattern in which a sinusoidal pattern which is shifted by $\pi/8$ from the position before the movement of the translation stage part 141 is projected.

Figure 32A:
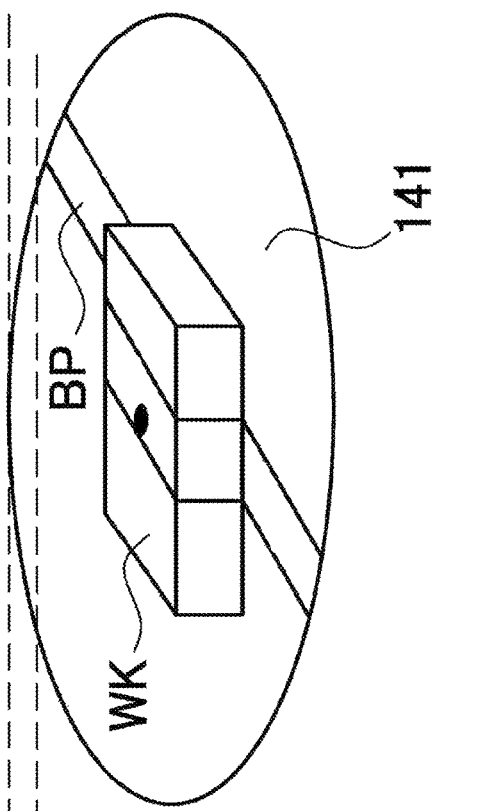
FIG. 32A is a perspective view showing a measurement object on which a striped pattern is projected.
Figure 32B:
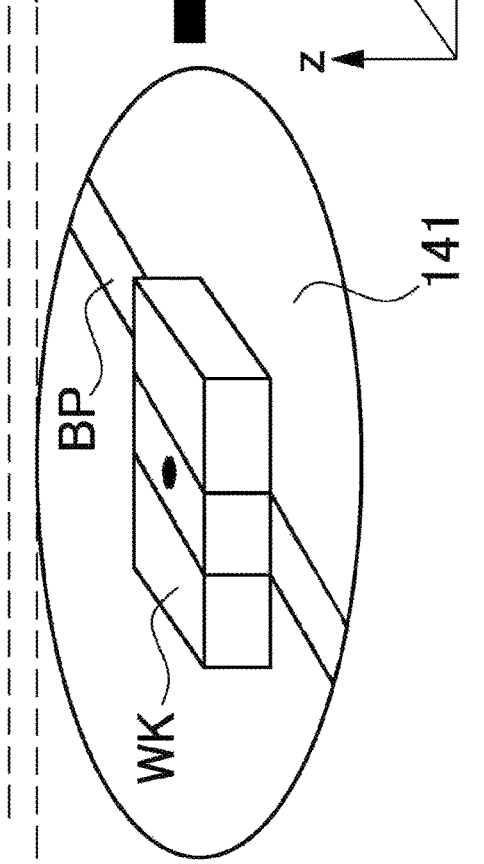
FIG. 32B is a perspective view showing the measurement object which is shifted in the Y direction when the striped pattern shown in FIG. 32A is unchanged.

Here, it has been illustratively described in the foregoing embodiment that the moving direction of the translation stage part 141 is parallel to the X direction as shown in FIGS. 30A to 30B. The moving direction in which the translation stage part 141 is moved by a very small amount in the present invention is not limited to this direction. For example, the translation stage part 141 may be moved in the depth direction, in other words, in the near-and-far direction in which the stage 140 is moved toward and away from the support as viewed in a plan view of the placement surface 142. FIGS. 32A to 32B show such exemplary movement. As for these drawings, FIG. 32A is a perspective view in showing a measurement object WK and a stripe pattern BP which is projected on the measurement object WK, and FIG. 32B shows the stripe pattern BP which is unchanged from FIG. 32A after stage shift in the Y direction (upward in FIGS. 32A and 32B). Also in FIGS. 32A to 32B, similar to the aforementioned case of FIGS. 30A to 30B, the positional relationship between a black solid circle as reference point RP on the measurement object WK and the stripe changes in accordance with a very small amount of movement in the Y direction of the translation stage part 141, and it can be confirmed that similar effects to a very small amount of stripe pattern BP shift are provided also by the movement of the translation stage part 141. In addition, in this case, the same point in an image captured by the camera of the photoreceptor 120 is shifted not in the X direction but in the Y direction. Also in this exemplary movement, a shift amount of pixels of the image pickup device corresponding to the shift amount after the stage shift of the translation stage part 141 (pixel shift amount) and a pixel shift amount of the projection device can be calculated.

Also, even in the case in which the translation stage part 141 is moved by very small amounts in both the X and Y directions, pixel shift amounts of the image pickup device and pixel shift amounts of the projection device after the stage shift can be similarly calculated. Also, in the case in which a Z stage for moving the placement surface 142 in the height direction (Z direction) is provided in addition to the translation stage part 141 so that the placement surface 142 can be moved in the three directions, pixel shift amounts of the image pickup device and pixel shift amounts of the projection device after the stage shift can be similarly calculated.

(Method for Improving Camera Pixel Density by Stage Shift Measurement)

A method for improving camera pixel density without changing the sampling period is now described with reference to the flowchart of FIG. 33. Here, illumination and image capture of space code patterns, and illumination and image capture of sinusoidal patterns are first conducted without stage shift, wrapped phases are calculated from the sinusoidal pattern, and unwrapped phases are calculated by using phases that are calculated from the spatial code and converted into the point cloud. Specifically, a measurement object is first placed on the placement surface 142 in Step S3301. Subsequently, in Step S3302, the brightness of the illumination light emitter 130 is adjusted if necessary. Subsequently, the measurement object is illuminated with a space code pattern in Step S3303, and an image of the space code pattern is captured in Step S3304.

Subsequently, it is determined whether any uncaptured space code pattern remains or not in Step S3305, and if it remains the procedure returns to Step S3303 so that the steps are repeated. Subsequently, if any uncaptured space code pattern does not remain, which in turn completes capture of images of all the space code patterns, the procedure goes to Step S3306. The measurement object is illuminated with a sinusoidal pattern in Step S3306, and an image of the sinusoidal pattern is captured in Step S3307. Subsequently, it is determined whether any uncaptured sinusoidal pattern remains or not in Step S3308, and if it remains the procedure returns to Step S3306 so that the steps are repeated. On the other hand, if any uncaptured sinusoidal pattern does not remain, which in turn completes capture of images of all the sinusoidal patterns, the procedure goes to Step S3309 in which phase unwrapping is performed, and then the point cloud is calculated in Step S3310.

Subsequently, the translation stage part 141 is shifted so that the measurement object is translated by a very small amount, illumination and image capture of sinusoidal patterns are conducted, and wrapped phases are calculated. The phases are subjected to phase unwrapping by using the phases that are calculated from the spatial code before the movement of the translation stage part 141, and converted into the point cloud. Here, the moving pitch of the translation stage part 141 is the same as that of the aforementioned method for subdividing the sampling period in the phase shift. Specifically, the translation stage part 141 is moved by a very small amount in Step S3311. Subsequently, the measurement object is similarly illuminated with a sinusoidal pattern in Step S3312, and an image of the sinusoidal pattern is captured in Step S3313. Subsequently, it is determined whether any uncaptured sinusoidal pattern remains or not in Step S3314, and if it remains the procedure returns to Step S3312 so that the aforementioned steps are repeated, if not it is determined that capture of images of all the sinusoidal patterns is completed, the procedure goes to Step S3315 in which phase unwrapping is performed, and the point cloud is calculated in Step S3316.

In addition, the translation stage part 141 is moved required times so that the point cloud similarly is calculated. Specifically, it is whether that the translation stage part 141 is moved by one projection pixel or not in Step S3317, if not the procedure returns to Step S3311 so that the steps are repeated. On the other hand, if it is determined that the translation stage part 141 is moved by one projection pixel the procedure goes to Step S3318 in which high-density point cloud is calculated by aligning the point clouds, and the procedure ends. That is, the two or more point clouds are aligned with each other. In the alignment, because the moving pitch of the translation stage part 141 is known, if the estimation accuracy corresponding to the moving pitch of the translation stage part 141 is sufficiently high, alignment can be made by shifting the point cloud by the estimated pitch corresponding to the moving pitch. If the estimation accuracy corresponding to the moving pitch of the translation stage part 141 is not sufficiently high, with respect to one point cloud obtained in the calculation in which the stage shift is not executed, a pair of other point clouds are aligned by using ICP (Iterative Closest Point), for example, so that position estimation with smaller error can be conducted base on the point cloud distribution. The camera pixel density of the combined point cloud which is obtained by combining the point clouds can be multiplied by the number of moving operations of the translation stage part 141.

(Stage Shift Setting Screen 1800)

Figure 34:
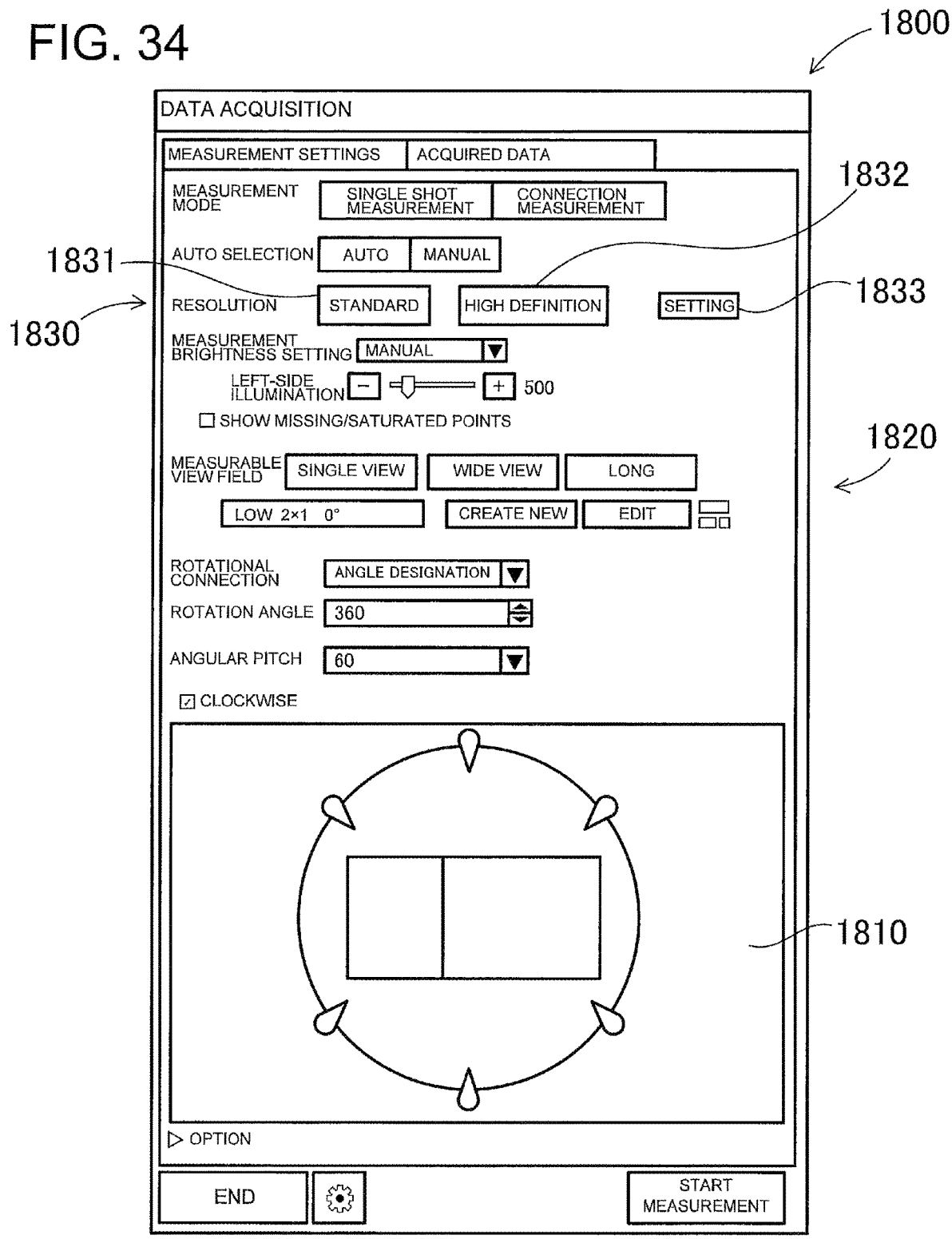
FIG. 34 is an image showing a stage shift setting screen.

The aforementioned stage can be executed in a stage shift selector. For example, a GUI dedicated to setting whether the stage shifting function is executed or not and to measurement setting may be prepared and displayed on the display to allow users to determine the settings. FIG. 34 shows a stage shift setting screen 1800 as such exemplary GUI for setting the stage shifting function. This illustrated stage shift setting screen 1800 has an operation area 1820 and an image display area 1810. Buttons and tools which accept various types of settings are arranged in the operation area 1820. Also, an image such as observed image is displayed in the image display area 1810. In the exemplary GUI shown in FIG. 34, although the operation area 1820 is arranged in the upper part of the stage shift setting screen 1800, and the image display area 1810 is arranged in the lower part, the present invention is not limited to this exemplary arrangement.

(Stage Shift Selector)

A "resolution" field 1830 which is arranged in the central part of the operation area 1820 serves as the stage shift selector. The "resolution" field 1830 includes a "standard" button 1831 and a "high definition" button 1832. When a user selects the "standard" button 1831, standard measurement in which the stage shift function is not executed is conducted. On the other hand, when a user selects the "high definition" button 1832, the stage shift function is executed. In the measurement in which the stage shift function is executed, advanced settings such as the moving pitch of the translation stage part 141, the number of moving operations, phase shift interval subdivision, high point cloud density settings can be determined by pressing the "setting" button 1833. Also, in the case in which the photoreceptor 120 includes the optical systems having high and low scaling factors as described above with reference to FIG. 7, etc., predetermined setting values may be applied to their high and low magnification lenses.

Figure 35:
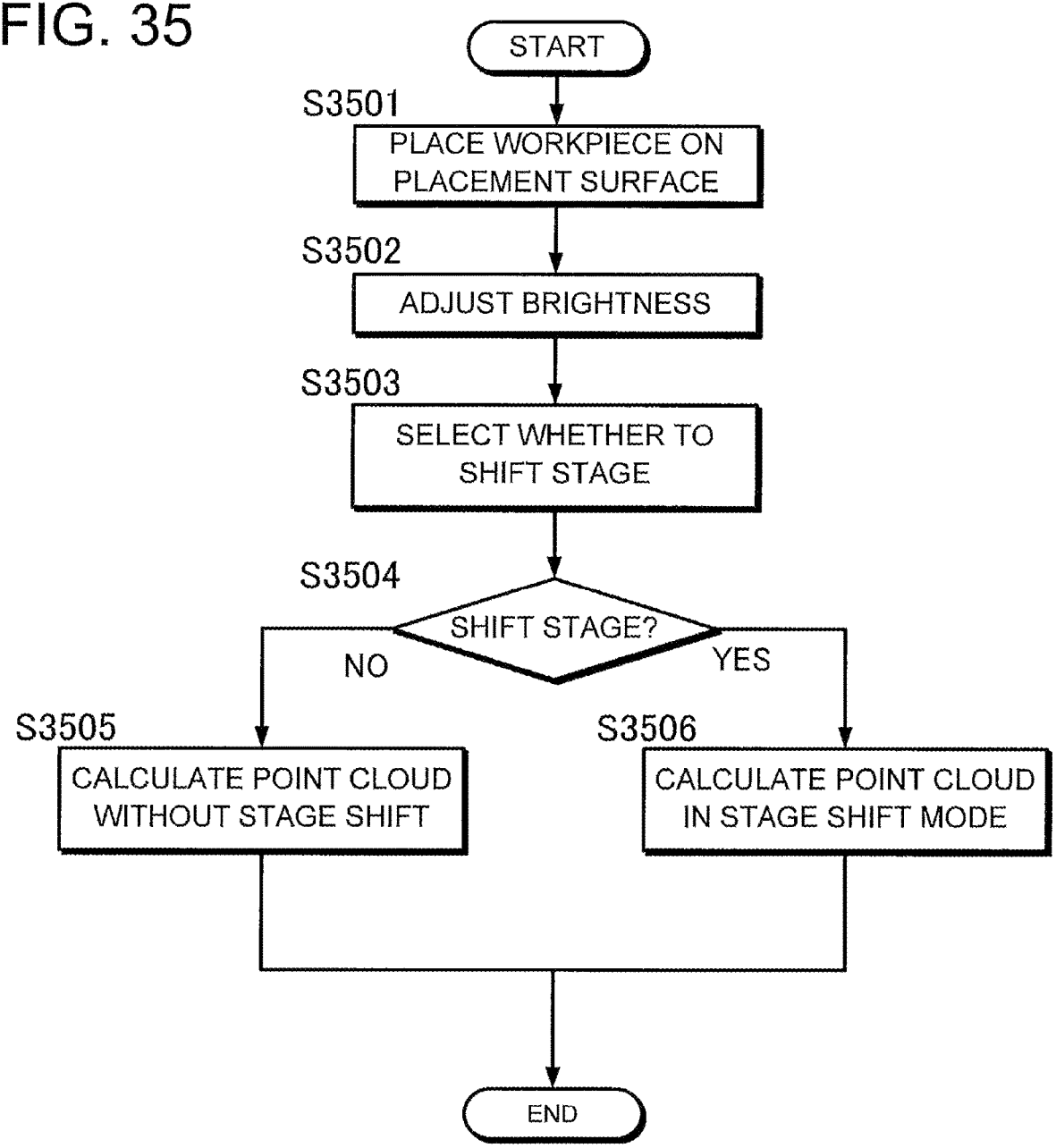
FIG. 35 is a flowchart illustrating the procedure for selecting whether stage shifting function is executed or not.

In addition, procedure for selecting execution of the stage shifting function by determining settings in the stage shift setting screen 1800 is described with reference to the flowchart of FIG. 35. Firstly, a measurement object is placed on the translation stage part 141 in Step S3501. Subsequently, in Step S3502, the brightness of the illumination light emitter 130 is adjusted if necessary, and it is selected whether the stage shift measurement is executed or not in Step S3503. Here, the three-dimensional shape measuring apparatus prompts users to select ON/OFF of the stage shifting function in the stage shift setting screen 1800. Subsequently, it is determined whether execution of the stage shifting function is selected or not in Step S3503 in in Step S3504, if not the procedure goes to Step S3505 in which the point cloud is calculated without executing stage shift, and the procedure ends. On the other hand, if the stage shifting function is executed, the procedure goes to Step S3506 in which the point cloud is calculated with executing stage shift, and the procedure ends. Accordingly, users can select whether the stage shifting function is executed or not, and the point cloud is obtained with or without executing stage shift depending on the users' selection.

Figure 36:
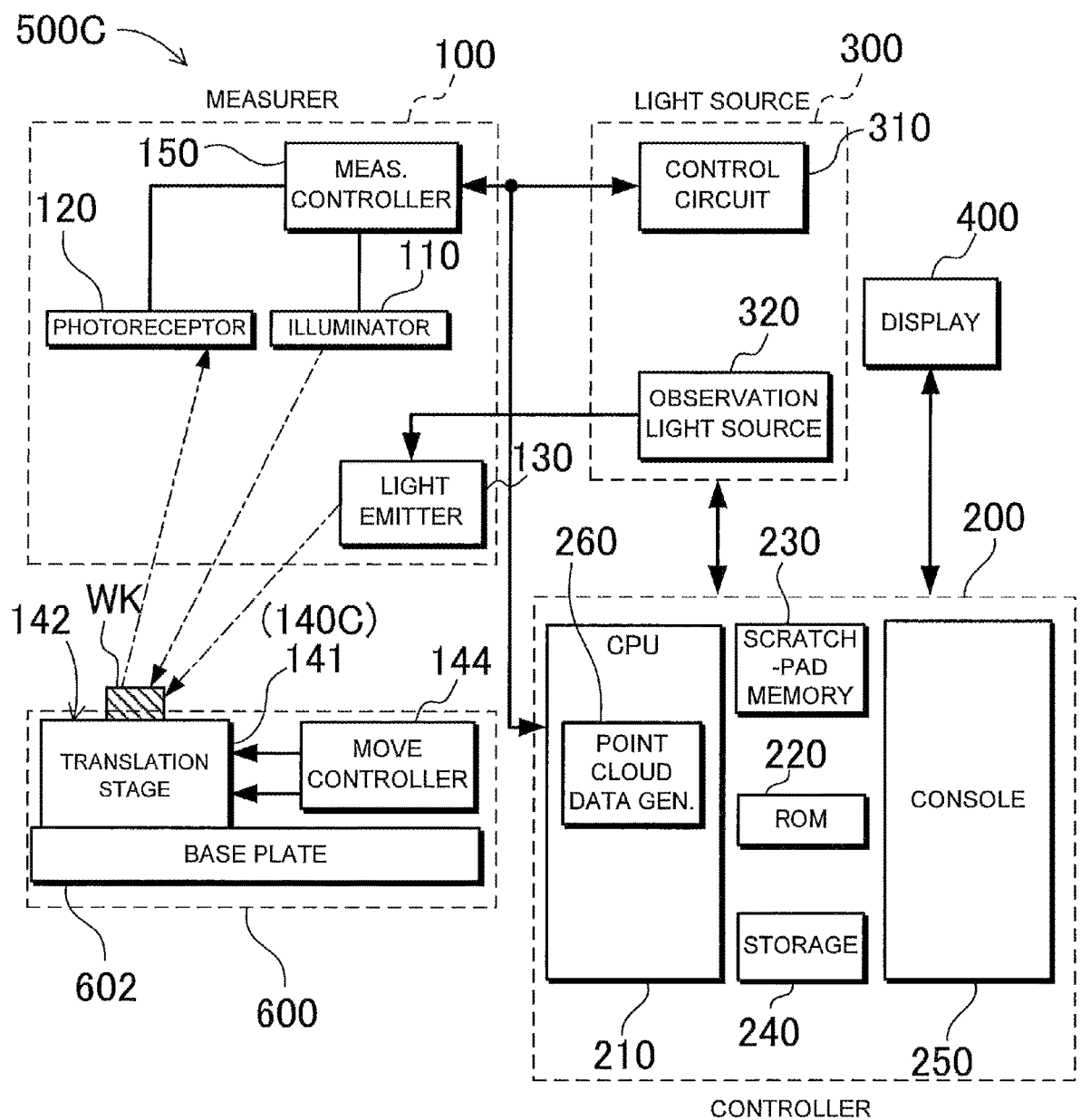
FIG. 36 is a block diagram showing a three-dimensional shape measuring apparatus according to a third embodiment.

The following description illustratively describes the stage 140 including an XYθ stage having the translation stage part 141 and the rotation stage part 143 shown in FIG. 6, etc., however, it is noted that the stage in the present invention is not limited to this arrangement. For example, although the translation stage part 141 is arranged on the rotation stage part 143 in the exemplary arrangement shown in FIG. 6, the rotation stage part 143 may be arranged on the translation stage part 141 as shown in FIG. 10. Also, the present invention can be applied to a three-dimensional shape measuring apparatus including the stage 140C which does not include rotation stage part and includes only the translation stage part 141 like a three-dimensional shape measuring apparatus 500C according to a modified embodiment shown in FIG. 36. As discussed above, the measurer of the three-dimensional shape measuring apparatus according to this embodiment can have a driving axis in which a measurement object can be moved one direction (e.g., X direction) as the minimum configuration. Here, the one direction refers to not a direction with respect to the three-dimensional shape measuring apparatus but a direction parallel to the feeding direction of the projection pattern. For example, in the embodiment shown in FIG. 2, the X direction driving axis of the translation stage part 141 agree with a pattern feeding direction, in other words, the direction in which pattern projection systems are aligned with respect to the image capture system (right-and-left direction in FIG. 2). In addition, the observation angle in the bird's eye view with respect to the placement surface 142 of the measurer is not limited to 45° but the bird's eye view can be a view of an object from the top.

A three-dimensional shape measuring apparatus, a three-dimensional shape measuring method, a three-dimensional shape measuring program, a three-dimensional shape measuring computer-readable storage medium and a three-dimensional shape measuring computer-readable storage device according to the present invention can be used for three-dimensional shape measuring apparatuses and digitizers which measure height of a measurement object by using the triangulation principle or the like, and inspection apparatuses which determine non-defective/defective based on the measurement results.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims.

What is claimed is:

1. A three-dimensional shape measuring apparatus which measures a three-dimensional shape of a measurement object, the three-dimensional shape measuring apparatus comprising:
    a stage that includes a translation stage part having a placement surface on which a measurement object is placed and capable of translating the placement surface;
    an illuminator that includes a plurality of independently controllable and two-dimensionally-arranged projection devices to illuminate the measurement object placed on the stage with measuring light having a predetermined projection pattern having alternating light-and-dark intervals;
    a photoreceptor that receives measuring light reflected by the measurement object illuminated by the illuminator, and to generate a projection pattern image; and
    a movement controller that controls the translational movement of the translation stage part by a moving pitch smaller than a minimum width of the projection pattern which can be projected on the stage by independently controlling the projection devices of the illuminator, the minimum width being a length corresponding to one pixel of the projection devices.

2. The three-dimensional shape measuring apparatus according to claim 1, wherein the illuminator comprises:
    a measuring light source; and
    a pattern generator that includes the two-dimensionally-arranged projection devices each of which transmits or reflects light emitted from the measuring light source, and controls the transmission or reflection of each of the projection devices whereby generating the projection pattern.

3. The three-dimensional shape measuring apparatus according to claim 2, wherein the pattern generator is a DMD.

4. The three-dimensional shape measuring apparatus according to claim 1, wherein the movement controller moves the translation stage part by the moving pitch in a direction parallel to the illumination direction of the measuring light of the illuminator with respect to the optical axis of the photoreceptor.

5. The three-dimensional shape measuring apparatus according to claim 1,
    wherein the projection pattern of the illuminator is a striped projection pattern including a plurality of lines which are aligned parallel to each other,
    wherein the movement controller translates the translation stage part by the moving pitch in a direction intersecting lines included in the striped projection pattern which are projected on the stage.

6. The three-dimensional shape measuring apparatus according to claim 5 further comprising a point cloud data generator that generates point cloud data representing a three-dimensional shape of the measurement object based on a plurality of projection pattern images which are generated by the photoreceptor at positions after the translation stage part is translated by the moving pitch by using the movement controller,
    wherein the point cloud data generator measures a surface shape of the measurement object by calculating positions of the light and dark peaks which are included in each of the projection pattern images by using a phase shift method based on
    a first pattern set as a set of the projection pattern images that are captured corresponding to a plurality of projection patterns having a different phase with which the illuminator illuminates the measurement object when the translation stage is positioned at a first position, and
    a second pattern set as a set of the projection pattern images that are captured corresponding to a plurality of projection patterns having a different phase with which the illuminator illuminates the measurement object when the translation stage is positioned at a second position which is shifted by the moving pitch from the first position.

7. The three-dimensional shape measuring apparatus according to claim 6, wherein the point cloud data generator sorts the projection pattern images which are included in the first and second pattern sets according to the phase shift amounts, and measures a surface shape of the measurement object by calculating positions of the light and dark peaks which are included in each of the projection pattern images by using the phase shift method based on the sorted projection pattern images.

8. The three-dimensional shape measuring apparatus according to claim 6, wherein the point cloud data generator converts, with reference to a position of the translation stage part when one projection pattern image at an arbitrary position in the plurality projection pattern images, other projection pattern images into pixel values which are estimated on the presumption that they are generated at said position of the translation stage part, and generates the point cloud data based on the one projection pattern image and the estimated projection pattern images.

9. The three-dimensional shape measuring apparatus according to claim 6, wherein the point cloud data generator converts the moving pitch of the stage by the movement controller into a moving amount in the projection pattern image, and generates the point cloud data.

10. The three-dimensional shape measuring apparatus according to claim 6, wherein the point cloud data generator overlays the plurality of projection pattern images on each other in consideration of positions of the translation stage part at which the plurality of projection pattern images are generated, and generates the point cloud data.

11. The three-dimensional shape measuring apparatus according to claim 1, wherein each pixel of the photoreceptor is smaller than each pixel of the projection device.

12. The three-dimensional shape measuring apparatus according to claim 1 further comprising
a stage shift selector that selects whether the translation stage part is translated by a micro displacement by the movement controller, and
wherein the movement controller translates the translation stage part by a micro displacement based on the selection result by the stage shift selector.

13. A three-dimensional shape measuring method which measures a three-dimensional shape of a measurement object, the three-dimensional shape measuring method comprising:
generating a projection pattern image by illuminating a measurement object which is placed on a stage that includes a translation stage part having a placement surface on which the measurement object is placed and capable of translating the placement surface when the translation stage part is positioned at an initial position with measuring light having a predetermined projection pattern having alternating light-and-dark intervals by using an illuminator that includes a plurality of independently controllable and two-dimensionally-arranged projection devices, and receiving the measuring light reflected by the measurement object by using a photoreceptor;
repeating a translation operation in which the translation stage part is translated by using a movement controller by a moving pitch smaller than a minimum width of the projection pattern which can be projected on the stage by independently controlling the projection devices of the illuminator, the minimum width being a length corresponding to one pixel of the projection devices, and generation of a projection pattern image by illuminating the measurement object with the measuring light by using the illuminator and receiving the measuring light reflected by the measurement object by using the photoreceptor at a position after the translation operation a predetermined number of times whereby capturing projection pattern images of the measurement object at the positions corresponding to the predetermined number of translation operations; and
obtaining exterior shape information continuously representing a three-dimensional shape of the measurement object by combining sets of point cloud data representing the three-dimensional shape of the measurement object which are generated at the positions based on the projection pattern images by a point cloud data generator.

14. The three-dimensional shape measuring method according to claim 13,
wherein the generation of a projection pattern image at the initial position includes generating a first pattern set as a set of the projection pattern images that are captured corresponding to a plurality of projection patterns having a different phase with which the illuminator illuminates the measurement object,
wherein the generation of a projection pattern image at a position after the translation operation includes generating a second pattern set as a set of the projection pattern images that are captured corresponding to a plurality of projection patterns having a different phase with which the illuminator illuminates the measurement object, and
wherein the obtainment of the exterior shape information includes measuring a surface shape of the measurement object based on the first and second pattern sets by calculating positions of the light and dark peaks which are included in each of the projection pattern images by using a phase shift method.

15. The three-dimensional shape measuring method according to claim 14, wherein the obtainment of the exterior shape information includes sorting the projection pattern images which are included in the first and second pattern sets according to the phase shift amounts, and measures a surface shape of the measurement object by calculating positions of the light and dark peaks which are included in each of the projection pattern images by using the phase shift method based on the sorted projection pattern images.

16. A computer-readable storage medium or storage device having a three-dimensional shape measuring program which executes a computer to perform measurement of a three-dimensional shape of a measurement object, the three-dimensional shape measuring program comprising:
generating a projection pattern image by illuminating a measurement object which is placed on a stage that includes a translation stage part having a placement surface on which the measurement object is placed and capable of translating the placement surface when the translation stage part is positioned at an initial position with measuring light having a predetermined projection pattern having alternating light-and-dark intervals by using an illuminator that includes a plurality of independently controllable and two-dimensionally-arranged projection devices, and receiving the measuring light reflected by the measurement object by using a photoreceptor;

repeating a translation operation in which the translation stage part is translated by using a movement controller by a moving pitch smaller than a minimum width of the projection pattern which can be projected on the stage by independently controlling the projection devices of the illuminator, the minimum width being a length corresponding to one pixel of the projection devices, and generation of a projection pattern image by illuminating the measurement object with the measuring light by using the illuminator and receiving the measuring light reflected by the measurement object by using the photoreceptor at a position after the translation operation a predetermined number of times whereby capturing projection pattern images of the measurement object at the positions corresponding to the predetermined number of translation operations; and obtaining exterior shape information continuously representing a three-dimensional shape of the measurement object by combining sets of point cloud data representing the three-dimensional shape of the measurement object which are generated at the positions based on the projection pattern images by a point cloud data generator.

* * * * *